(12) United States Patent
Lochmann et al.

(10) Patent No.: US 12,448,483 B2
(45) Date of Patent: Oct. 21, 2025

(54) PROCESS FOR PREPARING CARBOXYLIC ACID ESTER-CROSS-LINKED POLYGLYCEROL ESTERS OF 3-HYDROXYBUTYRIC ACID

(71) Applicant: KetoLipix Therapeutics GmbH, Hamburg (DE)

(72) Inventors: Dirk Lochmann, Witten (DE); Sebastian Reyer, Witten (DE); Michael Stehr, Witten (DE)

(73) Assignee: KetoLipx Therapeutics GmbH, Hamburg (DE)

( * ) Notice: Subject to any disclaimer, the term of this patent is extended or adjusted under 35 U.S.C. 154(b) by 481 days.

(21) Appl. No.: 18/004,754

(22) PCT Filed: Sep. 7, 2020

(86) PCT No.: PCT/EP2020/074896
§ 371 (c)(1),
(2) Date: Jan. 9, 2023

(87) PCT Pub. No.: WO2022/012768
PCT Pub. Date: Jan. 20, 2022

(65) Prior Publication Data
US 2023/0257517 A1  Aug. 17, 2023

(51) Int. Cl.
*C08G 63/60* (2006.01)

(52) U.S. Cl.
CPC ...................................... *C08G 63/60* (2013.01)

(58) Field of Classification Search
CPC ...................................................... C08G 63/60
See application file for complete search history.

(56) References Cited

U.S. PATENT DOCUMENTS

| | | | |
|---|---|---|---|
| 4,324,880 A * | 4/1982 | Dhein | C08G 63/60 528/80 |
| 4,701,443 A | 10/1987 | Nelson | |
| 5,693,850 A | 12/1997 | Birkhahn | |
| 2018/0195096 A1 | 7/2018 | Veech | |

* cited by examiner

*Primary Examiner* — Shane Fang
(74) *Attorney, Agent, or Firm* — Brannon Sowers & Cracraft PC; Edward E. Sowers

(57) ABSTRACT

The invention relates to a method for producing polyglycerol esters of 3-hydroxybutyric acid crosslinked with polycarboxylic acids (i.e. polycarboxylic acid crosslinked 3-hydroxybutyric acid polyglycerol esters), as well as the products thus obtained and their use.

28 Claims, 2 Drawing Sheets

PROCESS FOR PREPARING CARBOXYLIC ACID ESTER-CROSS-LINKED POLYGLYCEROL ESTERS OF 3-HYDROXYBUTYRIC ACID

CROSS-REFERENCES TO RELATED APPLICATIONS

This application is a National Stage filing of International Application PCT/EP 2020/074896 filed Sep. 7, 2020, entitled "Process for Preparing Polycarboxylic Acid Ester-Cross-Linked Polyglycerol Esters of 3-Hydroxybutyric Acid" claiming priority to PCT/EP 2020/069766 filed Jul. 13, 2020. The subject application claims priority to PCT/EP 2020/074896 and PCT/EP 2020/069766 and incorporates all by reference herein, in their entirety.

BACKGROUND OF THE INVENTION

The present invention relates to the field of keto bodies and related metabolism and the therapy of related diseases.

Especially, the present invention relates to a method for producing polyglycerol esters of 3-hydroxybutyric acid crosslinked with polycarboxylic acids, as well as the reaction products thus obtainable or thus prepared (i.e. polyglycerol esters of 3-hydroxybutyric acid crosslinked with polycarboxylic acids) and their use, especially in pharmaceutical compositions, such as drugs or medicaments, or in cosmetics or cosmetic compositions or in food and/or food products, as well as their further applications or uses.

Furthermore, the present invention relates to pharmaceutical compositions, especially drugs or medicaments, comprising the reaction products (i.e. polyglycerol esters of 3-hydroxybutyric acid crosslinked with polycarboxylic acids) obtainable or produced according to the inventive method, as well as their applications or uses.

Moreover, the present invention relates to cosmetics or cosmetic compositions comprising the reaction products (i.e. polyglycerol esters of 3-hydroxybutyric acid crosslinked with polycarboxylic acids) obtainable or produced according to the inventive production method, as well as their applications or uses.

Finally, the present invention relates to food and/or food products, especially food supplements, functional foods, novel foods, food additives, food supplements, dietary foods, power snacks, appetite suppressants and strength and/or endurance sports supplements, which comprise the reaction products (i.e. polyglycerol esters of 3-hydroxybutyric acid crosslinked with polycarboxylic acids) obtainable or produced according to the inventive method, as well as their applications or uses.

In the human energy metabolism, glucose is the short-term available energy carrier, which is metabolized into energy in the mitochondria by releasing water and carbon dioxide. The glycogen stores of the liver are already emptied during the sleep period during the night. However, especially the human central nervous system (CNS) and the heart require a permanent energy supply.

The physiological alternative to glucose, which is mainly available to the central nervous system, are the so-called keto bodies (synonymously also called ketone bodies).

The term keto body is especially a collective term for three compounds, which are formed mainly in catabolic metabolic states (such as hunger, reduction diets or low-carbohydrate diets) and may lead to ketosis. The term keto bodies includes especially the three compounds acetoacetate (synonymously also referred to as acetacetate) and acetone as well as 3-hydroxybutyric acid (hereinafter also synonymously referred to as beta-hydroxybutyric acid or BHB or 3-BHB) or its salt (i.e. 3-hydroxybutyrate or beta-hydroxybutyrate), the latter being the most important of the three aforementioned compounds. 3-Hydroxybutyric acid or its salt occurs physiologically as the (R)-enantiomer, i.e. as (R)-3-hydroxybutyric acid (synonymously also called (3R)-3-hydroxybutyric acid to emphasize the center of chirality in the 3-position) or its salt.

These keto bodies are also provided physiologically in large amounts from lipids stored in the body by lipolysis during fasting or starvation and replace the energy source glucose almost completely.

The keto bodies are formed in the liver from acetyl coenzyme A (=acetyl-CoA), which originates from beta-oxidation; they represent a transportable form of the acetyl coenzyme A in the human body. However, in order to utilize the keto bodies, the brain and muscles must first adapt by expressing enzymes that are required to convert keto bodies back into acetyl coenzyme A. Especially in times of hunger, the keto bodies contribute a considerable amount to energy production. For example, after some time the brain is able to get by with only a third of the daily amount of glucose.

Physiologically, the keto bodies are synthesized from two molecules of activated acetic acid in the form of acetyl coenzyme A, the normal intermediate product of fatty acid degradation, which is extended using a further acetyl coenzyme A unit and the enzyme HMG-CoA-synthase to the intermediate product 3-hydroxy-3-methyl-glutaryl-CoA (HMG-CoA), wherein finally the HMG-CoA-lyase cleaves off the acetoacetate. These three steps take place exclusively in the mitochondria of the liver (lynen cycle), wherein 3-hydroxybutyrate is finally formed in the cytosol by the D-beta-hydroxybutyrate dehydrogenase. HMG-CoA is also an end product of the degradation of the amino acid leucine, while acetoacetate is formed during the degradation of the amino acids phenylalanine and tyrosine.

Spontaneous decarboxylation turns acetoacetate into acetone; it can occasionally be perceived in the breath of diabetics and dieters. It cannot be further used by the body. However, the proportion of acetone in the keto bodies is small.

Acetoacetate is thus reductively converted into the physiologically relevant form of 3-hydroxybutyric acid or 3-hydroxybutyrate, but can also decompose into the physiologically unusable acetone with the release of carbon dioxide, which is detectable and olfactory perceptible in severe ketosis, a ketoacidosis (e.g. in diabetes mellitus type 1 patients without insulin substitution), in the urine and in the exhaled air.

3-Hydroxybutyric acid is currently used and marketed in the weight training sector as a sodium, magnesium or calcium salt.

However, 3-hydroxybutyric acid is not known or only in very small quantities to humans in evolutionary terms, since plants do not produce 3-hydroxybutyric acid and 3-hydroxybutyric acid in the animal organism only occurs in dead emaciated animals in ketosis, so that 3-hydroxybutyric acid causes nausea when administered orally. 3-Hydroxybutyric acid in the form of free acid and its salts also taste very bitter and can cause severe vomiting and nausea.

Moreover, patients, especially newborns, but also adults cannot permanently tolerate large amounts of salts of 3-hydroxybutyric acid, as these compounds can have a kidney-damaging effect.

In addition, the plasma half-life of 3-hydroxybutyric acid and its salts is so short that even if several grams are taken, the ketosis lasts only for about three to four hours, i.e. patients cannot benefit continuously from a therapy with 3-hydroxybutyric acid or its salts, especially at night. In case of metabolic diseases this can lead to life-threatening situations.

Therefore, in the case of the therapy of such metabolic diseases, so-called medium-chain triglycerides, so-called MCTs, are currently used for ketogenic therapy, i.e. the metabolic conversion of caproic, caprylic and capric acid (i.e. of saturated linear $C_6$-, $C_8$- and $C_{10}$-fatty acids) from the corresponding triglycerides is intended.

Basically, however, from a pharmaceutical and clinical point of view, 3-hydroxybutyric acid is a more effective pharmaceutical-pharmacological target molecule, which, according to the prior art, could in principle be used for the therapy of a large number of diseases, but cannot be used due to its lack of physiological compatibility (e.g. in diseases in connection with a malfunction of the energy metabolism, especially keto-body metabolism, or neurodegenerative diseases such as dementia, Alzheimer's disease, Parkinson's disease, etc., lipometabolic diseases etc.).

The following table illustrates purely exemplary, but by no means limiting, potential therapy options or possible indications for the active ingredient 3-hydroxybutyric acid.

| Indication | Therapeutic effect |
| --- | --- |
| Traumatic brain injury | Under BHB the apoptosis and necrosis rate of nerve cells decreases. |
| Stroke | Under BHB the apoptosis and necrosis rate of nerve cells decreases. |
| Refeeding syndrome | In case of anorexia, discontinuation of enteral or parenteral nutrition and after long periods of hunger, the consumption of starch or glucose can lead to death (see also WHO scheme peanut paste). BHB can be used here as a therapeutic agent to achieve normal food intake |
| Appetite suppressant | BHB suppresses the feeling of hunger in the central nervous system (CNS). |
| Epilepsy | Conventional ketogenic diet to significantly reduce the frequency of seizures has extremely poor patient tolerance. BHB offers an immediately effective alternative here. |
| Alzheimer's disease, dementia | Under BHB patients show better cognitive performance. BHB is also effective in the prevention of neurodegenerative diseases. |
| Disorders of fatty acid oxidation (e.g. electron transfer protein defect) | Compensation of a nutrient deficiency in case of defect in energy metabolism. |

Therefore, it is desirable from a pharmaceutical and clinical point of view to be able to find effective precursors or metabolites which physiologically allow direct or indirect access to 3-hydroxybutyric acid or its salts, especially in the physiological metabolism of the human or animal body.

Consequently, the prior art has not lacked attempts to find physiologically suitable precursors or metabolites for 3-hydroxybutyric acid or its salts. So far, however, no efficient compounds have been found in the prior art. Also, access to such compounds is not or not readily possible according to the prior art.

BRIEF SUMMARY OF THE INVENTION

The problem underlying the present invention is thus the provision of an efficient method for producing physiologically suitable or physiologically compatible precursors and/or metabolites of 3-hydroxybutyric acid (i.e. beta-hydroxybutyric acid or BHB or 3-BHB) or their salts.

Such method should especially make the respective BHB precursors and/or BHB metabolites accessible in an efficient way, especially in larger quantities and without significant amounts of toxic by-products.

In a completely surprising way, the applicant has now discovered that polyglycerol esters of 3-hydroxybutyric acid crosslinked with polycarboxylic acids represent an efficient and physiologically effective or physiologically compatible precursor and/or metabolite for the keto body 3-hydroxybutyric acid or its salts and has in this context been able to find or develop an efficient method for producing these compounds, which allows direct and effective, especially economic as well as industrially feasible access to these compounds.

To solve the problem described above, the present invention therefore proposes—according to a first aspect of the present invention—a method for producing polyglycerol esters of 3-hydroxybutyric acid crosslinked with polycarboxylic acids according to the teaching herein; further, especially special and/or advantageous embodiments of the inventive method are the subject-matter of the relevant subclaims.

Furthermore, the present invention relates—according to a second aspect of the present invention—to a reaction product or a polyglycerol ester of 3-hydroxybutyric acid crosslinked with polycarboxylic acids obtainable by the inventive method or a respective mixture of at least two polyglycerol esters of 3-hydroxybutyric acid crosslinked with polycarboxylic acids; further, especially special and/or advantageous embodiments of this aspect of the invention are the subject-matter of the relevant subclaims.

Likewise, the present invention—according to a third aspect of the present invention—relates to a pharmaceutical composition, especially a drug or medicament, especially special and/or advantageous embodiments of this aspect of the invention.

Furthermore, the present invention—according to a fourth aspect of the present invention—relates to an inventive reaction product or an inventive polyglycerol ester of 3-hydroxybutyric acid crosslinked with polycarboxylic acids or an inventive mixture of at least two polyglycerol esters of 3-hydroxybutyric acid crosslinked with polycarboxylic acids for the prophylactic and/or therapeutic treatment or for use in the prophylactic and/or therapeutic treatment of diseases of the human or animal body.

Furthermore, the present invention—according to a fifth aspect of the present invention—relates to the use of an inventive reaction product or an inventive polyglycerol ester of 3-hydroxybutyric acid crosslinked with polycarboxylic acids or an inventive mixture of at least two polyglycerol esters of 3-hydroxybutyric acid crosslinked with polycarboxylic acids for the prophylactic and/or therapeutic treatment or for producing a medicament for the prophylactic and/or therapeutic treatment of diseases of the human or animal body.

Furthermore, the present invention—according to a sixth aspect of the present invention—relates to the use of an inventive reaction product or an inventive polyglycerol ester of 3-hydroxybutyric acid crosslinked with polycarboxylic acids or an inventive mixture of at least two polyglycerol esters of 3-hydroxybutyric acid crosslinked with polycarboxylic acids.

Furthermore, the present invention relates—according to a seventh aspect of the present invention—to a cosmetic or a cosmetic composition.

Furthermore, the present invention—according to an eighth aspect of the present invention—relates to a food and/or food product; further, especially special and/or advantageous embodiments of the food and/or food product.

Finally, the present invention—according to a ninth aspect of the present invention—relates to the use of an inventive reaction product or an inventive polyglycerol ester of 3-hydroxybutyric acid crosslinked with polycarboxylic acids or an inventive mixture of at least two polyglycerol esters of 3-hydroxybutyric acid crosslinked with polycarboxylic acids in a food and/or a food product.

It goes without saying that following features, embodiments, advantages and the like, which are subsequently listed below only with regard to one aspect of the invention for the purpose of avoiding repetition, naturally also apply accordingly to the other aspects of the invention, without this requiring a separate mention.

Furthermore, it goes without saying that individual aspects and embodiments of the present invention are also considered disclosed in any combination with other aspects and embodiments of the present invention and, especially, any combination of features and embodiments, as it results from back references of all patent claims, is also considered extensively disclosed with regard to all resulting combination possibilities.

With respect to all relative or percentage weight-based data provided below, especially relative quantity or weight data, it should further be noted that within the scope of the present invention these are to be selected by the person skilled in the art such that they always add up to 100% or 100% by weight, respectively, including all components or ingredients, especially as defined below; however, this is self-evident for the person skilled in the art.

In addition, the skilled person may, if necessary, deviate from the following range specifications without leaving the scope of the present invention.

Additionally, it applies that all values or parameters or the like specified in the following can be determined or identified in principle with standardized or explicitly specified determination methods or otherwise with the determination or measurement methods that are otherwise familiar to a person skilled in the art.

Having stated this, the present invention will be described in more detail hereinafter:

DETAILED DESCRIPTION OF THE INVENTION

Figure 1:
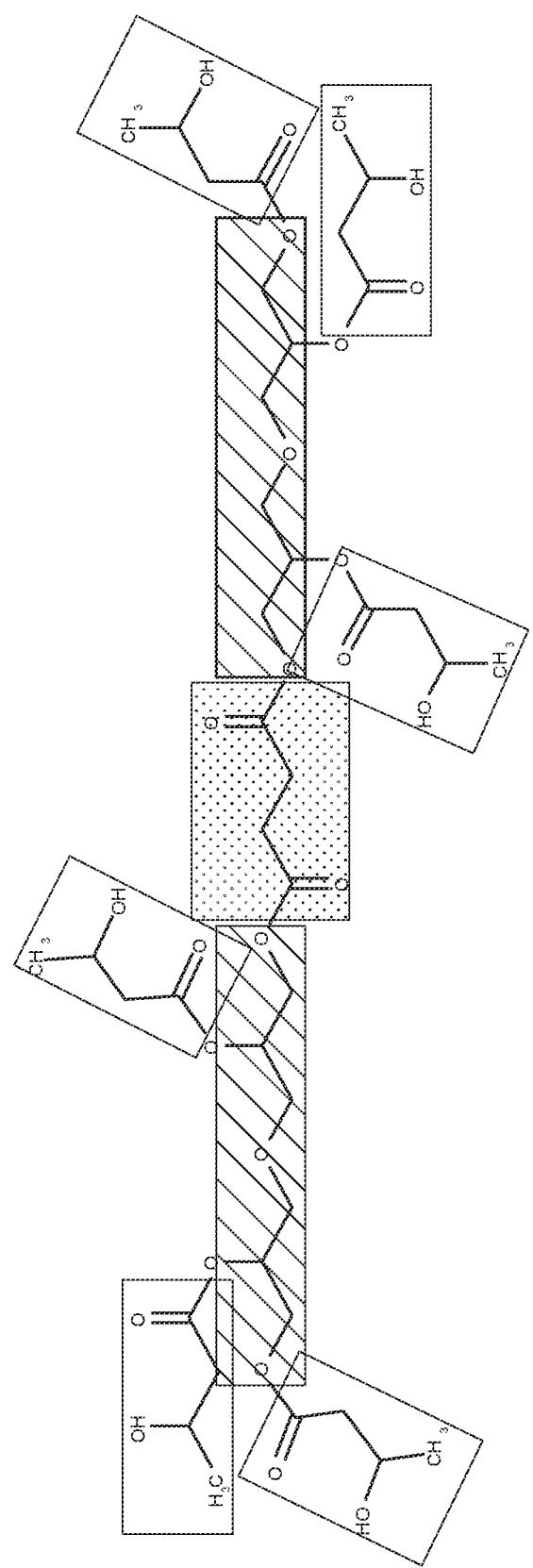
FIG. 1a provides a visualization of tridiglycerol esters of 3-hydroxybutyric acid crosslinked with succinic acid according to a particular and purely exemplary embodiment.

The subject-matter of the present invention—according to a first aspect of the present invention—is thus a method for producing polyglycerol esters of 3-hydroxybutyric acid crosslinked with polycarboxylic acids, wherein
(i) at least one 3-hydroxybutyric acid compound of the general formula (I)

$$CH_3-CH(OH)-CH_2-C(O)OR^1 \quad (I)$$

wherein, in the general formula (I), the radical $R^1$ represents hydrogen, a radical $-(O)C-CH_2-CH(OH)-CH_3$ or $C_1$-$C_4$-alkyl, especially $C_1$-$C_4$-alkyl, preferably methyl or ethyl, more preferably ethyl,
(ii) at least one polyglycerol (II) and
(iii) at least one polycarboxylic acid (III), especially at least one polycarboxylic acid comprising at least two carboxyl groups,
are reacted and/or caused to react with one another,
so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained.

Thus, according to the present invention, there is provided especially a production method for polyglycerol esters of 3-hydroxybutyric acid crosslinked with polycarboxylic acids.

In the inventive method, the 3-hydroxybutyric acid compound of the general formula (I) thus acts as an esterification acid and reacts therewith especially with a hydroxyl group of the polyglycerol (II).

In the context of the present invention, the polycarboxylic acid (III) used is an organic polycarboxylic acid; i.e. the polycarboxylic acid (III) is an organic compound with multiple carboxyl groups ($-COOH$), which consequently has an acidic character.

The polyglycerol esters obtained according to the invention are esters of polyglycerol (such as diglycerol) and precisely not polyesterified glycerol (i.e. especially n mono-, di- and triglycerides, i.e. the mono-, di- and tri-valent esters of glycerol or of 1,2,3-propanetriol, respectively).

Thus, in the context of the present invention, monovalence and polyvalence refer to the number of esterified groups of the polyglycerol (i.e. groups esterified with 3-hydroxybutyric acid).

Surprisingly, the applicant has found an efficient as well as effective way to provide 3-hydroxybutyric acid or its derivative in a physiologically as well as organoleptically compatible form, wherein the 3-hydroxybutyric acid can still be readily released, especially by the animal or human body.

Furthermore, the applicant has succeeded in providing the organoleptically and physiologically compatible form of 3-hydroxybutyric acid in such a way that a retardation effect is present; i.e. the 3-hydroxybutyric acid is released continuously over a longer period of time, especially by the human or animal body.

In addition, the other degradation or cleavage products (i.e. the cleavage products released in addition to 3-hydroxybutyric acid) can be utilized by the body, or at least processed by the body. Especially, cleavage products are released which are reactants, products or intermediates of the citrate cycle or are derivatives or salts formed by oxidation of a reactant, product or intermediate of the citrate cycle. Thus, the further degradation or cleavage products formed during the release of 3-hydroxybutyric acid can also be used as an energy source by the animal or human body. These cleavage products are typically the polycarboxylic acid (III). In addition, the polyglycerol (II) is a non-toxic and physiologically compatible carrier that is readily excreted by the body.

By using polyglycerol, which has a large number of hydroxyl groups, it is possible to provide a molecule with a high density of active ingredients, especially a high density of 3-hydroxybutanoates or 3-BHB or corresponding derivatives. Furthermore, in this context, a high density can also be provided of polycarboxylic acids, which—as previously stated—can be used as a further energy source by the animal and/or human body. Furthermore, a high crosslinking density can also be obtained. Generally gel-like products are obtained, which release 3-BHB and the polycarboxylic acid as a further energy source in a controlled or retarded manner under physiological conditions.

As stated above, the applicant has, quite surprisingly, discovered that the polyglycerol esters of 3-hydroxybutyric acid crosslinked with polycarboxylic acids, especially mono- or polyvalent polyglycerol esters of 3-hydroxybutyric acid crosslinked with polycarboxylic acids, thus produced are efficient, since physiologically compatible and also organoleptically compatible precursors and/or metabolites of 3-hydroxybutyric acid or their salts, which can also be used in larger quantities in pharmaceutical or clinical applications.

The above-mentioned polyglycerol esters of 3-hydroxybutyric acid crosslinked with polycarboxylic acids, especially mono- or polyvalent polyglycerol esters of 3-hydroxybutyric acid crosslinked with polycarboxylic acids, which are accessible for the first time in an efficient manner through the production method according to the invention, thus represent a physiologically and pharmacologically relevant alternative to free 3-hydroxybutyric acid or its salts and are moreover organoleptically compatible.

The production of polyglycerol esters of 3-hydroxybutyric acid crosslinked with polycarboxylic acids, especially mono- or polyvalent polyglycerol esters of 3-hydroxybutyric acid crosslinked with polycarboxylic acids, by means of conventional organic synthesis is complex and costly, since 3-hydroxybutyric acid as well as its salts and esters have an increased tendency to polymerize and to undergo other undesirable side reactions (e.g. dehydration, decomposition, etc.). Within the scope of the present invention, it was possible for the first time to provide an efficiently working production method with which polyglycerol esters of 3-hydroxybutyric acid crosslinked with polycarboxylic acids, especially mono- or polyvalent polyglycerol esters of 3-hydroxybutyric acid crosslinked with polycarboxylic acids, can be produced with reduced formation of by-product.

The inventive method thus makes it possible for the first time to provide non-toxic polyglycerol esters of 3-hydroxybutyric acid crosslinked with polycarboxylic acids, especially mono- or polyvalent polyglycerol esters of 3-hydroxybutyric acid crosslinked with polycarboxylic acids, from known, commercially available and above all physiologically harmless components or educts (starting compounds). The resulting polyglycerol esters of 3-hydroxybutyric acid crosslinked with polycarboxylic acids, especially mono- or polyvalent polycerol esters of 3-hydroxybutyric acid crosslinked with polycarboxylic acids, can be broken down physiologically, especially in the stomach and/or bowl, and release or generate the target molecule "3-hydroxybutyric acid" or its salts or esters as active ingredient or active component.

In addition, the aforementioned polyglycerol esters of 3-hydroxybutyric acid crosslinked with polycarboxylic acids, especially mono- or polyvalent polyglycerol esters of 3-hydroxybutyric acid crosslinked with polycarboxylic acids, also comprise an acceptable taste to ensure compatibility even when administered orally in larger quantities over a longer period of time (e.g. administration of 50 g daily dose or more).

Similarly, the production method according to the invention makes it possible to provide the polyglycerol esters of 3-hydroxybutyric acid crosslinked with polycarboxylic acids, especially mono- or polyvalent polyglycerol esters of 3-hydroxybutyric acid crosslinked with polycarboxylic acids, free from toxic impurities.

In addition, with appropriate starting materials, the method can also be carried out enantioselectively. For example, according to the invention, the production method allows the biologically relevant form, i.e. the (R)-enantiomer of BHB, to be enriched, for example by enzyme catalysis or the targeted selection of the starting materials (reactants), as not to burden the renal system of patients when administered orally (i.e. elimination via the kidneys). In principle, however, it is also possible, and under certain conditions may be useful, to enrich the (S)-enantiomer of BHB.

In addition, the inventive production method, including optional further processing or purification steps, can be operated economically and can also be implemented on a large scale.

Especially, the inventive production method uses commercially available starting compounds or starting compounds, which can be synthesized by simple methods that can be carried out on a large scale, and furthermore allows a relatively simple process management even in case of large-scale implementation.

In contrast to conventional prior art production methods, the production method according to the invention does not use complex starting materials and does not use protective groups. Nevertheless, excellent yields are achieved in accordance with the invention, wherein the formation of by-products is minimized or avoided.

In addition, the inventive method is simple and economical. Especially, the method according to the invention is usually carried out in the absence of solvents and/or without any solvent (i.e. as a reaction in mass or as a reaction in substance or as a so-called bulk reaction); consequently, the reaction products obtained are not contaminated with solvent and no solvent has to be removed and disposed of or recycled in a costly and energy-intensive manner after the method or reaction has been carried out. Furthermore, no toxic by-products are formed.

The production method according to the invention usually results in a mixture of different polyglycerol esters of 3-hydroxybutyric acid crosslinked with polycarboxylic acids, especially mono- or polyvalent polyglycerol esters of 3-hydroxybutyric acid crosslinked with polycarboxylic acids, i.e. in a mixture of at least two different polyglycerol esters of 3-hydroxybutyric acid crosslinked with polycarboxylic acids, especially mono- or polyvalent polyglycerol esters of 3-hydroxybutyric acid crosslinked with polycarboxylic acids. The resulting raw reaction product or raw mixture can be purified by known methods, especially by removing any remaining starting compounds and/or any by-products present, and furthermore—if desired—can be separated by known methods, especially by distillation and/or chromatography (e.g. fractionation into the individual polyglycerol esters of 3-hydroxybutyric acid crosslinked with polycarboxylic acids, i.e. e.g. separation of the respective monoesters, diesters etc., or else fractionation into fractions with enriched and depleted portions of individuals etc.).

Thus, as previously stated, according to the first aspect, the present invention refers to a method for producing polyglycerol esters of 3-hydroxybutyric acid crosslinked with polycarboxylic acids,
wherein
(i) at least one 3-hydroxybutyric acid compound of the general formula (I)

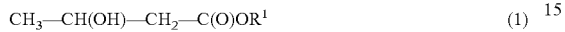

wherein, in the general formula (I), the radical $R^1$ represents hydrogen, a radical —(O)C—CH$_2$—CH(OH)—CH$_3$ or $C_1$-$C_4$-alkyl, especially $C_1$-$C_4$-alkyl, preferably methyl or ethyl, more preferably ethyl,
(ii) at least one polyglycerol (II) and
(iii) at least one polycarboxylic acid (III), especially at least one polycarboxylic acid comprising at least two carboxyl groups,
are reacted and/or caused to react with one another, so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained.

Especially, the method according to the invention may be carried out in several stages, especially in two stages. If the method according to the invention is carried out in multiple stages, the number of by-products can be reduced, for example by purification of the reaction intermediates.

As described in more detail below, the multi-step, especially two-step procedure can proceed especially in such a way that first at least one 3-hydroxybutyric acid compound of the general formula (I) is reacted and/or caused to react with at least one polyglycerol (II), followed by further reaction of the resulting reaction intermediate product (IV'A) with at least one polycarboxylic acid (III) (synthesis route (A)) or else that at least one polyglycerol (II) is first reacted and/or caused to react with at least one polycarboxylic acid (III), followed by further reaction of the resulting reaction intermediate product (IV'B) with at least one 3-hydroxybutyric acid compound of the general formula (I) (synthesis route (B)).

According to a particular embodiment, the present invention also refers, in accordance with this aspect of the invention, to a method for producing polyglycerol esters of 3-hydroxybutyric acid crosslinked with polycarboxylic acids, especially a method as described hereinabove,
wherein, according to a (first) synthesis route (A):
(a) in a first method step (a), at least one 3-hydroxybutyric acid compound of the general formula (I)

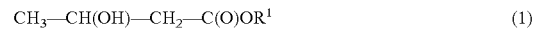

wherein, in the general formula (I), the radical $R^1$ represents hydrogen, a radical —(O)C—CH$_2$—CH(OH)—CH$_3$ or $C_1$-$C_4$-alkyl, especially $C_1$-$C_4$-alkyl, preferably methyl or ethyl, more preferably ethyl,
is reacted and/or caused to react with at least one polyglycerol (II), especially in an esterification reaction and/or under esterification conditions,
especially so that, as a reaction intermediate product (IVA') of the method step (a), one or more polyglycerol esters of 3-hydroxybutyric acid, especially one or more mono- or polyvalent polyglycerol esters of 3-hydroxybutyric acid, are obtained; and
(b) subsequently, in a second method step (b), the reaction intermediate product (IVA') obtained in method step (a) is reacted and/or caused to react with at least one polycarboxylic acid (III), especially with at least one polycarboxylic acid comprising at least two carboxyl groups, especially reacted and/or caused to react in an esterification reaction and/or under esterification conditions,
so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained.

In the following, there is an exemplary and non-limiting description of a possible course of the (first) synthesis route (A) based on the reaction of 3-hydroxybutyric acid ethyl ester, diglycerol and succinic acid anhydride which takes place in method step (a) shown. In the first method step (a), 3-hydroxybutyric acid ethyl ester and diglycerol are reacted and, especially, the mono-, di- and tridiglycerol esters of 3-hydroxybutyric acid are formed. In the subsequent (second) method step (b), these mono-, di- and tridiglycerol esters of 3-hydroxybutyric acid are then reacted with succinic acid anhydride. In the following scheme a non-limiting selection of products and by-products is shown:

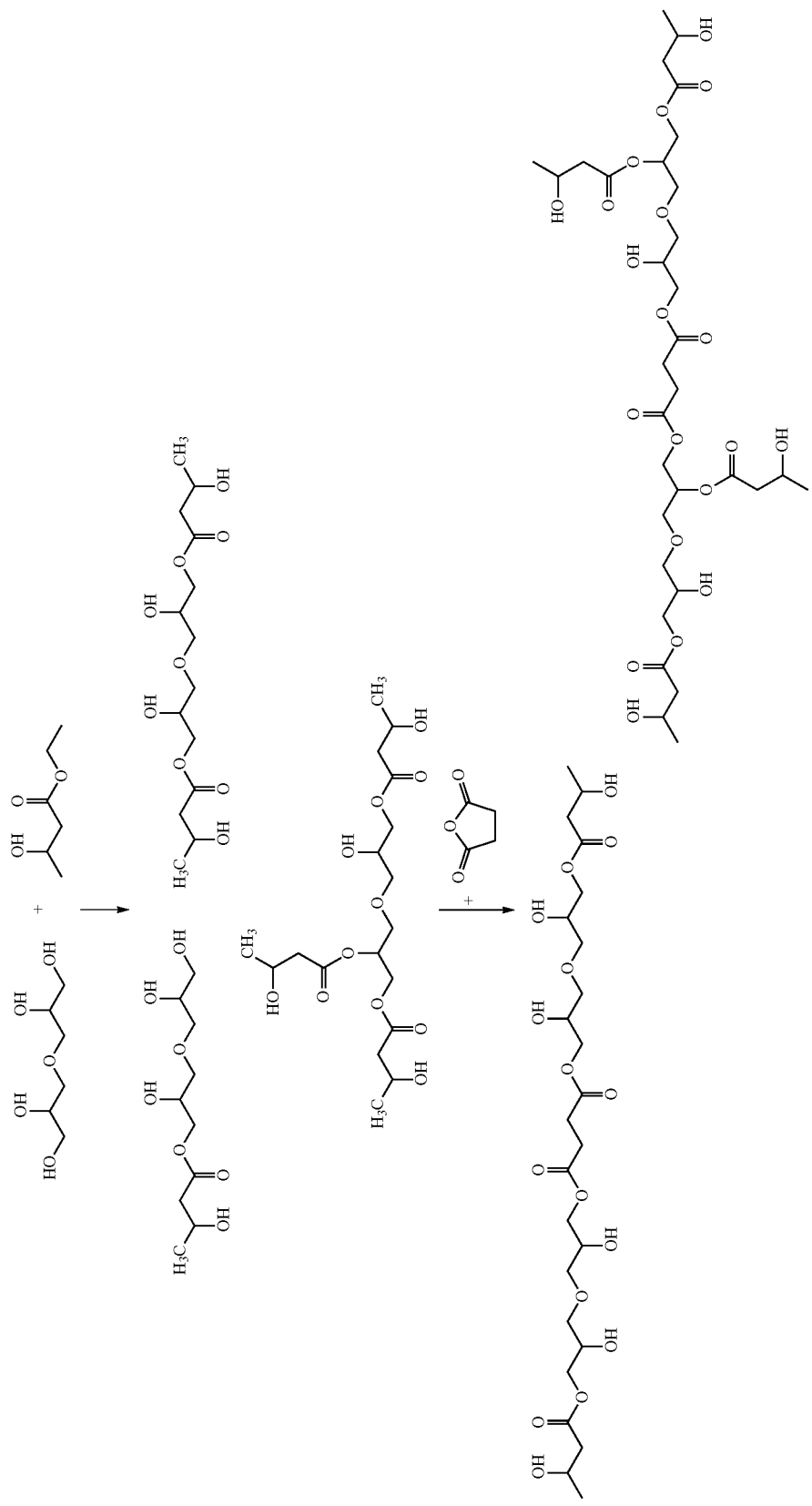

-continued
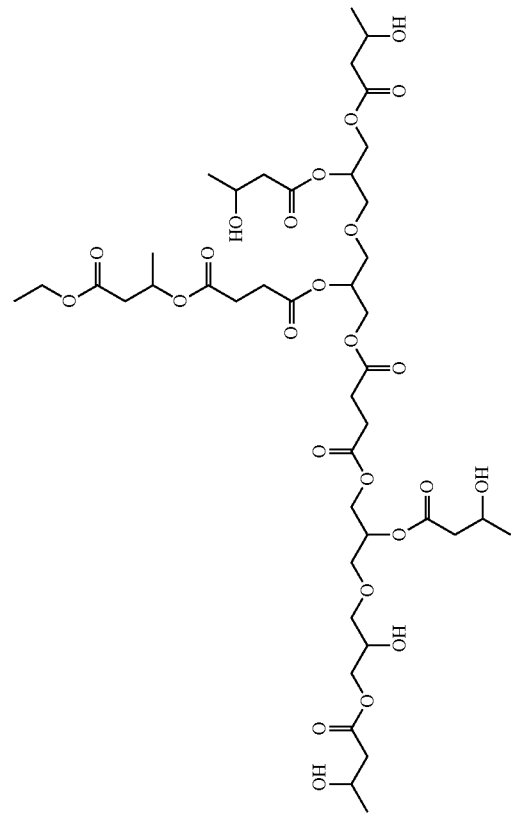
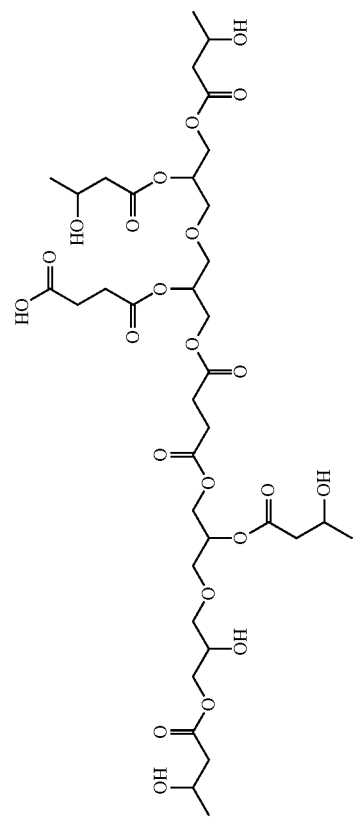

According to an alternative particular embodiment, the present invention also refers, in accordance with this aspect of the invention, to a method for producing polyglycerol esters of 3-hydroxybutyric acid crosslinked with polycarboxylic acids, especially a method as described hereinabove, wherein, according to a (second) synthesis route (B):

(a) in a first method step (a), at least one polyglycerol (II) is reacted and/or caused to react with at least one polycarboxylic acid (III), especially with at least one polycarboxylic acid comprising at least two carboxyl groups, especially reacted and/or caused to react in an esterification reaction and/or under esterification conditions, especially so that, as a reaction intermediate product (IVB') of method step (a), one or more polyglycerol esters of the polycarboxylic acid (III), especially one or more mono- or polyvalent polyglycerol esters of the polycarboxylic acid (III), are obtained; and (b) subsequently, in a second method step (b), the reaction intermediate product (IVB') obtained in method step (a) is reacted and/or caused to react with at least one 3-hydroxybutyric acid compound of the general formula (I)

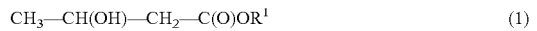

CH$_3$—CH(OH)—CH$_2$—C(O)OR$^1$     (1)

wherein, in the general formula (I), the radical R$^1$ represents hydrogen, a radical —(O)C—CH$_2$—CH(OH)—CH$_3$ or C$_1$-C$_4$-alkyl, especially C$_1$-C$_4$-alkyl, preferably methyl or ethyl, more preferably ethyl, especially reacted and/or caused to react in an esterification reaction and/or under esterification conditions, so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained.

In the following, there is an exemplary and non-limiting description of a possible course of the (second) synthesis route (B) based on the reaction of ethyl 3-hydroxybutyric acid ester, diglycerol and succinic acid anhydride shown. In the first method step (a), diglycerol and succinic acid anhydride are reacted and polyglycerol esters of succinic acid are formed, with only a non-limiting selection shown in the following scheme. In the subsequent (second) method step (b), the polyglycerol esters of succinic acid are reacted with ethyl 3-hydroxybutyric acid ester. In the following scheme, a non-limiting selection of products and by-products is shown, wherein R represents hydrogen or —C(O)—CH$_2$—CH(OH)—CH$_3$.

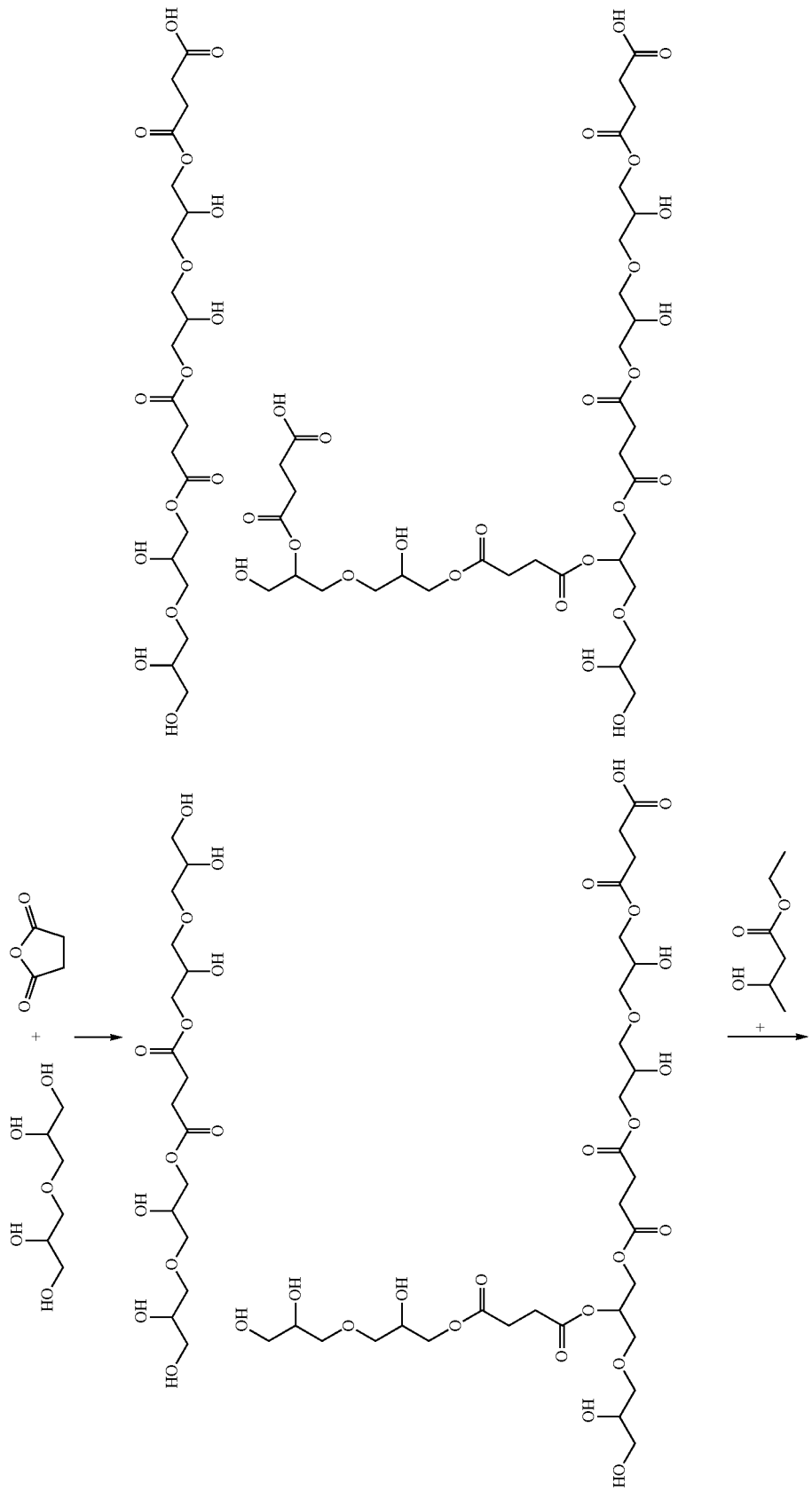

-continued
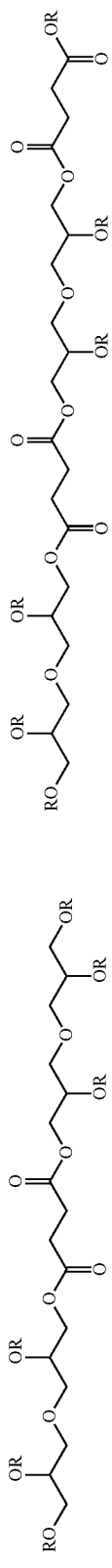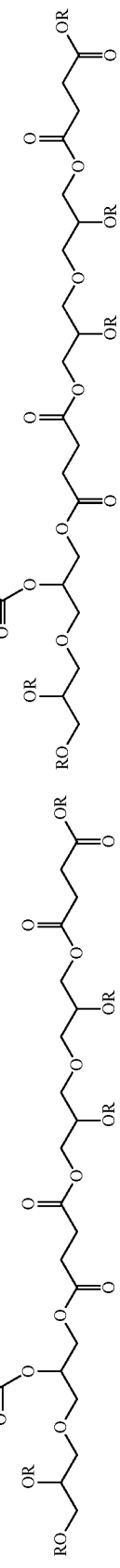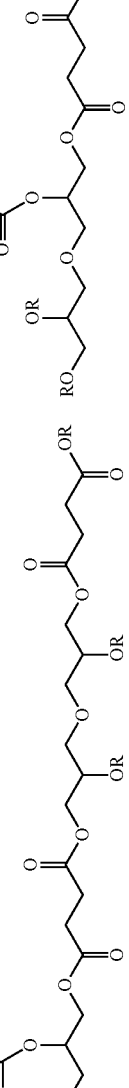

Overall, in accordance with this aspect of the invention, the present invention further relates to a method for producing polyglycerol esters of 3-hydroxybutyric acid crosslinked with polycarboxylic acids, especially a method as described hereinabove, wherein, according to a (first) synthesis route (A):

(a) in a first method step (a), at least one 3-hydroxybutyric acid compound of the general formula (I)

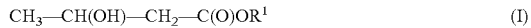

CH$_3$—CH(OH)—CH$_2$—C(O)OR$^1$ (I)

wherein, in the general formula (I), the radical R$^1$ represents hydrogen, a radical —(O)C—CH$_2$—CH(OH)—CH$_3$ or C$_1$-C$_4$-alkyl, especially C$_1$-C$_4$-alkyl, preferably methyl or ethyl, more preferably ethyl, is reacted and/or caused to react with at least one polyglycerol (II), especially reacted and/or caused to react in an esterification reaction and/or under esterification conditions, especially so that, as a reaction intermediate product (IVA') of the method step (a), one or more polyglycerol esters of 3-hydroxybutyric acid, especially one or more mono- or polyvalent polyglycerol esters of 3-hydroxybutyric acid, are obtained; and (b) subsequently, in a second method step (b), the reaction intermediate product (IVA') obtained in method step (a) is reacted and/or caused to react with at least one polycarboxylic acid (III), especially with at least one polycarboxylic acid comprising at least two carboxyl groups, especially reacted and/or caused to react in an esterification reaction and/or under esterification conditions, so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained;

or else wherein, according to a (second, alternative to (A)) synthesis route (B):

(a) in a first method step (a), at least one polyglycerol (II) is reacted and/or caused to react with at least one polycarboxylic acid (III), especially with at least one polycarboxylic acid comprising at least two carboxyl groups, especially reacted and/or caused to react in an esterification reaction and/or under esterification conditions, especially so that, as a reaction intermediate product (IVB') of the method step (a), one or more polyglycerol esters of the polycarboxylic acid (III), especially one or more mono- or polyvalent polyglycerol esters of the polycarboxylic acid (III), are obtained; and (b) subsequently, in a second method step (b), the reaction intermediate product (IVB') obtained in method step (a) is reacted and/or caused to react with at least one 3-hydroxybutyric acid compound of the general formula (I)

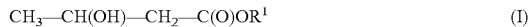

CH$_3$—CH(OH)—CH$_2$—C(O)OR$^1$ (I)

wherein, in the general formula (I), the radical R$^1$ represents hydrogen, a radical —(O)C—CH$_2$—CH(OH)—CH$_3$ or C$_1$-C$_4$-alkyl, especially C$_1$-C$_4$-alkyl, preferably methyl or ethyl, more preferably ethyl, especially reacted and/or caused to react in an esterification reaction and/or under esterification conditions, so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained.

According to a particular embodiment of the present invention, the 3-hydroxybutyric acid compound of the general formula (I) may be used in racemic form or in the form of the (R)-enantiomer. The (R) configuration refers to the chiral carbon atom at the 3-position of the 3-hydroxybutyric acid compound of the general formula (I).

According to the invention, it is preferred if, in the general formula (I), the radical R$^1$ represents ethyl.

In other words, it is preferred according to the invention that, as 3-hydroxybutyric acid of the general formula (I), ethyl 3-hydroxybutyrate (synonymously also referred to as 3-hydroxybutyric acid ethyl ester or 4-ethoxy-4-oxo-2-butanol) of the formula CH$_3$—CH(OH)—CH$_2$—C(O)OC$_2$H$_5$; is used.

This enables particularly efficient process control and high yields with minimized by-product formation. In addition, the 3-hydroxybutyric acid ethyl ester or 4-ethoxy-4-oxo-2-butanol is also commercially available in large quantities and can be readily obtained, especially on a large scale (e.g. by Claisen condensation of ethyl acetate).

According to a particular embodiment of the method according to the invention, the polyglycerol (II) may correspond to the general formula (IIa)

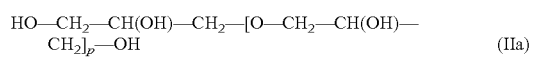

HO—CH$_2$—CH(OH)—CH$_2$—[O—CH$_2$—CH(OH)—CH$_2$]$_p$—OH (IIa)

wherein, in the general formula (IIa), the variable p represents an integer from 1 to 6, especially from 1 to 4, preferentially 1 or 2, more preferably 1.

According to a further particular embodiment of the method of the invention, the polyglycerol (II) may be a diglycerol of formula (IIb)

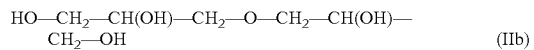

HO—CH$_2$—CH(OH)—CH$_2$—O—CH$_2$—CH(OH)—CH$_2$—OH (IIb)

Especially, the polyglycerol (II) is not propane-1,2,3-triol (glycerol).

According to a particular embodiment of the present invention, the polycarboxylic acid (III) may be used in the form of the free polycarboxylic acid, in the form of a salt of the polycarboxylic acid, in the form of a polycarboxylic acid ester or in the form of the polycarboxylic acid anhydride, especially in the form of the free polycarboxylic acid or in the form of the polycarboxylic acid anhydride, preferably in the form of the polycarboxylic acid anhydride, more preferably in the form of a cyclic polycarboxylic acid anhydride.

The anhydrides of the polycarboxylic acid are particularly reactive and are especially suitable for esterification reactions. When cyclic anhydrides are used, no cleavage products are formed in the course of an esterification reaction, which may require energy-intensive removal.

According to another particular embodiment of the present invention, the polycarboxylic acid (III) may correspond to the general formula (IIIa)

HOOC—X'—COOH (IIIa)

wherein, in the general formula (IIIa), X' represents a saturated or unsaturated and optionally mono- or polysubstituted, especially substituted with one or more hydroxyl radicals and/or carboxyl radicals, organic radical comprising 1 to 10, preferentially 2 to 6 carbon atoms;

especially wherein at least one carboxyl group (COOH-group), preferentially both carboxyl groups (COOH groups), is/are terminal and/or is/are a primary carboxyl group (COOH-group).

In this context, it is particularly preferred if, in the general formula (IIIa), X' represents a saturated or unsaturated and optionally mono- or polysubstituted, especially substituted with one or more hydroxyl radicals and/or carboxyl radicals, organic radical comprising 2 to 6 carbon atoms; especially wherein at least one carboxyl group (COOH-group), preferentially both carboxyl groups (COOH groups), is/are terminal and/or is/are a primary carboxyl group (COOH-group).

Especially, by using a previously defined polycarboxylic acid with at least one, preferentially two, terminal or primary carboxyl groups, esterification reactions can proceed particularly effectively and with minimized by-product formation without the need for extreme reaction conditions (e.g. very high temperature, very low pressure, etc.). In addition, the degree of crosslinking (i.e. degree of branching) can be influenced by the number of carboxyl groups present.

In the method according to the invention, it may be preferred if the polycarboxylic acid (III) is selected from the group of succinic acid, tartaric acid, citric acid, malic acid, adipic acid, fumaric acid and maleic acid and their anhydrides as well as combinations or mixtures thereof, especially selected from the group of succinic acid, tartaric acid, citric acid, malic acid, adipic acid and fumaric acid and their anhydrides as well as combinations or mixtures thereof, preferably selected from the group of succinic acid and adipic acid and their anhydrides as well as combinations or mixtures thereof.

The aforementioned carboxylic acids are commercially available and also readily reactable in esterification reactions.

Especially, it is preferred in the method according to the invention if the polycarboxylic acid (III) is a naturally occurring carboxylic acid or its anhydride or derivative, especially reaction product, especially a carboxylic acid or its anhydride or derivative, especially reaction product, occurring in human and/or animal metabolism.

Especially, it is advantageous in this context if carboxylic acids or anhydrides or derivatives thereof are used which occur in the citrate cycle, result from the citrate cycle or are associated with the citrate cycle. In this context, derivatives can represent, for example, salts or esters which are obtainable by oxidation of a metabolic product (for example, from the citrate cycle). By using carboxylic acids or anhydrides or derivatives thereof, which represent part of the human and/or animal metabolism or reactant or product or intermediate of a human and/or animal metabolism, a further energy source (in addition to the keto body 3-hydroxybutyric acid or 3-hydroxybutanoate) can be provided to the human and/or animal body when using the reaction product according to the invention. The inventive reaction products are particularly suitable for the use in or as medicaments, drugs or food and food products.

Furthermore, it may also be preferred in the context of the method according to the invention, if the polycarboxylic acid (III) is an ingredient, especially an additive, approved under food law.

Ingredients or additives approved under food law are permitted for use in food in certain quantities and do not pose any health risks. A list of food additives is maintained throughout the EU, wherein each food additive is given its own label (so-called E-number). For example, the following carboxylic acids are included in the food additive list: succinic acid (E363), tartaric acid (E334), citric acid (E330), malic acid (E296), adipic acid (E355) and fumaric acid (E297). These acids are all part of the citrate cycle or obtainable by oxidation of a metabolic product of the citrate cycle. The citrate cycle is a cycle of biochemical reactions that plays an important role in the metabolism of aerobic cells of living organisms and is mainly used for the oxidative degradation of organic substances for the purpose of energy production and the provision of intermediates for biosynthesis. Thus, the acids formed by degradation when using the reaction product (IV) obtainable from the inventive method can be utilized by the body as another alternative source of energy.

According to a particular embodiment, the present invention refers, in accordance with this aspect of the invention, to a method for producing polyglycerol esters of 3-hydroxybutyric acid crosslinked with polycarboxylic acids, especially a method as described hereinabove, wherein, according to a (first) synthesis route (A):
(a) in a first method step (a), at least one 3-hydroxybutyric acid compound of the general formula (I)

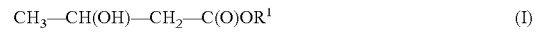

wherein, in the general formula (I), the radical $R^1$ represents hydrogen, a radical —(O)C—CH$_2$—CH(OH)—CH$_3$ or $C_1$-$C_4$-alkyl, especially $C_1$-$C_4$-alkyl, preferably methyl or ethyl, more preferably ethyl,
is reacted and/or caused to react with at least one polyglycerol (II) of the general formula (IIa)

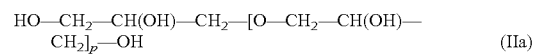

wherein, in the general formula (IIa), the variable p represents an integer from 1 to 6, especially from 1 to 4, preferentially 1 or 2, more preferably 1,
especially reacted and/or caused to react in an esterification reaction and/or under esterification conditions,
especially so that, as a reaction intermediate product (IVA') of the method step (a), one or more polyglycerol esters of 3-hydroxybutyric acid, especially one or more mono- or polyvalent polyglycerol esters of 3-hydroxybutyric acid, are obtained; and
(b) subsequently, in a second method step (b), the reaction intermediate product (IVA') obtained in method step (a) is reacted and/or caused to react with at least one polycarboxylic acid (III), especially with at least one polycarboxylic acid comprising at least two carboxyl groups, especially reacted and/or caused to react in an esterification reaction and/or under esterification conditions,
so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained;
or else
wherein, according to a (second, alternative to (A)) synthesis route (B):
(a) in a first method step (a), at least one polyglycerol (II) of the general formula (IIa)

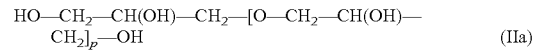

wherein, in the general formula (IIa), the variable p represents an integer from 1 to 6, especially from 1 to 4, preferentially 1 or 2, more preferably 1, is reacted and/or caused to react with at least one polycarboxylic acid (III), especially with at least one polycarboxylic acid comprising at least two carboxyl groups, especially reacted and/or caused to react in an esterification reaction and/or under esterification conditions, especially so that, as a reaction intermediate product (IVB') of method step (a), one or more polyglycerol esters of the polycarboxylic acid (III), especially one or more mono- or polyvalent polyglycerol esters of the polycarboxylic acid (III), are obtained; and (b) subsequently, in a second method step (b), the reaction intermediate product (IVB') obtained in method step (a) is reacted and/or caused to react with at least one 3-hydroxybutyric acid compound of the general formula (I)

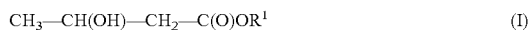

$$CH_3\text{—}CH(OH)\text{—}CH_2\text{—}C(O)OR^1 \qquad (I)$$

wherein, in the general formula (I), the radical $R^1$ represents hydrogen, a radical —(O)C—$CH_2$—CH(OH)—$CH_3$ or $C_1$-$C_4$-alkyl, especially $C_1$-$C_4$-alkyl, preferably methyl or ethyl, more preferably ethyl, especially reacted and/or caused to react in an esterification reaction and/or under esterification conditions, so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained.

According to a further preferred embodiment, the present invention according to this aspect of the invention also refers to a method for producing polyglycerol esters of 3-hydroxybutyric acid crosslinked with polycarboxylic acids, especially a method as described hereinabove, wherein, according to a (first) synthesis route (A):

(a) in a first method step (a), at least one 3-hydroxybutyric acid compound of the general formula (I)

$$CH_3\text{—}CH(OH)\text{—}CH_2\text{—}C(O)OR^1 \qquad (I)$$

wherein, in the general formula (I), the radical $R^1$ represents hydrogen, a radical —(O)C—$CH_2$—CH(OH)—$CH_3$ or $C_1$-$C_4$-alkyl, especially $C_1$-$C_4$-alkyl, preferably methyl or ethyl, more preferably ethyl, is reacted and/or caused to react with at least one polyglycerol (II) of the general formula (IIa)

$$HO\text{—}CH_2\text{—}CH(OH)\text{—}CH_2\text{—}[O\text{—}CH_2\text{—}CH(OH)\text{—}CH_2]_p\text{—}OH \qquad (IIa)$$

wherein, in the general formula (IIa), the variable p represents an integer from 1 to 6, especially from 1 to 4, preferentially 1 or 2, more preferably 1, especially reacted and/or caused to react in an esterification reaction and/or under esterification conditions, especially so that, as a reaction intermediate product (IVA') of the method step (a), one or more polyglycerol esters of 3-hydroxybutyric acid, especially one or more mono- or polyvalent polyglycerol esters of 3-hydroxybutyric acid, are obtained; and (b) subsequently, in a second method step (b), the reaction intermediate product (IVA') obtained in method step (a) is reacted and/or caused to react with at least one polycarboxylic acid (III) selected from the group of succinic acid, tartaric acid, citric acid, malic acid, adipic acid, fumaric acid and maleic acid as well as their anhydrides and combinations or mixtures thereof, especially selected from the group of succinic acid, tartaric acid citric acid, malic acid, adipic acid and fumaric acid and their anhydrides as well as combinations or mixtures thereof, preferably selected from the group of succinic acid and adipic acid and their anhydrides as well as combinations or mixtures thereof, especially reacted and/or caused to react in an esterification reaction and/or under esterification conditions, so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained;

or else wherein, according to a (second, alternative to (A)) synthesis route (B):

(a) in a first method step (a), at least one polyglycerol (II) of the general formula (IIa)

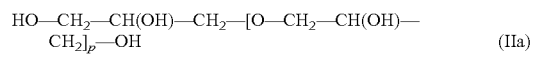

$$HO\text{—}CH_2\text{—}CH(OH)\text{—}CH_2\text{—}[O\text{—}CH_2\text{—}CH(OH)\text{—}CH_2]_p\text{—}OH \qquad (IIa)$$

wherein, in the general formula (IIa), the variable p represents an integer from 1 to 6, especially from 1 to 4, preferentially 1 or 2, more preferably 1, is reacted and/or caused to react with at least one polycarboxylic acid (III) selected from the group of succinic acid, tartaric acid, citric acid, malic acid, adipic acid, fumaric acid and maleic acid and their anhydrides as well as combinations or mixtures thereof, especially selected from the group of succinic acid, tartaric acid, citric acid, malic acid, adipic acid and fumaric acid, adipic acid and fumaric acid and their anhydrides as well as combinations or mixtures thereof, preferably selected from the group of succinic acid and adipic acid and their anhydrides as well as combinations or mixtures thereof, especially reacted and/or caused to react in an esterification reaction and/or under esterification conditions, especially so that, as a reaction intermediate product (IVB') of method step (a), one or more polyglycerol esters of the polycarboxylic acid (III), especially one or more mono- or polyvalent polyglycerol esters of the polycarboxylic acid (III), are obtained; and (b) subsequently, in a second method step (b), the reaction intermediate product (IVB') obtained in method step (a) is reacted and/or caused to react with at least one 3-hydroxybutyric acid compound of the general formula (I)

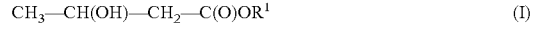

$$CH_3\text{—}CH(OH)\text{—}CH_2\text{—}C(O)OR^1 \qquad (I)$$

wherein, in the general formula (I), the radical $R^1$ represents hydrogen, a radical —(O)C—$CH_2$—CH(OH)—$CH_3$ or $C_1$-$C_4$-alkyl, especially $C_1$-$C_4$alkyl, preferably methyl or ethyl, more preferably ethyl, especially reacted and/or caused to react in an esterification reaction and/or under esterification conditions, so that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, are obtained.

According to a particular embodiment of the present invention, the method, especially the first method step (a)

and/or the second method step (b), preferentially the first method step (a) and the second method step (b), may be carried out in the absence of solvents and/or without any solvent, I.e. the method or the first method step (a) and/or the second method step (b) or the first method step (a) and the second method step (b) is/are thus carried out as a reaction in bulk or as a reaction in substance or as a so-called bulk reaction. This has the advantage that the reaction products obtained are not contaminated with solvent and no solvent has to be removed and disposed of or recycled in a costly and energy-intensive manner after the method or reaction has been carried out Surprisingly, the method or reaction nevertheless proceeds with high conversions and yields and at least essentially without significant by-product formation.

According to a particular embodiment, it is possible that the inventive method, especially the first method step (a) and/or the second method step (b), preferentially the first method step (a) and the second method step (b), may be carried out in the absence of a catalyst and/or without any catalyst, or else may be carried out in the presence of a catalyst, especially an enzyme and/or a metal-containing and/or metal-based, acidic or basic catalyst (especially wherein the catalyst is recycled after the reaction).

As stated before, according to a particular embodiment of the production method according to the invention, the method, especially the first method step (a) and/or the second method step (b), preferentially the first method step (a) and the second method step (b), may be carried out in the absence of a catalyst and/or without any catalyst If the method, especially the first method step (a) and/or the second method step (b), preferentially the first method step (a) and the second method step (b), is carried out in the absence of a catalyst and/or without any catalyst, it is preferred if the method, especially the first method step (a) and/or the second method step (b), preferentially the first method step (a) and the second method step (b), is carried out at temperatures in the range of from 20° C. to 160° C., especially in the range of from 50° C. to 150° C., preferentially in the range of from 70° C. to 140° C., more preferably in the range of from 80° C. to 135° C., even more preferably in the range of from 100° C. to 130° C.

In the case of carrying out the method, especially the first method step (a) and/or the second method step (b), preferentially the first method step (a) and the second method step (b), in the absence of a catalyst, the applied pressure range can vary within wide ranges. Especially, the method, especially the first method step (a) and/or the second method step (b), preferentially the first method step (a) and the second method step (b), may be carried out in the absence of a catalyst and/or without any catalyst at a pressure in the range of from 0.0001 bar to 10 bar, especially in the range of from 0.001 bar to 5 bar, preferentially in the range of from 0.01 bar to 2 bar, more preferably in the range of from 0.05 bar to 1 bar, even more preferably at about 1 bar.

When carrying out the method, especially the first method step (a) and/or the second method step (b), preferentially the first method step (a) and the second method step (b), in the absence of a catalyst, it is preferred if the method, especially the first method step (a) and/or the second method step (b), preferentially the first method step (a) and the second method step (b), is carried out in the presence of an inert gas, especially in the presence of helium, argon or nitrogen, preferably in the presence of nitrogen. Especially, undesirable side reactions, especially due to oxidation or hydrolysis, can thus be prevented.

Alternatively to this particular embodiment, however, it is also possible to carry out the method, especially the first method step (a) and/or the second method step (b), preferentially the first method step (a) and the second method step (b), in the presence of an enzyme as a catalyst.

Especially, the enzyme may be selected from synthetases (ligases), catalases, esterases, lipases and combinations thereof. According to the invention, synthetases (synonymously ligases) are especially enzymes from the class of ligases; ligases are enzymes which catalyze the linking of two or more molecules by a covalent bond. Catalases in the sense of the present invention are especially enzymes which are capable of converting hydrogen peroxide to oxygen and water. The term esterases refers in particular to enzymes which are capable of hydrolytically splitting esters into alcohol and acid (saponification); these are thus especially hydrolases, wherein fat splitting esterases are also called lipases. Lipases in the sense of the present invention are especially enzymes which are capable of splitting free fatty acids from lipids such as glycerides (lipolysis).

In this context, the enzyme used as a catalyst can be derived from *Candida antarctica, Mucor miehei* (*Rhizomucor miehei*), *Thermomyces lanuginosus, Candida rugosa, Aspergillus oryzae, Pseudomonas cepacia, Pseudomonas fluorescens, Rhizopus delemar* and *Pseudomonas* sp. and combinations thereof, preferentially from *Candida antarctica, Mucor miehei* (*Rhizomucor miehei*) and *Thermomyces lanuginosus*.

According to a particular embodiment, the enzyme can be used in immobilized form, immobilized on a carrier, preferentially on a polymeric carrier, preferably on a polymeric organic carrier, more preferably with hydrophobic properties, even more preferably on a poly(meth)acrylic resin-based carrier.

In the context of the present invention, it is preferred if, in case of using an enzyme as a catalyst, the enzyme is recycled after the method, especially the first method step (a) and/or the second method step (b), preferably the first method step (a) and the second method step (b).

Insofar as the method, especially the first method step (a) and/or the second method step (b), preferentially the first method step (a) and the second method step (b), is carried out in the production method according to the invention in the presence of an enzyme as a catalyst, it is preferred if the method, especially the first method step (a) and/or the second method step (b), preferentially the first method step (a) and the second method step (b), is carried out at temperatures in the range of from 10° C. to 80° C., especially in the range of from 20° C. to 80° C., preferentially in the range of from 25° C. to 75° C., more preferably in the range of from 45° C. to 75° C., even more preferably in the range of from 50° C. to 70° C.

In case of using an enzyme as a catalyst, the amount of the enzyme used can vary within wide ranges. Especially, the enzyme can be used in amounts, based on the total amount of starting compounds (I) and/or (II) and/or (III) and/or (IV'A) and/or (IV'B), in the range of from 0.001% by weight to 20% by weight, especially in the range of from 0.01% by weight to 15% by weight, preferentially in the range of from 0.1% by weight to 15% by weight, preferably in the range of from 0.5% by weight to 10% by weight. Nevertheless, it may be necessary to deviate from the above-mentioned amounts in individual cases or for specific applications without leaving the scope of the present invention.

If the method according to the invention is carried out according to synthesis route (A), in the first method step (a) at least one 3-hydroxybutyric acid compound of the general formula (I) and at least one polyglycerol (II) are used as starting compounds, and in the second method step (b) the reaction intermediate (IV'A) and at least one polycarboxylic acid (III) are used as starting compounds. If the method according to the invention is carried out according to synthesis route (B), in the first method step (a) at least one polyglycerol (II) and at least one polycarboxylic acid (III) are used as starting compounds and in the second method step (b) the reaction intermediate (IV'B) and at least one 3-hydroxybutyric acid compound of the general formula (I) are used as starting compounds.

If, according to a particular embodiment of the present invention, the method, especially the first method step (a) and/or the second method step (b), preferentially the first method step (a) and the second method step (b), is carried out in the presence of an enzyme as a catalyst, the pressure range applied can also vary within wide ranges. Typically, the method, especially the first method step (a) and/or the second method step (b), preferentially the first method step (a) and the second method step (b), can be carried out in the presence of an enzyme as a catalyst at a pressure in the range of from 0.0001 bar to 10 bar, especially in the range of from 0.001 bar to 5 bar, preferentially in the range of from 0.01 bar to 2 bar, more preferably in the range of from 0.05 bar to 1 bar, even more preferably at about 0.5 bar.

According to the particular embodiment of the present invention, according to which the method, especially the first method step (a) and/or the second method step (b), preferentially the first method step (a) and the second method step (b), is carried out in the presence of an enzyme as a catalyst, it is preferred, if the method, especially the first method step (a) and/or the second method step (b), preferentially the first method step (a) and the second method step (b), is carried out in the presence of an inert gas, especially in the presence of helium, argon or nitrogen, preferably in the presence of nitrogen. As already previously stated in connection with the reaction in the absence of a catalyst, undesirable side reactions, especially due to oxidation or hydrolysis, can be prevented by the reaction in the presence of an inert gas.

According to another alternative embodiment of the present invention, the method, especially the first method step (a) and/or the second method step (b), preferentially the first method step (a) and the second method step (b), can be carried out in the presence of a metal-containing and/or metal-based, acidic or basic catalyst.

According to this alternative embodiment of the present invention, according to which the method, especially the first method step (a) and/or the second method step (b), preferentially the first method step (a) and the second method step (b), is carried out in the presence of a metal-containing and/or metal-based, acidic or basic catalyst, the catalyst may especially be selected from (i) basic catalysts, especially alkali or alkaline earth hydroxides and alkali or alkaline earth alcoholates, such as NaOH, KOH, LiOH, Ca(OH)$_2$, NaOMe, KOMe and Na(OBu-tert.), (ii) acidic catalysts, especially mineral acids, and organic acids, such as sulfuric acid, hydrochloric acid, phosphoric acid, nitric acid, sulfonic acids, methane sulfonic acid, para-toluene sulfonic acid and carboxylic acids, (iii) Lewis acids, especially Lewis acids based on titanium, tin, zinc and aluminum compounds, such as titanium tetrabutylate, tin acids, zinc acetate, aluminum trichloride and aluminum tri-isopropyl, and (iv) heterogeneous catalysts, especially based on mineral silicates, germanates, carbonates and aluminum oxides, such as zeolites, montmorillonites, mordenites, hydrotalcites and aluminas, and combinations thereof.

In this embodiment, a Lewis acid based on titanium, tin, zinc and aluminum compounds, such as titanium tetrabutylate, tin acids, zinc acetate, aluminum trichloride and aluminum tri-isopropyl, may be used as a catalyst.

Especially, it is also preferred in this embodiment if the metal-containing and/or metal-based acidic or basic catalyst is recycled after the reaction.

Also according to the particular embodiment of the present invention, according to which the method, especially the first method step (a) and/or the second method step (b), preferentially the first method step (a) and the second method step (b), is carried out in the presence of a metal-containing and/or metal-based, acidic or basic catalyst, the temperatures can be varied within wide ranges. Especially, the method, especially the first method step (a) and/or the second method step (b), preferentially the first method step (a) and the second method step (b), can be carried out in the presence of a metal-containing and/or metal-based, acidic or basic catalyst at temperatures in the range of from 20° C. to 160° C., especially in the range of from 50° C. to 150° C., preferentially in the range of from 70° C. to 140° C., more preferably in the range of from 80° C. to 135° C., even more preferably in the range of from 100° C. to 130° C.

Furthermore, also in this embodiment, the catalyst (i.e. the metal-containing and/or metal-based, acidic or basic catalyst) can be varied within wide quantity ranges: Thus, the catalyst can be used in amounts, based on the total amount of starting compounds (I) and/or (II) and/or (III) and/or (IV'A) and/or (IV'B), in the range of from 0.01% by weight to 30% by weight, especially in the range of from 0.05% by weight to 15% by weight, preferentially in the range of from 0.1% by weight to 15% by weight, preferably in the range of from 0.2% by weight to 10% by weight. Nevertheless, it is possible to deviate from the above-mentioned amounts in individual cases or for specific applications without leaving the scope of the present invention.

If the method according to the invention is carried out according to synthesis route (A), in the first method step (a) at least one 3-hydroxybutyric acid compound of the general formula (I) and at least one polyglycerol (II) are used as starting compounds and in the second method step (b) the reaction intermediate (IV'A) and at least one polycarboxylic acid (III) are used as starting compounds. If the method according to the invention is carried out according to synthesis route (B), in the first method step (a) at least one polyglycerol (II) and at least one polycarboxylic acid (III) are used as starting compounds and in the second method step (b) the reaction intermediate (IV'B) and at least one 3-hydroxybutyric acid compound of the general formula (I) are used as starting compounds.

Furthermore, according to this particular embodiment of the present invention, according to which the method, especially the first method step (a) and/or the second method step (b), preferentially the first method step (a) and the second method step (b), is carried out in the presence of a metal-containing and/or metal-based, acidic or basic catalyst, the pressure range can equally vary within wide ranges: Especially, the method, especially the first method step (a) and/or the second method step (b), preferentially the first method step (a) and the second method step (b), can be carried out in the presence of a metal-containing and/or metal-based, acidic or basic catalyst at a pressure in the range of from 0.0001 bar to 10 bar, especially in the range of from 0.001 bar to 5 bar, preferentially in the range of from 0.01 bar to 2 bar, more preferably in the range of from 0.05 bar to 1 bar, even more preferably at about 1 bar.

Furthermore, it is also preferred according to this particular embodiment of the present invention, according to which the method, especially the first method step (a) and/or the second method step (b), preferentially the first method step (a) and the second method step (b), is carried out in the presence of a metal-containing and/or metal-based, acidic or basic catalyst, preferably, if the method, especially the first method step (a) and/or the second method step (b), preferentially the first method step (a) and the second method step (b), are carried out in the presence of an inert gas, especially in the presence of helium, argon or nitrogen, preferably in the presence of nitrogen. As previously stated, the reaction in the presence of an inert gas prevents undesirable side reactions, especially due to oxidation or hydrolysis.

According to a particular embodiment of the method according to the invention, it may be preferred if the reaction intermediate (IV'A) or (IV'B) obtained in method step (a) is purified, especially fractionated, after the reaction has been performed and/or before method step (b), preferentially purified and/or fractionated by distillation. Purification and/or fractionation can remove reaction by-products and furthermore fractions with enriched portions of individual reaction intermediates can be provided in a targeted manner for the second method step (b). Overall, by-product formation can thus be minimized and the composition of the product mixture can be controlled in a targeted manner.

As far as the amounts of reactants or starting compounds as a whole are concerned, these can be varied within wide ranges.

Taking into account process economy and optimization of the process sequence, especially with regard to minimization of by-products, it is advantageous if the starting compounds (I), (II) and (III) are used in such a molar ratio that in the resulting reaction product (IV) a predetermined degree of crosslinking (degree of branching) is set and/or controlled and/or that in the resulting reaction product (IV) a respective predetermined proportion of units which are based on the starting compounds (I), (II) and (III) is set and/or controlled.

Especially, it can be advantageous if, in the first method step (a) according to synthesis route (A), the starting compounds (I) and (II) are used in such a molar ratio that at least one free hydroxyl group per molecule remains in the resulting reaction intermediate product (IV'A). The at least one free hydroxyl group per reaction intermediate (IV'A) molecule is reacted in accordance with the invention in the subsequent second method step (b), especially in an esterification reaction.

Furthermore, according to the invention, it can also be advantageous if, in the second method step (b) according to synthesis route (A), the reaction intermediate product (IV'A) and the polycarboxylic acid (III) are used in such a molar ratio that in the resulting reaction product (IV) a predetermined degree of crosslinking (degree of branching) is set and/or controlled and/or that in the resulting reaction product (IV) a respective predetermined proportion of units which are based on the starting compounds (I), (II) and (III) is set and/or controlled. The degree of crosslinking (degree of branching) can be used, for example, to adjust the solubility of the reaction product Furthermore, according to the present invention, it may be advantageous if, in the first method step (a) according to synthesis route (B), the starting compounds (II) and (III) are used in such a molar ratio that in the resulting reaction intermediate product (IV'B) at least one free hydroxyl group per molecule remains and/or that in the resulting reaction intermediate product (IV'B) and in the reaction product (IV) a predetermined degree of crosslinking (degree of branching) is set and/or controlled. In the subsequent second method step (b) according to this embodiment of the present invention, free hydroxyl groups can still react with the 3-hydroxybutyric acid compound, especially in an esterification reaction.

Similarly, it may be advantageous if, in the second method step (b) according to synthesis route (B), the reaction intermediate product (IV'B) and the 3-hydroxybutyric acid compound (I) are used in such a molar ratio that in the resulting reaction product (IV) a respective predetermined proportion of units which are based on the starting compounds (I), (II) and (III) is set and/or controlled.

Especially, it may be provided that, in the second method step (b) according to synthesis route (B), the 3-hydroxybutyric acid compound (I), based on the hydroxyl groups of the reaction intermediate product (IV'B) is used in at least equimolar amounts and preferably in molar amounts in a range from equimolar amounts up to a molar excess of 200 mol-%, especially in a range of equimolar amount up to a molar excess of 150 mol-%, preferentially in a range of equimolar amount up to a molar excess of 100 mol-%. By using the 3-hydroxybutyric acid compound (I) in equimolar amounts or even in excess relative to the hydroxyl groups of the reaction intermediate (IV'B), preferentially all remaining hydroxyl groups can be esterified with the 3-hydroxybutyric acid compound and thus the maximum possible active ingredient density (i.e. 3-hydroxybutyric acid) can be obtained in the reaction product (IV).

Typically, in the first method step (a) according to the (first) synthesis route (A), the compound $R^1$—OH, wherein the radical $R^1$ represents hydrogen, a radical —(O)C—$CH_2$—CH(OH)—$CH_3$ or $C_1$-$C_4$-alkyl, especially $C_1$-$C_4$-alkyl, preferably methyl or ethyl, more preferably ethyl, is simultaneously formed. Especially, it is preferred if the compound $R^1$—OH is withdrawn from the reaction, especially continuously withdrawn, especially by means of preferentially continuous, especially distillative or adsorptive removal. In this context, the compound $R^1$—OH is especially water or a corresponding alcohol (i.e. depending on the 3-hydroxybutyric acid compound used).

Usually, in the method according to the invention, in the second method step (b) according to the (first) synthesis route (A), when the polycarboxylic acid (III) is used in the form of the free acid, water is simultaneously formed during the reaction. Especially, it is preferred if the water is withdrawn from the reaction, especially continuously withdrawn, especially by means of preferentially continuous, especially distillative or adsorptive removal.

Preferably, in the second method step (b) according to the (first) synthesis route (A), when the polycarboxylic acid (III) is used in the form of the anhydride, the corresponding free polycarboxylic acid (III) is formed. Especially, it is preferred if the resulting free polycarboxylic acid (III) is further reacted or, after the reaction has taken place, is withdrawn and optionally recycled, especially depending on the amounts and/or proportions of the starting compounds (I), (II) and (III) used.

However, when using internal or cyclic anhydrides (such as succinic acid anhydride or maleic acid anhydride), the ring is opened and no cleavage product is formed, so that the reaction product has a terminal free acid. This method is illustrated below using the example of the reaction of maleic acid anhydride with ethyl 3-hydroxybutyric acid ester as esterification alcohol:

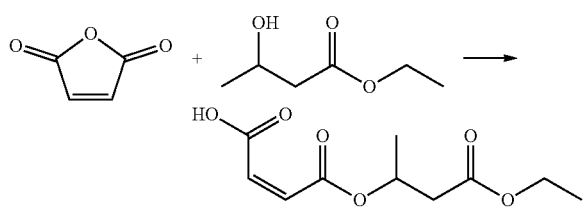

Alternatively, the polycarboxylic acid (III) in the form of the ester can be used in the second method step (b) according to the (first) synthesis route (A). Usually, in the second method step (b) according to the (first) synthesis route (A), when the polycarboxylic acid (III) is used in the form of the ester, the corresponding ester alcohol and water are formed in the inventive method. Especially, it is preferred if the ester alcohol and water formed are withdrawn from the reaction, especially continuously withdrawn, especially by means of preferentially continuous, especially distillative or adsorptive removal.

According to the invention, the ester alcohol is especially the alcohol formed when the polycarboxylic acid (III) in the form of the ester is formed with the free hydroxyl groups of the reaction intermediate (IV'A). That is, for example, in the case of the ethyl ester of the polycarboxylic acid (III), ethanol is formed.

Preferentially, in the first method step (a) according to the (second) synthesis route (B), when the polycarboxylic acid (III) is used in the form of the free acid, water is simultaneously formed during the reaction. Especially, it is preferred if the water is withdrawn from the reaction, especially continuously withdrawn, especially by means of preferentially continuous, especially distillative or adsorptive removal.

Usually, in the first method step (a) according to the (second) synthesis route (B), when the polycarboxylic acid (III) is used in the form of the anhydride, the corresponding free polycarboxylic acid (III) is formed. Especially, it is preferred if the resulting free polycarboxylic acid (III) is further reacted or, after the reaction has taken place, is withdrawn and optionally recycled, especially depending on the amounts and/or proportions of the starting compounds (I), (II) and (III) used.

As previously stated in connection with the (first) synthesis route (A), no by-product is formed in the case of internal or cyclic carboxylic acid anhydrides.

Preferably, in the method according to the invention, in the first method step (a) according to the (second) synthesis route (B), when the polycarboxylic acid (III) is used in the form of the ester, the corresponding ester alcohol and water are formed. Especially, it is preferred if the ester alcohol and water formed are withdrawn from the reaction, especially continuously withdrawn, especially by means of preferentially continuous, especially distillative or adsorptive removal.

Normally, in the method according to the invention, in the second method step (b) according to the (second) synthesis route (B), the compound $R^1$—OH, wherein the radical $R^1$ represents hydrogen, a radical —(O)C—$CH_2$—CH(OH)—$CH_3$ or $C_1$-$C_4$-alkyl, especially $C_1$-$C_4$-alkyl, preferably methyl or ethyl, more preferably ethyl, is simultaneously formed. Especially, it is preferred that the compound $R^1$—OH is withdrawn from the reaction, especially continuously withdrawn, especially by means of preferentially continuous, especially distillative or adsorptive removal.

As previously stated in connection with the (first) synthesis route (A), the compound $R^1$—OH is especially water or a corresponding alcohol (i.e. depending on the 3-hydroxybutyric acid compound used).

Continuous withdrawal of formed by-products shifts the chemical equilibrium, increasing yield or product formation and minimizing by-product formation.

In the production method according to the invention, the composition of the reaction product, especially the presence of different polyglycerol esters of 3-hydroxybutyric acid crosslinked with polycarboxylic acids, and their proportion in the case of a mixture and/or the degree of crosslinking (degree of branching) and/or the molecular weight, may be controlled and/or regulated by means of the reaction conditions, especially by selecting the reaction temperature (conversion temperature) and/or selecting the reaction pressure (conversion pressure) and/or absence of or by providing a catalyst and selecting such catalyst with respect to the type and/or amount and/or by selecting the amounts of the starting compounds (reactants) and/or by providing the removal of the optionally formed by-products.

Thus, it is possible to tailor the composition of the product or product mixture depending on the application; especially, for example, the density of keto bodies (i.e. 3-hydroxybutyric acid or its derivatives) per molecule can be adjusted in a targeted manner.

Following the reaction, the reaction product obtained can be subjected to further conventional or known purification or work-up steps.

In this context, the reaction product obtained may, for example, be fractionated, especially fractionated by distillation.

Also, unreacted starting compounds, especially unreacted starting compounds (I) and/or (II) and/or (III), can be separated from the reaction intermediate product (IV'A) or (IV'B) and/or from the reaction product (IV) and subsequently recycled.

According to a particular embodiment of the production method according to the invention, it is possible to proceed especially in such a way that hydroxyl groups and/or carboxyl groups still present in the reaction product (IV) after the reaction has been performed are at least partially, preferentially completely, functionalized, especially esterified.

In other words, the reaction can be followed by a partial, especially complete functionalization, especially esterification, of hydroxyl groups and/or carboxyl groups still present.

In this particular embodiment of the method according to the invention, the functionalization, especially the esterification of hydroxyl groups and/or carboxyl groups still present, can be carried out by reaction with a carboxylic acid anhydride of, for example, $C_2$-$C_{30}$-carboxylic acids or with $C_2$-$C_{30}$-fatty acids or with $C_2$-$C_{30}$-fatty alcohols. These can be linear or branched, saturated or mono- or polyunsaturated $C_2$-$C_{30}$-carboxylic acid anhydrides or $C_2$-$C_{30}$-fatty acids or $C_2$-$C_{30}$-fatty alcohols. In this context, hydroxyl groups still present can be reacted especially with carboxylic acid anhydrides or fatty acids, and carboxyl groups still present can be reacted especially with fatty alcohols.

If the method according to the invention is carried out according to a particular embodiment according to synthesis route (A), as a reaction intermediate product (IV'A) of method step (a) according to synthesis route (A), one or more polyglycerol esters of 3-hydroxybutyric acid, especially one or more mono- or polyvalent polyglycerol esters of 3-hydroxybutyric acid, of the general formula (IV'Aa)

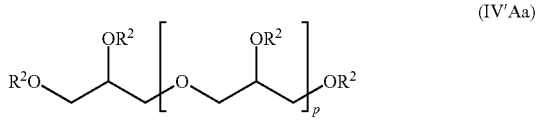
(IV'Aa)

wherein the radical R², independently of one another, represents hydrogen or a radical —(O)C—CH₂—CH(OH)—CH₃, however, with the proviso that at least one radical R² represents a radical —(O)C—CH₂—CH(OH)—CH₃, may be obtained.

If the method according to the invention is carried out according to an alternative particular embodiment according to synthesis route (B), as a reaction intermediate product (IV'B) of method step (a) according to synthesis route (B), one or more polyglycerol esters of polycarboxylic acid (III), especially one or more mono- or polyvalent polyglycerol esters of polycarboxylic acid (III), of the general formula (IV'Ba)

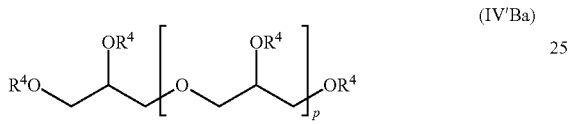
(IV'Ba)

wherein the radical R⁴, independently of one another, represents: hydrogen or a radical —C(O)—X—COOH, wherein X represents a saturated or unsaturated and optionally mono- or polysubstituted, especially substituted with one or more hydroxyl radicals and/or carboxyl radicals, organic radical comprising 1 to 10, preferentially 2 to 6 carbon atoms, especially wherein free carboxyl groups are esterified with further polyglycerols (II) and/or polyglycerol esters of polycarboxylic acid (III), especially cross-linked, however, with the proviso that at least one radical R⁴ represents a radical —C(O)—X—COOH, may be obtained.

During the esterification of free carboxyl groups polyglycerol esters of the polycarboxylic acid (III) with further polyglycerols (II) and/or further polyglycerol esters of the polycarboxylic acid (III) a network is formed; i.e. a plurality of polyglycerols (II) and/or polyglycerol esters of the polycarboxylic acid (III) are linked by polycarboxylic acids (III).

In the method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVa)

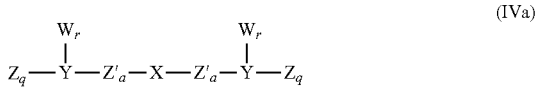
(IVa)

may be obtained and/or may be obtainable, wherein, in the general formula (IVa), X represents a radical —C(O)—X'—C(O)—, wherein X' represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;

Y represents a radical derived from a polyglycerol, especially a radical of the general formula (IIc)

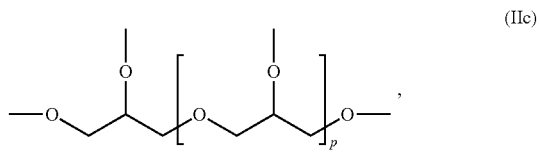
(IIc)

wherein the variable p represents an integer from 1 to 6, especially from 1 to 4, preferentially 1 or 2, more preferably 1;

Z represents a radical —C(O)—CH₂—CH(OH)—CH₃ and the variable q, independently of one another, is an integer from 1 to (p+2) with p as defined hereinabove;

Z' represents a radical —C(O)—CH₂—CH(CH₃)—O— and the variable a, independently of one another, is 0 or 1;

W, independently of one another, represents: hydrogen or —X—OH with X as defined hereinabove or else one or more blocks

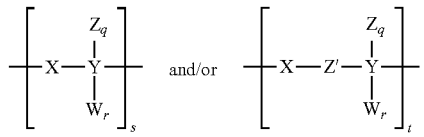

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

According to the invention, the chain end is the unit that terminates the repeating units (i.e. the repeating blocks) and thus the chain end is a terminal unit in the reaction product (IV).

Overall, the reaction product according to the invention is especially a network in which a large number of branches is possible. This means that repeating units can also be present within repeating units, or branches can be formed from repeating units to further repeating units.

Especially, in the production method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVa)

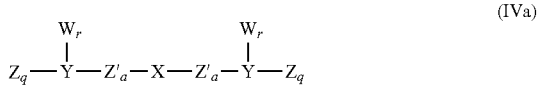
(IVa)

may be obtained and/or may be obtainable,
wherein, in the general formula (IVa),
X represents a radical —C(O)—X'—C(O)—, wherein X' represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;
Y represents a radical derived from a polyglycerol, especially a radical of the general formula (IId)

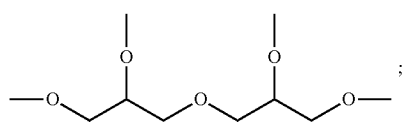

(IId)

Z represents a radical —C(O)—CH$_2$—CH(OH)—CH$_3$ and the variable q, independently of one another, is an integer from 1 to (p+2) with p as defined hereinabove;
Z' represents a radical —C(O)—CH$_2$—CH(CH$_3$)—O— and the variable a, independently of one another, is 0 or 1;
W, independently of one another, represents: hydrogen or —X—OH with X as defined hereinabove or else one or more blocks

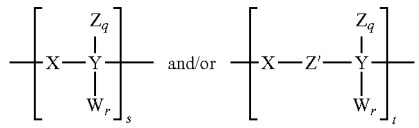

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

According to a particular embodiment of the method according to the invention, it may be preferred if, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVa)

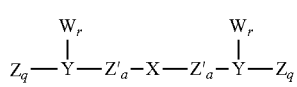

[IVa]

are obtained and/or are obtainable,
wherein, in the general formula (IVa),
X represents a radical —C(O)—X'—C(O)—, wherein X' represents a radical derived from a polycarboxylic acid, especially a saturated or unsaturated and optionally mono- or polysubstituted, especially substituted with one or more hydroxyl radicals and/or carboxyl radicals, organic radical comprising 2 to 6 carbon atoms;
Y represents a radical derived from a polyglycerol, especially a radical of the general formula (IId)

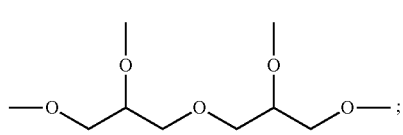

[IId]

Z represents a radical —C(O)—CH$_2$—CH(OH)—CH$_3$ and the variable q, independently of one another, is an integer from 1 to (p+2) with p as defined hereinabove;
Z' represents a radical —C(O)—CH$_2$—CH(CH$_3$)—O— and the variable a, independently of one another, is 0 or 1;
W, independently of one another, represents: hydrogen or —X—OH with X as defined hereinabove or else one or more blocks

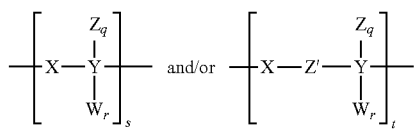

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

According to a further particular embodiment of the method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVa)

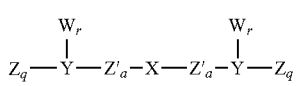

[IVa]

may be obtained and/or may be obtainable,
wherein, in the general formula (IVa),
X is derived from a polycarboxylic acid selected from the group of succinic acid, tartaric acid, citric acid, malic acid, adipic acid, fumaric acid and maleic acid as well as combinations or mixtures thereof, especially selected from the group of succinic acid, tartaric acid, citric acid, malic acid, adipic acid and fumaric acid as well as combinations or mixtures thereof, preferably selected from the group of succinic acid and adipic acid and anhydrides thereof as well as combinations or mixtures thereof;
Y represents a radical derived from a polyglycerol, especially a radical of the general formula (IId)

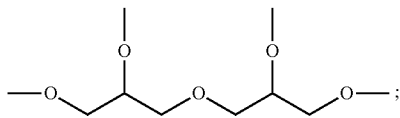

Z represents a radical —C(O)—CH$_2$—CH(OH)—CH$_3$ and the variable q, independently of one another, is an integer from 1 to (p+2) with p as defined hereinabove;

Z' represents a radical —C(O)—CH$_2$—CH(CH$_3$)—O— and the variable a, independently of one another, is 0 or 1;

W, independently of one another, represents: hydrogen or —X—OH with X as defined hereinabove or else one or more blocks

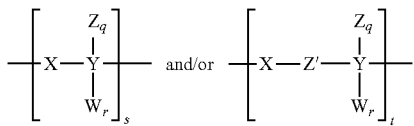

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

In this context, "derived from" means that X is formed from the carboxylic acids mentioned; especially, it is esterified by esterification of the hydrogen of the carboxyl; i.e. in each case the dicarboxylate residue of the corresponding acid is present as X.

According to another particular embodiment of the method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVa)

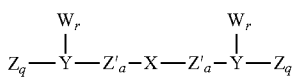

may be obtained and/or may be obtainable, wherein, in the general formula (IVa), X represents one of the following radicals:

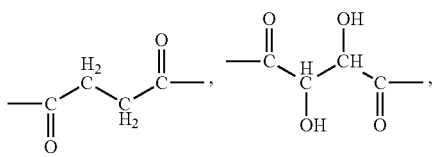

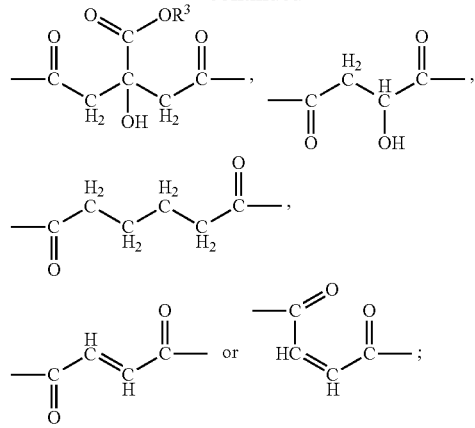

wherein, in the above radicals, the radical R$^3$ represents hydrogen or a radical —CH(CH$_3$)—CH$_2$—C(O)OR$^1$ with R$^1$ as defined hereinabove or an optionally substituted polyglycerol radical;

Y represents a radical derived from a polyglycerol, especially a radical of the general formula (IIc)

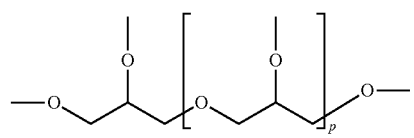

wherein the variable p represents an integer from 1 to 6, especially from 1 to 4, preferentially 1 or 2, more preferably 1;

Z represents a radical —C(O)—CH$_2$—CH(OH)—CH$_3$ and the variable q, independently of one another, is an integer from 1 to (p+2) with p as defined hereinabove;

Z' represents a radical —C(O)—CH$_2$—CH(CH$_3$)—O— and the variable a, independently of one another, is 0 or 1;

W, independently of one another, represents: hydrogen or —X—OH with X as defined hereinabove or else one or more blocks

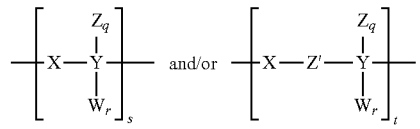

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

In addition, according to a particular embodiment of the method according to the invention, as a reaction product (IV), one or more polyglycerol esters of 3-hydroxybutyric acid crosslinked with polycarboxylic acids, especially one or more mono- or polyvalent polyglycerol esters of 3-hydroxy-butyric acid crosslinked with polycarboxylic acids, of the general formula (IVa)

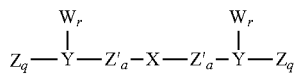
[IVa]

may be obtained and/or may be obtainable,
wherein, in the general formula (IVa),
X represents one of the following radicals:

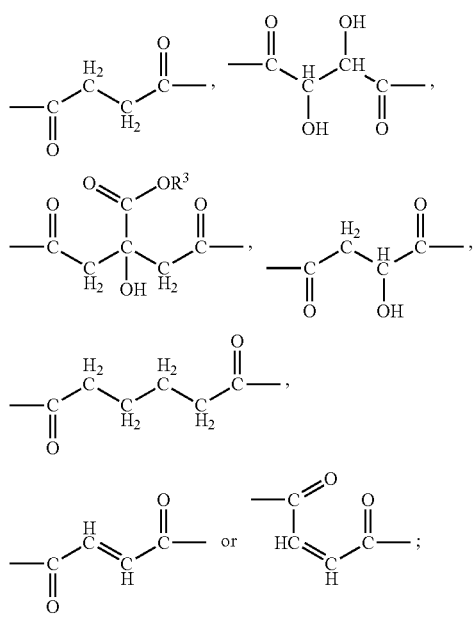

wherein, in the above radicals, the radical $R^3$ represents hydrogen or a radical —CH(CH$_3$)—CH$_2$—C(O)OR$^1$ with $R^1$ as defined hereinabove or an optionally substituted polyglycerol radical;

Y represents a radical derived from a polyglycerol, especially a radical of the general formula (IId)

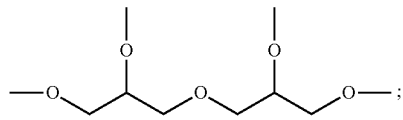
[IId]

Z represents a radical —C(O)—CH$_2$—CH(OH)—CH$_3$ and the variable q, independently of one another, is an integer from 1 to (p+2) with p as defined hereinabove;

Z' represents a radical —C(O)—CH$_2$—CH(CH$_3$)—O— and the variable a, independently of one another, is 0 or 1;

W, independently of one another, represents: hydrogen or —X—OH with X as defined hereinabove or else one or more blocks

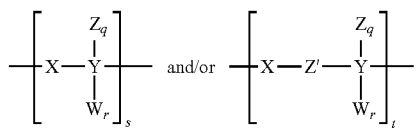

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

In addition, according to a further particular embodiment of the method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVb)

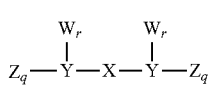
(IVb)

may be obtained and/or may be obtainable,
wherein, in the general formula (IVb),
X represents a radical —C(O)—X'—C(O)—, wherein X represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;

Y represents a radical derived from a polyglycerol, especially a radical of the general formula (IIc)

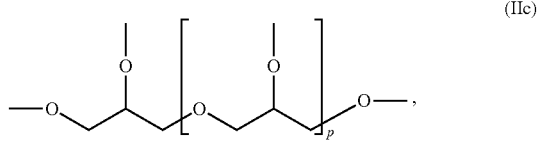
(IIc)

wherein the variable p represents an integer from 1 to 6, especially from 1 to 4, preferentially 1 or 2, more preferably 1;

Z represents a radical —C(O)—CH$_2$—CH(OH)—CH$_3$ and the variable q, independently of one another, is an integer from 1 to (p+2) with p as defined hereinabove;

W, independently of one another, represents: hydrogen or —X—OH with X as defined hereinabove or else a block

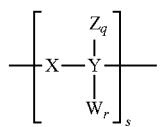

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

According to the invention, the chain end is the unit that terminates the repeating units (i.e. the repeating blocks) and thus the chain end is a terminal unit in the reaction product (IV).

Especially, according to a particular embodiment of the method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVb)

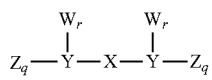

(IVb)

may be obtained and/or may be obtainable,
wherein, in the general formula (IVb),
X represents a radical —C(O)—X'—C(O)—, wherein X represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;
Y represents a radical derived from a polyglycerol, especially a radical of the general formula (IId)

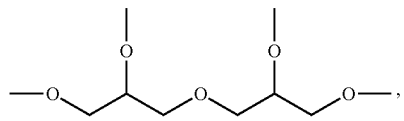

(IId)

wherein the variable p represents an integer from 1 to 6, especially from 1 to 4, preferentially 1 or 2, more preferably 1;
Z represents a radical —C(O)—CH$_2$—CH(OH)—CH$_3$ and the variable q, independently of one another, is an integer from 1 to (p+2) with p as defined hereinabove;
W, independently of one another, represents: hydrogen or —X—OH with X as defined hereinabove or else a block

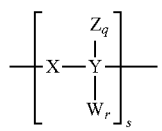

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

Furthermore, according to an additional particular embodiment of the method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVb)

(IVb)

may be obtained and/or may be obtainable,
wherein, in the general formula (IVb),
X represents a radical —C(O)—X'—C(O)—, wherein X' represents a radical derived from a polycarboxylic acid, especially a saturated or unsaturated and optionally mono- or polysubstituted, especially substituted with one or more hydroxyl radicals and/or carboxyl radicals, organic radical comprising 2 to 6 carbon atoms;
Y represents a radical derived from a polyglycerol, especially a radical of the general formula (IId)

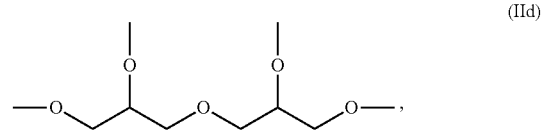

(IId)

wherein the variable p represents an integer from 1 to 6, especially from 1 to 4, preferentially 1 or 2, more preferably 1;
Z represents a radical —C(O)—CH$_2$—CH(OH)—CH$_3$ and the variable q, independently of one another, is an integer from 1 to (p+2) with p as defined hereinabove;
W, independently of one another, represents: hydrogen or —X—OH with X as defined hereinabove or else a block

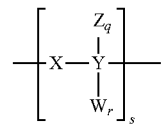

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

Especially, according to a particular embodiment of the method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVb)

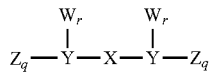

(IVb)

may be obtained and/or may be obtainable,
wherein, in the general formula (IVb),
- X is derived from a polycarboxylic acid selected from the group of succinic acid, tartaric acid, citric acid, malic acid, adipic acid, fumaric acid and maleic acid as well as combinations or mixtures thereof, especially selected from the group of succinic acid, tartaric acid, citric acid, malic acid, adipic acid and fumaric acid as well as combinations or mixtures thereof, preferably selected from the group of succinic acid and adipic acid and their anhydrides as well as combinations or mixtures thereof;
- Y represents a radical derived from a polyglycerol, especially a radical of the general formula (IId)

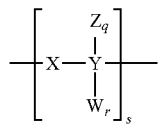

(IId)

wherein the variable p represents an integer from 1 to 6, especially from 1 to 4, preferentially 1 or 2, more preferably 1;
- Z represents a radical —C(O)—CH$_2$—CH(OH)—CH$_3$ and the variable q, independently of one another, is an integer from 1 to (p+2) with p as defined hereinabove;
- W, independently of one another, represents: hydrogen or —X—OH with X as defined hereinabove or else a block

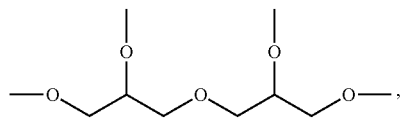

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

In this context, "derived from" means that X is formed from the carboxylic acids mentioned; especially, it is esterified by esterification of the hydrogen of the carboxyl; i.e. in each case the dicarboxylate radical of the corresponding acid is present as X.

Furthermore, according to a particular embodiment of the method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVb)

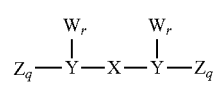

(IVb)

may be obtained and/or may be obtainable,
wherein, in the general formula (IVb),
- X represents one of the following radicals:

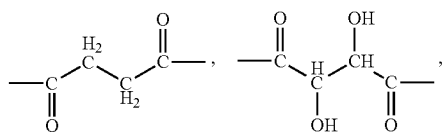

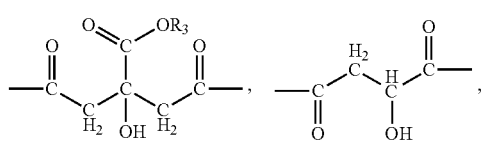

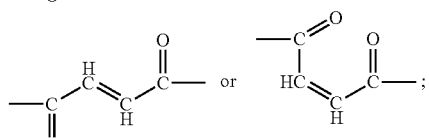

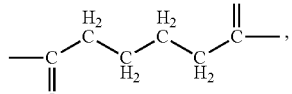

wherein, in the above radicals the radical, R$^3$ represents hydrogen or a radical —CH(CH$_3$)—CH$_2$—C(O)OR$^1$ with R$^1$ as defined hereinabove or an optionally substituted polyglycerol radical;
- Y represents a radical derived from a polyglycerol, especially a radical of the general formula (IIc)

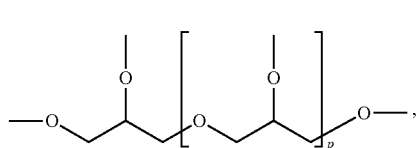

(IIc)

wherein the variable p represents an integer from 1 to 6, especially from 1 to 4, preferentially 1 or 2, more preferably 1;
- Z represents a radical —C(O)—CH$_2$—CH(OH)—CH$_3$ and the variable q, independently of one another, is an integer from 1 to (p+2) with p as defined hereinabove;
- W, independently of one another, represents: hydrogen or —X—OH with X as defined hereinabove or else a block

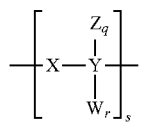

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

In addition, according to a particular embodiment of the method according to the invention, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, of the general formula (IVb)

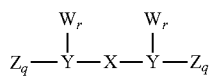
(IVb)

may be obtained and/or may be obtainable,
wherein, in the general formula (IVb),
X represents one of the following radicals:

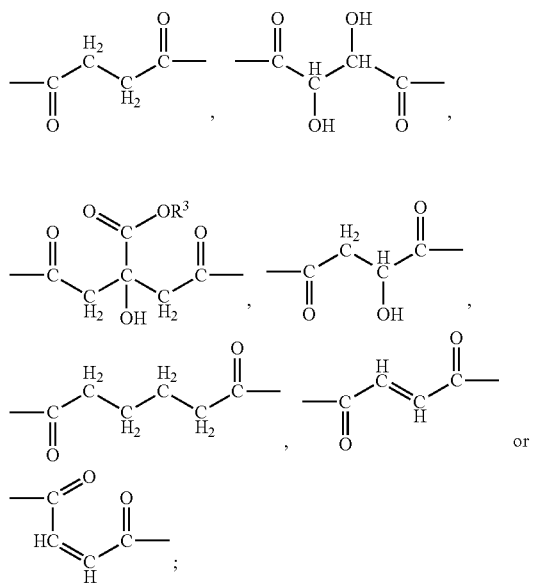

wherein, in the above radicals the radical, $R^3$ represents hydrogen or a radical —CH(CH$_3$)—CH$_2$—C(O)OR, with $R^1$ as defined hereinabove or an optionally substituted polyglycerol radical;

Y represents a radical derived from a polyglycerol, especially a radical of the general formula (IId)

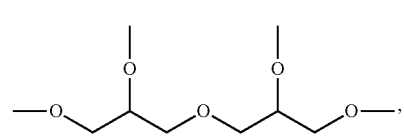
(IId)

wherein the variable p represents an integer from 1 to 6, especially from 1 to 4, preferentially 1 or 2, more preferably 1;

Z represents a radical —C(O)—CH$_2$—CH(OH)—CH$_3$ and the variable q, independently of one another, is an integer from 1 to (p+2) with p as defined hereinabove;

W, independently of one another, represents: hydrogen or —X—OH with X as defined hereinabove or else a block

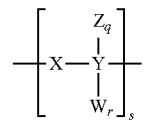

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

Furthermore, it can be provided according to the invention that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, is/are obtained and/or obtainable, wherein the reaction product (IV) and/or the polyglycerol ester(s) of 3-hydroxybutyric acid crosslinked with polycarboxylic acids, especially the mono- or polyvalent polyglycerol ester(s) of 3-hydroxybutyric acid crosslinked with polycarboxylic acids, comprise(s) the following units, especially molecular building blocks:

at least one unit —C(O)—X'—C(O)—, wherein X' represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;

at least one unit, preferentially at least two units, derived from a polyglycerol, especially at least one unit, preferentially at least two units, of the general formula (IIc)

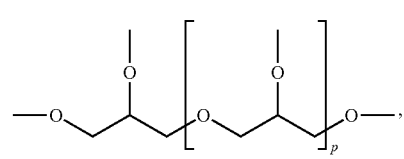
(IIc)

wherein the variable p represents an integer from 1 to 6, especially from 1 to 4, preferentially 1 or 2, more preferably 1;

at least two units, especially at least three units, preferentially at least four units —C(O)—CH$_2$—CH(OH)—CH$_3$;

optionally at least one unit —C(O)—CH$_2$—CH(CH$_3$)—O—;

optionally at least one unit —X'—COOH with X' as defined hereinabove.

In this context, the units mentioned above are the molecular building blocks which, in their entirety, form the reaction product (IV). It should be noted that in the case of the present invention, the individual units are each linked to one another by an esterification reaction or by ester groups, so that an indiscriminate arrangement is not possible. However, it is well known to the skilled person how the individual units are to be arranged.

In addition, it can also be provided according to the invention that, as a reaction product (IV), one or more polyglycerol esters of 3-hydroxybutyric acid crosslinked with polycarboxylic acids, especially one or more mono- or polyvalent polyglycerol esters of 3-hydroxybutyric acid crosslinked with polycarboxylic acids, is/are obtained and/or obtainable, wherein the reaction product (IV) and/or the polyglycerol ester(s) of 3-hydroxybutyric acid crosslinked with polycarboxylic acids, especially the mono- or polyvalent polyglycerol ester(s) of 3-hydroxybutyric acid crosslinked with polycarboxylic acids, comprise(s) the following units, especially molecular building blocks:

at least one unit X" of the following formulae:

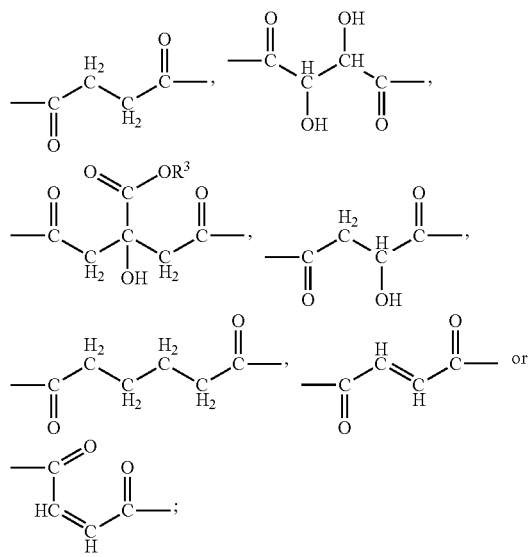

wherein, in the above radicals, the R$^3$ radical represents hydrogen or a radical —CH(CH$_3$)—CH$_2$—C(O)OR$^1$ with R$^1$ as defined hereinabove or an optionally substituted polyglycerol radical;

at least one unit, preferentially at least two units, derived from a polyglycerol, especially at least one unit, preferentially at least two units, of the general formula (IIc)

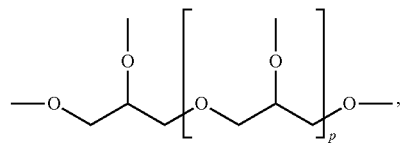

wherein the variable p represents an integer from 1 to 6, especially from 1 to 4, preferentially 1 or 2, more preferably 1;

at least two units, especially at least three units, preferentially at least four units —C(O)—CH$_2$—CH(OH)—CH$_3$;

optionally at least one unit —C(O)—CH$_2$—CH(CH$_3$)—O—;

optionally at least one unit —X"—OH with X" as defined hereinabove.

According to the invention, it is particularly preferred if the reaction product (IV) has a molecular weight, especially an average molecular weight, preferentially a weight average molecular weight, in the range of from 500 to 50,000 g/mol, especially in the range of from 500 to 30,000 g/mol, preferentially in the range of from 500 to 25,000 g/mol, especially determined by size exclusion chromatography (SEC), preferentially gel permeation chromatography (GPC), preferentially according to DIN EN ISO 16014-5: 2019, especially with polystyrene (PS) as standard.

In the case of low molecular weight compounds, especially, absolute molecular weights can also be determined according to the invention, while average molecular weights are determined for higher molecular weight compounds.

According to another particular embodiment of the method according to the invention, as a reaction product (IV), a mixture of at least two, especially at least three, preferentially at least four different polyglycerol esters of 3-hydroxybutyric acid crosslinked with polycarboxylic acids, especially mono- or polyvalent polyglycerol esters of 3-hydroxybutyric acid crosslinked with polycarboxylic acids, may be obtained and/or is obtainable.

A further subject-matter—according to a second aspect of the present invention—is a reaction product (IV) or a polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable by a method as described hereinabove.

According to a particular embodiment, the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, may correspond to the general formula (IVa)

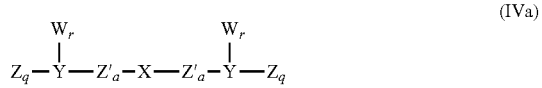

wherein, in the general formula (IVa),

X represents a radical —C(O)—X'—C(O)—, wherein X' represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;

Y represents a radical derived from a polyglycerol, especially a radical of the general formula (IIc)

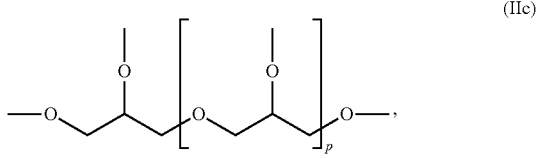

wherein the variable p represents an integer from 1 to 6, especially from 1 to 4, preferentially 1 or 2, more preferably 1;

Z represents a radical —C(O)—CH$_2$—CH(OH)—CH$_3$ and the variable q, independently of one another, is an integer from 1 to (p+2) with p as defined hereinabove;

Z' represents a radical —C(O)—CH$_2$—CH(CH$_3$)—O— and the variable a, independently of one another, is 0 or 1;

W, independently of one another, represents: hydrogen or —X—OH with X as defined hereinabove or else one or more blocks

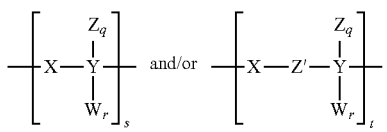

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

Overall, the reaction product according to the invention or the polyglycerol ester of 3-hydroxybutyric acid crosslinked with polycarboxylic acids according to the invention is especially a network in which a large number of branches are possible. As a result, repeating units can also be present within repeating units or, starting from repeating units, branches can be formed to further repeating units.

According to another particular embodiment, the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, may correspond to the general formula (IVa)

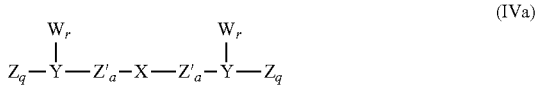

wherein, in the general formula (IVa),

X represents a radical —C(O)—X'—C(O)— wherein X' represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;

Y represents a radical derived from a polyglycerol, especially a radical of the general formula (IId)

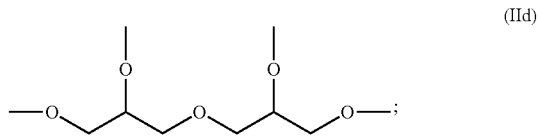

Z represents a radical —C(O)—CH$_2$—CH(OH)—CH$_3$ and the variable q, independently of one another, is an integer from 1 to (p+2) with p as defined hereinabove;

Z' represents a radical —C(O)—CH$_2$—CH(CH$_3$)—O— and the variable a, independently of one another, is 0 or 1;

W, independently of one another, represents: hydrogen or —X—OH with X as defined hereinabove or else one or more blocks

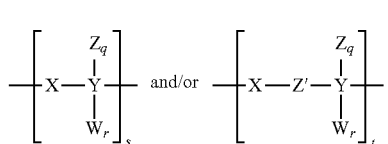

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

According to a further particular embodiment of the present invention, the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, may correspond to the general formula (IVa)

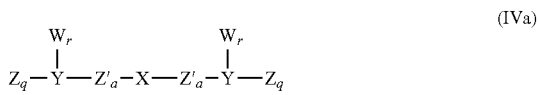

wherein, in the general formula (IVa),

X represents a radical —C(O)—X'—C(O)—, wherein X represents a radical derived from a polycarboxylic acid, especially a saturated or unsaturated and optionally mono- or polysubstituted, especially substituted with one or more hydroxyl radicals and/or carboxyl radicals, organic radical comprising 2 to 6 carbon atoms;

Y represents a radical derived from a polyglycerol, especially a radical of the general formula (IId)

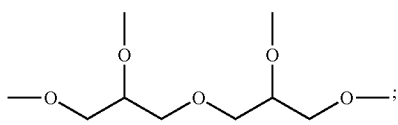

Z represents a radical —C(O)—CH$_2$—CH(OH)—CH$_3$ and the variable q, independently of one another, is an integer from 1 to (p+2) with p as defined hereinabove;

Z' represents a radical —C(O)—CH$_2$—CH(CH$_3$)—O— and the variable a, independently of one another, is 0 or 1;

W, independently of one another, represents: hydrogen or —X—OH with X as defined hereinabove or else one or more blocks

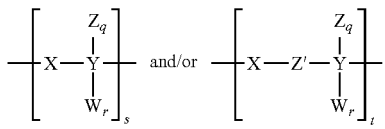

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

According to a further particular embodiment of the present invention, the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, may correspond to the general formula (IVa)

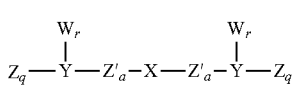

wherein, in the general formula (IVa),

X is derived from a polycarboxylic acid selected from the group of succinic acid, tartaric acid, citric acid, malic acid, adipic acid, fumaric acid and maleic acid as well as combinations or mixtures thereof, especially selected from the group of succinic acid, tartaric acid, citric acid, malic acid, adipic acid and fumaric acid as well as combinations or mixtures thereof, preferably selected from the group of succinic acid and adipic acid and anhydrides thereof as well as combinations or mixtures thereof;

Y represents a radical derived from a polyglycerol, especially a radical of the general formula (IId)

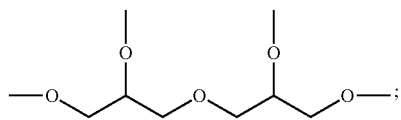

Z represents a radical —C(O)—CH$_2$—CH(OH)—CH$_3$ and the variable q, independently of one another, is an integer from 1 to (p+2) with p as defined hereinabove;

Z' represents a radical —C(O)—CH$_2$—CH(CH$_3$)—O— and the variable a, independently of one another, is 0 or 1;

W, independently of one another, represents: hydrogen or —X—OH with X as defined hereinabove or else one or more blocks

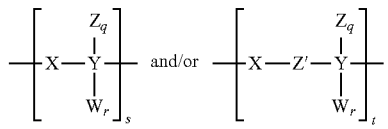

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

In this context, "derived from" means that X is formed from the carboxylic acids mentioned; especially, it is esterified by esterification of the hydrogen of the carboxyl; i.e. in each case the dicarboxylate residue of the corresponding acid is present as X.

According to a preferred embodiment of the present invention, the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, may correspond to the general formula (IVa)

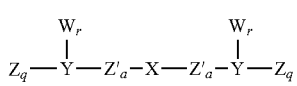

wherein, in the general formula (IVa),
X represents one of the following radicals:

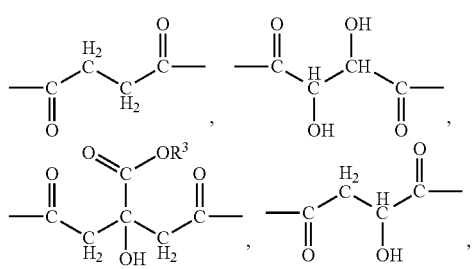

-continued

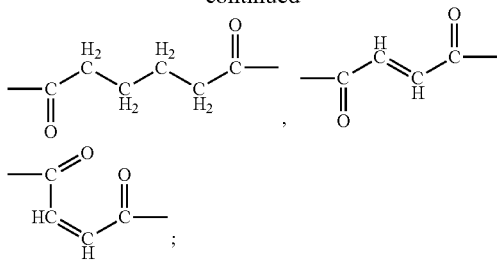

wherein, in the above radicals, the radical $R^3$ represents hydrogen or a radical —CH(CH$_3$)—CH$_2$—C(O)OR$^1$ with $R^1$ as defined hereinabove or an optionally substituted polyglycerol radical;

Y represents a radical derived from a polyglycerol, especially a radical of the general formula (IIc)

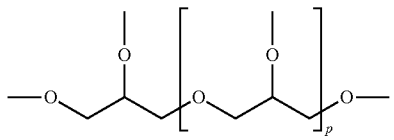
(IIc)

wherein the variable p represents an integer from 1 to 6, especially from 1 to 4, preferentially 1 or 2, more preferably 1;

Z represents a radical —C(O)—CH$_2$—CH(OH)—CH$_3$ and the variable q, independently of one another, is an integer from 1 to (p+2) with p as defined hereinabove;

Z' represents a radical —C(O)—CH$_2$—CH(CH$_3$)—O— and the variable a, independently of one another, is 0 or 1;

W, independently of one another, represents: hydrogen or —X—OH with X as defined hereinabove or else one or more blocks

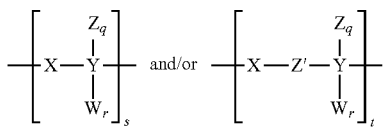

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

According to a further preferred embodiment of this aspect of the invention, the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, may correspond to the general formula (IVa)

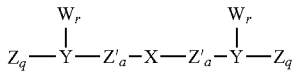
(IVa)

wherein, in the general formula (IVa),

X represents one of the following radicals:

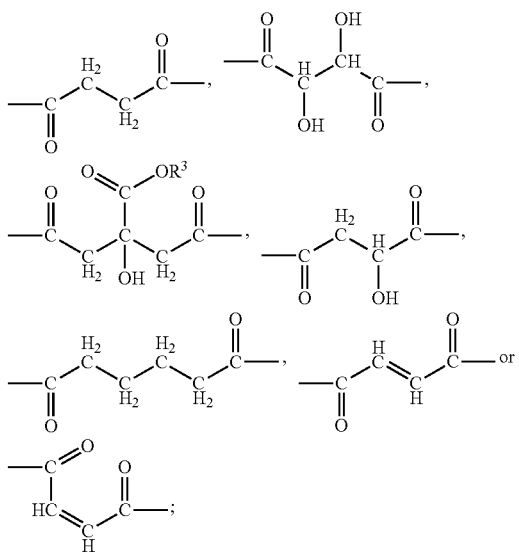

wherein, in the above radicals, the radical $R^3$ represents hydrogen or a radical —CH(CH$_3$)—CH$_2$—C(O)OR$^1$ with $R^1$ as defined hereinabove or an optionally substituted polyglycerol radical;

Y represents a radical derived from a polyglycerol, especially a radical of the general formula (IId)

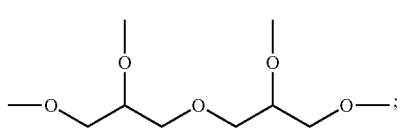
(IId)

Z represents a radical —C(O)—CH$_2$—CH(OH)—CH$_3$ and the variable q, independently of one another, is an integer from 1 to (p+2) with p as defined hereinabove;

Z' represents a radical —C(O)—CH$_2$—CH(CH$_3$)—O— and the variable a, independently of one another, is 0 or 1;

W, independently of one another, represents: hydrogen or —X—OH with X as defined hereinabove or else one or more blocks

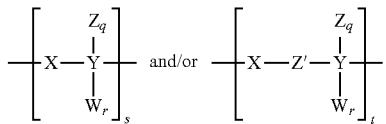

with X, Y, Z, Z' and q each as defined hereinabove, wherein the variables s and t, each independently of one another, are an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the blocks is in each case formed by hydrogen, —X—OH or Z.

Furthermore, according to a particular embodiment of this aspect of the invention, the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, may correspond to the general formula (IVb)

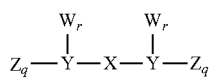
(IVb)

wherein, in the general formula (IVb),
- X represents a radical —C(O)—X'—C(O)—, wherein X' represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;
- Y represents a radical derived from a polyglycerol, especially a radical of the general formula (IIc)

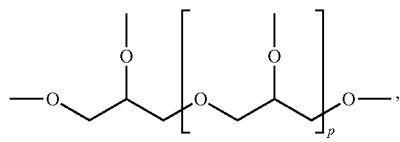
(IIc)

wherein the variable p represents an integer from 1 to 6, especially from 1 to 4, preferentially 1 or 2, more preferably 1;
Z represents a radical —C(O)—CH$_2$—CH(OH)—CH$_3$ and the variable q, independently of one another, is an integer from 1 to (p+2) with p as defined hereinabove;
W, independently of one another, represents: hydrogen or —X—OH with X as defined hereinabove or else a block

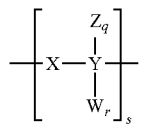

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

Moreover, according to a further particular embodiment of this aspect of the invention, the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, may correspond to the general formula (IVb)

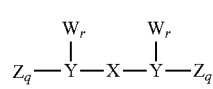
(IVb)

wherein, in the general formula (IVb),
- X represents a radical —C(O)—X'—C(O)—, wherein X' represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;
- Y represents a radical derived from a polyglycerol, especially a radical of the general formula (IId)

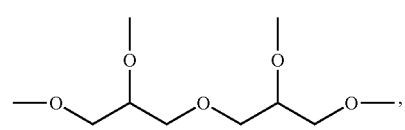
(IId)

wherein the variable p represents an integer from 1 to 6, especially from 1 to 4, preferentially 1 or 2, more preferably 1;
Z represents a radical —C(O)—CH$_2$—CH(OH)—CH$_3$ and the variable q, independently of one another, is an integer from 1 to (p+2) with p as defined hereinabove;
W, independently of one another, represents: hydrogen or —X—OH with X as defined hereinabove or else a block

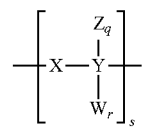

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

Furthermore, according to a particular embodiment of this aspect of the invention, it may be provided that the polyglycerol ester of 3-hydroxybutyric acid crosslinked with polycarboxylic acids, especially the monovalent or polyvalent polyglycerol ester of 3-hydroxybutyric acid crosslinked with polycarboxylic acids, according to the invention or obtainable according to the inventive method, corresponds to the general formula (IVb)

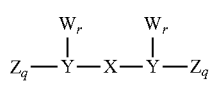

(IVb)

wherein, in the general formula (IVb),
X represents a radical —C(O)—X'—C(O)—, wherein X represents a radical derived from a polycarboxylic acid, especially a saturated or unsaturated and optionally mono- or polysubstituted, especially substituted with one or more hydroxyl radicals and/or carboxyl radicals, organic radical comprising 2 to 6 carbon atoms;
Y represents a radical derived from a polyglycerol, especially a radical of the general formula (IId)

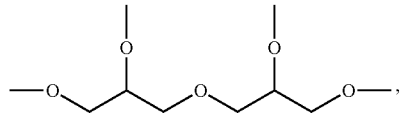

(IId)

wherein the variable p represents an integer from 1 to 6, especially from 1 to 4, preferentially 1 or 2, more preferably 1;
Z represents a radical —C(O)—CH$_2$—CH(OH)—CH$_3$ and the variable q, independently of one another, is an integer from 1 to (p+2) with p as defined hereinabove;
W, independently of one another, represents: hydrogen or —X—OH with X as defined hereinabove or else a block

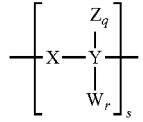

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

Also, according to a further particular embodiment of this aspect of the invention, it may be provided that the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, corresponds to the general formula (IVb)

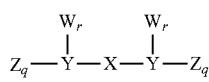

(IVb)

wherein, in the general formula (IVb),
X is derived from a polycarboxylic acid selected from the group of succinic acid, tartaric acid, citric acid, malic acid, adipic acid, fumaric acid and maleic acid as well as combinations or mixtures thereof, especially selected from the group of succinic acid, tartaric acid, citric acid, malic acid, adipic acid and fumaric acid as well as combinations or mixtures thereof, preferably selected from the group of succinic acid and adipic acid and anhydrides thereof as well as combinations or mixtures thereof;
Y represents a radical derived from a polyglycerol, especially a radical of the general formula (IId)

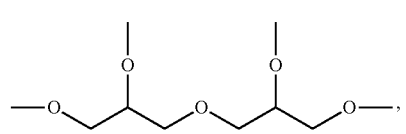

(IId)

wherein the variable p represents an integer from 1 to 6, especially from 1 to 4, preferentially 1 or 2, more preferably 1;
Z represents a radical —C(O)—CH$_2$—CH(OH)—CH$_3$ and the variable q, independently of one another, is an integer from 1 to (p+2) with p as defined hereinabove;
W, independently of one another, represents: hydrogen or —X—OH with X as defined hereinabove or else a block

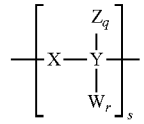

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

In this context, "derived from" means that X is formed from the carboxylic acids mentioned; especially, it is esterified by esterification of the hydrogen of the carboxyl; i.e. in each case the dicarboxylate residue of the corresponding acid is present as X.

Furthermore, according to a particular embodiment of this aspect of the invention, the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, may correspond to the general formula (IVb)

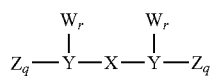

(IVb)

wherein, in the general formula (IVb),
X represents one of the following radicals:

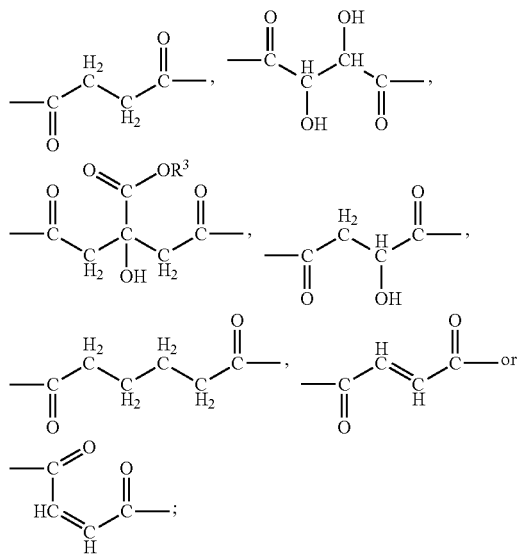

wherein, in the above radicals, the radical $R^3$ represents hydrogen or a radical —CH(CH$_3$)—CH$_2$—C(O)OR$^1$ with R$^1$ as defined hereinabove or an optionally substituted polyglycerol radical;

Y represents a radical derived from a polyglycerol, especially a radical of the general formula (IIc)

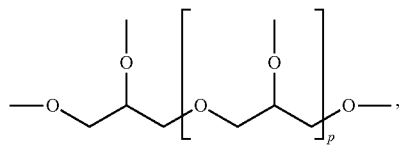
(IIc)

wherein the variable p represents an integer from 1 to 6, especially from 1 to 4, preferentially 1 or 2, more preferably 1;

Z represents a radical —C(O)—CH$_2$—CH(OH)—CH$_3$ and the variable q, independently of one another, is an integer from 1 to (p+2) with p as defined hereinabove;

W, independently of one another, represents: hydrogen or —X—OH with X as defined hereinabove or else a block

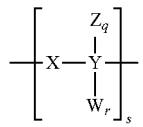

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

It can also be provided according to the invention that the polyglycerol ester of 3-hydroxybutyric acid crosslinked with polycarboxylic acids, especially the mono- or polyvalent polyglycerol ester of 3-hydroxybutyric acid crosslinked with polycarboxylic acids, according to the invention or obtainable according to the inventive method, corresponds to the general formula (IVb)

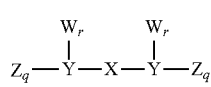
(IVb)

wherein, in the general formula (IVb),
X represents one of the following radicals:

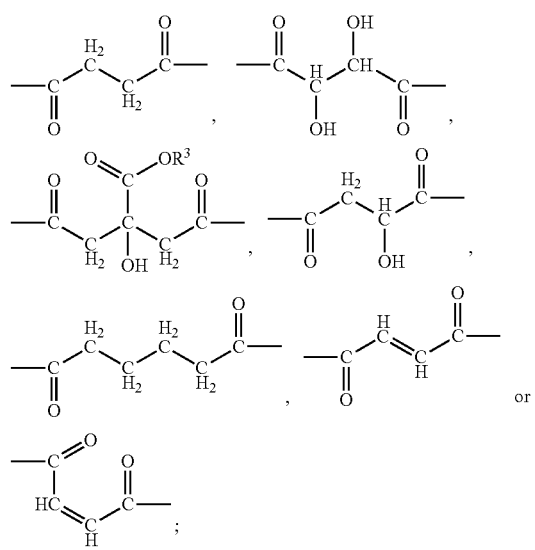

wherein, in the above radicals, the radical $R^3$ represents hydrogen or a radical —CH(CH$_3$)—CH$_2$—C(O)OR$^1$ with R$^1$ as defined hereinabove or an optionally substituted polyglycerol radical;

Y represents a radical derived from a polyglycerol, especially a radical of the general formula (IId)

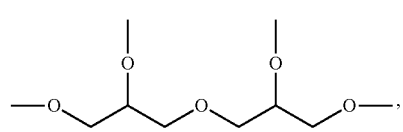
(IId)

wherein the variable p represents an integer from 1 to 6, especially from 1 to 4, preferentially 1 or 2, more preferably 1;

Z represents a radical —C(O)—CH$_2$—CH(OH)—CH$_3$ and the variable q, independently of one another, is an integer from 1 to (p+2) with p as defined hereinabove;

W, independently of one another, represents: hydrogen or —X—OH with X as defined hereinabove or else a block

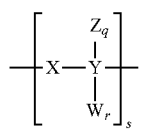

with X, Y, Z and q each as defined hereinabove, wherein the variable s is an integer from 0 to 30, especially from 0 to 25, preferentially from 0 to 20, more preferably from 0 to 10, even more preferably from 0 to 5, and the variable r, independently of one another, is an integer from 0 to (p+1) with p as defined hereinabove, wherein the chain end of the block is formed by hydrogen, —X—OH or Z.

Furthermore, according to a particular embodiment of this aspect of the invention, a further object of the present invention is a polyglycerol ester of 3-hydroxybutyric acid crosslinked with polycarboxylic acids, especially mono- or polyvalent polyglycerol ester of 3-hydroxybutyric acid crosslinked with polycarboxylic acids, especially as defined hereinabove, wherein the polyglycerol ester of 3-hydroxybutyric acid crosslinked with polycarboxylic acids, especially the mono- or polyvalent polyglycerol ester of 3-hydroxybutyric acid crosslinked with polycarboxylic acids, comprises/comprise the following units, especially molecular units:

- at least one unit —C(O)—X'—C(O)—, wherein X represents a radical derived from a polycarboxylic acid, especially a saturated or unsaturated and optionally mono- or polysubstituted, especially substituted with one or more hydroxyl radicals and/or carboxyl radicals, organic radical comprising 1 to 10, preferentially 2 to 6 carbon atoms;
- at least one unit, preferentially at least two units, derived from a polyglycerol, especially at least one unit, preferentially at least two units, of the general formula (IIc)

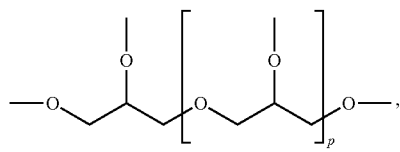
(IIc)

wherein the variable p represents an integer from 1 to 6, especially from 1 to 4, preferentially 1 or 2, more preferably 1;
- at least two units, especially at least three units, preferentially at least four units —C(O)—CH$_2$—CH(OH)—CH$_3$;
- optionally at least one unit —C(O)—CH$_2$—CH(CH$_3$)—O—;
- optionally at least one unit —X'—COOH with X' as defined hereinabove.

In this context, the units mentioned above are the molecular building blocks or segments which, in their entirety, form the reaction product (IV). It should be noted that in the case of the present invention, the individual units are each linked to one another by an esterification reaction or by ester groups, so that an indiscriminate arrangement is not possible. However, it is well known to the skilled person how the individual units are to be arranged.

Furthermore, it is also an object of the present invention according to a particular embodiment of this aspect of the invention to provide a polyglycerol ester of 3-hydroxybutyric acid crosslinked with polycarboxylic acids, especially mono- or polyvalent polyglycerol ester of 3-hydroxybutyric acid crosslinked with polycarboxylic acids, especially as defined hereinabove, wherein the polyglycerol ester(s) of 3-hydroxybutyric acid crosslinked with polycarboxylic acids, especially the mono- or polyvalent polyglycerol ester(s) of 3-hydroxybutyric acid crosslinked with polycarboxylic acids, comprise(s) the following units, especially molecular building blocks:

at least one unit X" of the following formulae:

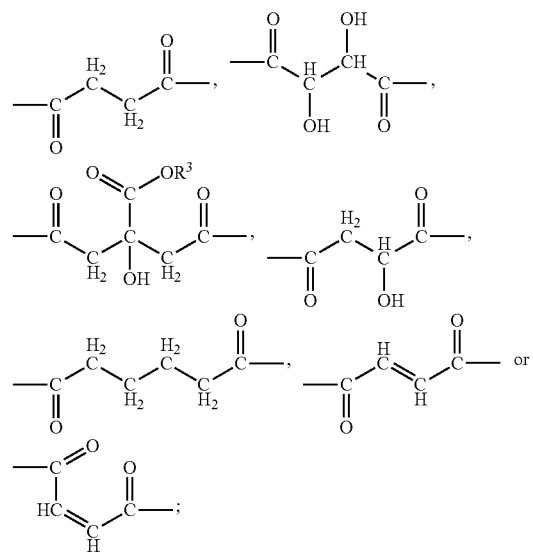

wherein, in the above radicals, the R$^3$ radical represents hydrogen or a radical —CH(CH$_3$)—CH$_2$—C(O)OR$^1$ with R$^1$ as defined hereinabove or an optionally substituted polyglycerol radical;

at least one unit, preferentially at least two units, derived from a polyglycerol, especially at least one unit, preferentially at least two units, of the general formula (IIc)

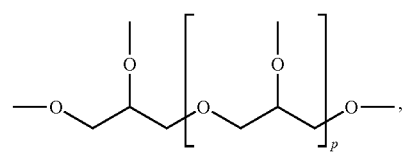
(IIc)

wherein the variable p represents an integer from 1 to 6, especially from 1 to 4, preferentially 1 or 2, more preferably 1;
at least two units, especially at least three units, preferentially at least four units —C(O)—CH$_2$—CH(OH)—CH$_3$;
optionally at least one unit —C(O)—CH$_2$—CH(CH$_3$)—O—;
optionally at least one unit —X"—OH with X" as defined hereinabove.

Also, according to a particular embodiment of this aspect of the invention, an object of the present invention is a polyglycerol ester of 3-hydroxybutyric acid crosslinked with polycarboxylic acids, especially mono- or polyvalent polyglycerol ester of 3-hydroxybutyric acid crosslinked with polycarboxylic acids, especially as defined hereinabove, wherein the polyglycerol ester of 3-hydroxybutyric acid crosslinked with polycarboxylic acids, especially the monovalent or polyvalent polyglycerol ester of 3-hydroxybutyric acid crosslinked with polycarboxylic acids, has a molecular weight, especially an average molecular weight, preferentially a weight average molecular weight, in the range of from 500 to 50,000 g/mol, especially in the range of from 500 to 30,000 g/mol, preferentially in the range of from 500 to 25,000 g/mol, especially determined by size exclusion chromatography (SEC), preferentially gel permeation chromatography (GPC), preferentially according to DIN EN ISO 16014-5: 2019, especially with polystyrene (PS) as standard.

In the case of low molecular weight compounds, absolute molecular weights can also especially be determined according to the invention, while average molecular weights are determined for higher molecular weight compounds.

Furthermore, according to a particular embodiment of this aspect of the invention, a further object of the present invention is a mixture comprising at least two, especially at least three, preferentially at least four different polyglycerol esters of 3-hydroxybutyric acid crosslinked with polycarboxylic acids, especially monovalent or polyvalent polyglycerol esters of 3-hydroxybutyric acid crosslinked with polycarboxylic acids, especially as defined hereinabove.

The reaction product obtainable according to the inventive method or the inventive reaction product as defined hereinabove, respectively, and/or the polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or the mixture, obtainable according to the inventive production method or the inventive mixture as defined hereinabove, respectively, comprises a multitude of advantages and special features compared to the prior art:

As the applicant has surprisingly found out, the reaction product obtainable according to the inventive method or the inventive reaction product as defined hereinabove, respectively, and/or the polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or the mixture, obtainable according to the inventive production method or the inventive mixture as defined hereinabove, respectively, is suitable as a precursor or metabolite of 3-hydroxybutyric acid or its salts, since, on the one hand, it is converted physiologically, especially in the gastrointestinal tract, to 3-hydroxybutyric acid or its salts and, on the other hand, it simultaneously comprises a good physiological compatibility or tolerability, especially with regard to non-toxicity and acceptable organoleptic properties.

Moreover, the reaction product obtainable according to the inventive method or the inventive reaction product as defined hereinabove, respectively, and/or the polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or the mixture, obtainable according to the inventive production method or the inventive mixture as defined hereinabove, respectively, is easily accessible or available on a large scale on a synthetic basis, even on a commercial scale, and with the required pharmaceutical or pharmacological quality.

Additionally, the reaction product obtainable according to the inventive method or the inventive reaction product as defined hereinabove, respectively, and/or the polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or the mixture, obtainable according to the inventive production method or the inventive mixture as defined hereinabove, respectively, can, if necessary, be provided in enantiomerically pure or enantiomerically enriched form.

The reaction product obtainable according to the inventive method or the inventive reaction product as defined hereinabove, respectively, and/or the polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or the mixture, obtainable according to the inventive production method or the inventive mixture as defined hereinabove, respectively, thus represents an efficient pharmacological drug target in the context of keto-body therapy of the human or animal body.

The reaction product obtainable according to the inventive method or the inventive reaction product as defined hereinabove, respectively, and/or the polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, is/are now further characterized on the basis of the following description of the drawings and the drawings themselves. In this connection, all features described and/or illustrated constitute, individually or in any combination, the subject matter of the present invention, irrespective of their summary in the claims and their back-references.

It shows:

FIG. 1a visualization of tridiglycerol esters of 3-hydroxybutyric acid crosslinked with succinic acid according to a particular and purely exemplary embodiment, FIG. 2a schematic visualization of a reaction product according to the invention according to a further particular and also purely exemplary embodiment, FIG. 1 shows a tridiglycerol ester of 3-hydroxybutyric acid crosslinked with succinic acid, wherein the different units or molecular building blocks are each marked differently. The unit or molecular building block which is based on 3-hydroxybutyric acid is indicated by a (blank) box. The unit or molecular building block based on diglycerol is indicated by a hatched box and the unit or molecular building block based on succinic acid is indicated by a dotted box.

Figure 2:
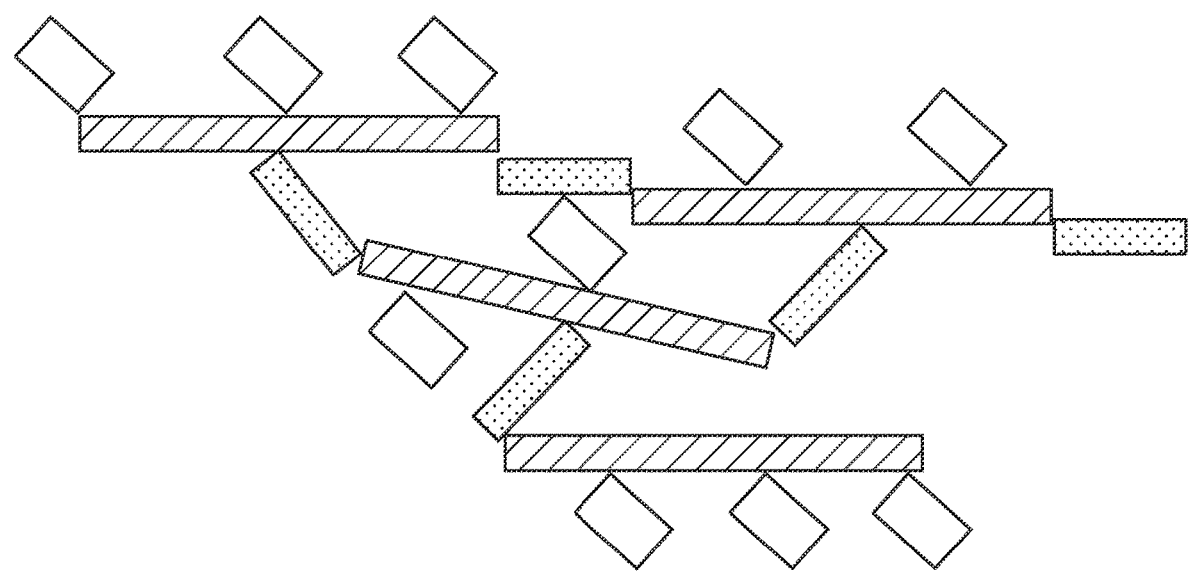
FIG. 2a provides a schematic visualization of a reaction product according to the invention according to a further particular and also purely exemplary embodiment.

In FIG. 2, a possible reaction product (IV), which is in the form of a network, is shown schematically. In this context, the units or molecular building blocks are represented by the boxes shown or defined in FIG. 1 (i.e. an (empty) box for the unit or molecular building block based on 3-hydroxybutyric acid, a hatched box for the unit or molecular building block based on diglycerol, and a dotted box for the unit or molecular building block based on succinic acid).

In the following, the remaining aspects of the invention are explained in more detail.

A further subject-matter of the present invention—according to a third aspect of the present invention—is a pharmaceutical composition, especially a drug or medicament, which comprises a reaction product obtainable according to the inventive production method or the inventive reaction product, respectively, and/or a polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or a mixture, obtainable according to the inventive production method or the inventive mixture as defined hereinabove, respectively.

Especially, according to this aspect of the invention, the present invention relates to a pharmaceutical composition for the prophylactic and/or therapeutic treatment or for use in the prophylactic and/or therapeutic treatment of diseases of the human or animal body. This may especially concern diseases associated with a disorder of the energy metabolism, especially keto-body metabolism, such as especially craniocerebral trauma, stroke, hypoxia, cardiovascular diseases such as myocardial infarction, refeeding syndrome, anorexia, epilepsy, neurodegenerative diseases such as dementia, Alzheimer's disease, Parkinson's disease, multiple sclerosis and amyotrophic lateral sclerosis, fat metabolic diseases such as glucose transporter defect (GLUT1 defect), VL-FAOD and mitochondriopathies such as mitochondrial thiolase defect, Huntington's disease, cancers such as T-cell lymphomas, astrocytomas and glioblastomas, HIV, rheumatic diseases such as rheumatoid arthritis and arthritis urica, diseases of the gastrointestinal tract such as chronic inflammatory bowel diseases, especially ulcerative colitis and Crohn's disease, lyosomal storage diseases such as sphingolipidosis, especially Niemann-Pick disease, diabetes mellitus and effects or side-effects of chemotherapy, skin diseases and skin injuries, especially to promote wound healing, to treat wounds or to reduce scarring.

Again, a further subject-matter of the present invention—according to a fourth aspect of the present invention—is a reaction product obtainable according to the inventive production method or the inventive reaction product, respectively, or a polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or a mixture, obtainable according to the inventive production method or the inventive mixture as defined hereinabove, respectively, for the prophylactic and/or therapeutic treatment or for use in the prophylactic and/or therapeutic treatment of diseases of the human or animal body, especially diseases associated with a disorder of the energy metabolism, especially keto-body metabolism, such as especially craniocerebral trauma, stroke, hypoxia, cardiovascular diseases such as myocardial infarction, refeeding syndrome, anorexia, epilepsy, neurodegenerative diseases such as dementia, Alzheimer's disease, Parkinson's disease, multiple sclerosis and amyotrophic lateral sclerosis, fat metabolic diseases such as glucose transporter defect (GLUT1 defect), VL-FAOD and mitochondriopathies such as mitochondrial thiolase defect, Huntington's disease, cancers such as T-cell lymphomas, astrocytomas and glioblastomas, HIV, rheumatic diseases such as rheumatoid arthritis and arthritis urica, diseases of the gastrointestinal tract such as chronic inflammatory bowel diseases, especially ulcerative colitis and Crohn's disease, lyosomal storage diseases such as sphingolipidosis, especially Niemann-Pick disease, diabetes mellitus and effects or side-effects of chemotherapy, skin diseases and skin injuries, especially to promote wound healing, to treat wounds or to reduce scarring.

Likewise, a further subject-matter of the present invention—according to a fifth aspect of the present invention—is the use of a reaction product obtainable according to the inventive production method or the inventive reaction product, respectively, or a polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or a mixture, obtainable according to the inventive production method or the inventive mixture as defined hereinabove, respectively, for the prophylactic and/or therapeutic treatment or for producing a pharmaceutical for the prophylactic and/or therapeutic treatment of diseases of the human or animal body, especially diseases associated with a disorder of the energy metabolism, especially keto-body metabolism, such as especially craniocerebral trauma, stroke, hypoxia, cardiovascular diseases such as myocardial infarction, refeeding syndrome, anorexia, epilepsy, neurodegenerative diseases such as dementia, Alzheimer's disease, Parkinson's disease, multiple sclerosis and amyotrophic lateral sclerosis, fat metabolic diseases such as glucose transporter defect (GLUT1 defect), VL-FAOD and mitochondriopathies such as mitochondrial thiolase defect, Huntington's disease, cancers such as T-cell lymphomas, astrocytomas and glioblastomas, HIV, rheumatic diseases such as rheumatoid arthritis and arthritis urica, diseases of the gastrointestinal tract such as chronic inflammatory bowel diseases, especially ulcerative colitis and Crohn's disease, lyosomal storage diseases such as sphingolipidosis, especially Niemann-Pick disease, diabetes mellitus and effects or side-effects of chemotherapy, skin diseases and skin injuries, especially to promote wound healing, to treat wounds or to reduce scarring.

Likewise, a further subject-matter of the present invention—according to a sixth aspect of the present invention—is the use of a reaction product obtainable according to the inventive production method or the inventive reaction product, respectively, or a polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or a mixture, obtainable according to the inventive production method or the inventive mixture as defined hereinabove, respectively, for the prophylactic and/or therapeutic treatment or for producing a medicament for the prophylactic and/or therapeutic treatment of or for the application for catabolic metabolic states, such as hunger, diets or low-carbohydrate nutrition.

Also an object of the present invention—according to this aspect of the present invention—is the use of a reaction product obtainable according to the inventive production method or the inventive reaction product, respectively, or a polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or a mixture, obtainable according to the inventive production method or the inventive mixture as defined hereinabove, respectively, in the field of cosmetics and/or in cosmetics, especially cosmetic formulations, preferentially for preventing aging (anti-aging), or for tissue engineering, especially for angioneogenesis.

In the context of the applications or uses according to the invention (e.g. pharmaceutical compositions, etc.), the reaction products obtainable according to the inventive production method or the inventive reaction products, respectively, or the polyglycerol esters of 3-hydroxybutyric acid crosslinked with polycarboxylic acids, especially mono- or polyvalent polyglycerol esters of 3-hydroxybutyric acid crosslinked with polycarboxylic acids, obtainable according to the inventive production method or the inventive polyglycerol esters of 3-hydroxybutyric acid crosslinked with polycarboxylic acids, especially mono- or polyvalent polyglycerol esters of 3-hydroxybutyric acid crosslinked with polycarboxylic acids, as defined hereinabove, respectively, and/or the mixtures, obtainable according to the inventive production method or the inventive mixtures as defined hereinabove, respectively, can be used or administered in any application form and/or in any application, especially orally, parenterally or topically.

Likewise, a further subject-matter of the present invention—according to a seventh aspect of the present invention—is a cosmetic or cosmetic composition, which comprises a reaction product obtainable according to the inventive production method or the inventive reaction product, respectively, or a polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or a mixture, obtainable according to the inventive production method or the inventive mixture as defined hereinabove, respectively.

An equally further subject-matter of the present invention—according to an eighth aspect of the present invention—is a food and/or a food product, which comprises a reaction product obtainable according to the inventive production method or the inventive reaction product, respectively, or a polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or a mixture, obtainable according to the inventive production method or the inventive mixture as defined hereinabove, respectively.

According to a particular embodiment, the food and/or the food product may essentially be a dietary supplement, a functional food, a novel food, a food additive, a food supplement, a dietary food, a power snack, an appetite suppressant or a strength and/or endurance sport supplement Finally, yet another subject-matter of the present invention—according to a ninth aspect of the present invention—is the use of a reaction product obtainable according to the inventive production method or a polyglycerol ester of 3-hydroxybutyric acid crosslinked with polycarboxylic acids, especially mono- or polyvalent polyglycerol ester of 3-hydroxybutyric acid crosslinked with polycarboxylic acids, obtainable according to the inventive production method or the inventive polyglycerol ester of 3-hydroxybutyric acid crosslinked with polycarboxylic acids, especially mono- or polyvalent polyglycerol ester of 3-hydroxybutyric acid crosslinked with polycarboxylic acids, as defined hereinabove, respectively, and/or a mixture, obtainable according to the inventive production method as defined hereinabove, respectively, in a food and/or a food product.

According to this aspect of the invention, the food and/or the food product may especially be a dietary supplement, a functional food, a novel food, a food additive, a food supplement, a dietary food, a power snack, an appetite suppressant or a strength and/or endurance sports supplement.

Further embodiments, modifications and variations of the present invention are readily recognizable or realizable by a person skilled in the art when reading the description, without leaving the scope of the present invention.

The present invention is illustrated by the following examples, which are not intended to limit the present invention in any way, but only to explain the exemplary and non-limiting implementation and configuration of the present invention.

EXAMPLES

I. Production Examples of a Particular Embodiment of the Method According to the Invention According to Synthesis Route (A)

I. 1. Production of Diglycerol Esters of 3-Hydroxybutyric Acid Crosslinked with Succinic Acid Using Succinic Acid Anhydride In a 500-ml-multi-neck flask with dephlegmator (partial condenser) and distillation bridge, 132 g (R)/(S)-3-hydroxybutyric acid ethyl ester (3-BHB-EE=ethyl 3-hydroxybutanoate or 4-ethoxy-4-oxobutan-2-ol) (racemic), 40 g diglycerol and 1.7 g of an immobilized enzyme (CALB lipase on polymer support, derived from *Candida antarctica*, e.g. Novozym® 435 from Sigma-Aldrich or Merck or Lipozym® 435 from Strem Chemicals, Inc.) are provided. The reaction mixture is caused to react with stirring at 70° C. and under vacuum (<500 mbar) for 10 h, and the resulting ethanol is continuously withdrawn by distillation. The enzyme is then filtered off and the excess 3-hydroxybutyric acid ethyl ester is removed by distillation under vacuum. The corresponding reaction intermediate mixture is then obtained as a residue. If required, the residue obtained can be stream treated in a vacuum for 2 to 4 hours.

A mixture of monodiglycerol esters, didiglycerol esters and tridiglycerol esters of 3-hydroxybutyric acid (i.e. mono-, di- and trivalent diglycerol esters of 3-hydroxybutyric acid) is obtained as the reaction intermediate product Subsequently, the obtained mixture is caused to react with 10 g succinic acid anhydride with stirring at 120° C. for 24 h and the water formed is continuously withdrawn by distillation. A gel-like reaction product is obtained, which consists of diglycerol esters of 3-hydroxybutyric acid crosslinked with succinic acid. The structures are given by way of illustration and purely by way of example in the above reaction schemes of the general description and in the figures.

Characterization is performed by mass spectrometry (MS), gel permeation chromatography (GPC) and proton resonance spectroscopy ($^1$H-NMR).

I. 2. Production of Diglycerol Esters of 3-Hydroxybutyric Acid Crosslinked with Succinic Acid Using Free Succinic Acid In a 500-ml-multi-neck flask with dephlegmator (partial condenser) and distillation bridge, 132 g (R)/(S)-3-hydroxybutyric acid ethyl ester (3-BHB-EE=ethyl 3-hydroxybutanoate or 4-ethoxy-4-oxobutan-2-ol) (racemic), 40 g diglycerol and 1.7 g of an immobilized enzyme (CALB lipase on polymer support, derived from *Candida antarctica*, e.g. Novozym® 435 from Sigma-Aldrich or Merck or Lipozym® 435 from Strem Chemicals, Inc.) are provided. The reaction mixture is caused to react with stirring at 70° C. and under vacuum (<500 mbar) for 10 h, and the resulting ethanol is continuously withdrawn by distillation. The enzyme is then filtered off and the excess 3-hydroxybutyric acid ethyl ester is removed by distillation under vacuum. The corresponding reaction intermediate mixture is then obtained as a residue. The residue obtained can be stream treated in a vacuum for 2 to 4 hours if required.

A mixture of monodiglycerol esters, didiglycerol esters and tridiglycerol esters of 3-hydroxybutyric acid (i.e. mono-, di- and trivalent diglycerol esters of 3-hydroxybutyric acid) is obtained as the reaction intermediate product Subsequently, the obtained mixture is caused to react with 11.8 g succinic acid with stirring at 120° C. for 24 h and the water formed is continuously withdrawn by distillation. A gel-like reaction product is obtained, which consists of diglycerol esters of 3-hydroxybutyric acid crosslinked with succinic acid.

Characterization is performed by mass spectrometry (MS), gel permeation chromatography (GPC) and proton resonance spectroscopy ($^1$H-NMR).

I. 3. Production of Diglycerol Esters of 3-Hydroxybutyric Acid Crosslinked with Succinic Acid Using Succinic Acid Diethyl Esters In a 500-ml-multi-neck flask with dephlegmator (partial condenser) and distillation bridge, 132 g (R)/(S)-3-hydroxybutyric acid ethyl ester (3-BHB-EE=ethyl 3-hydroxybutanoate or 4-ethoxy-4-oxobutan-2-ol) (racemic), 40 g diglycerol and 1.7 g of an immobilized enzyme (CALB lipase on polymer support, derived from *Candida antarctica*, e.g. Novozym® 435 from Sigma-Aldrich or Merck or Lipozym® 435 from Strem Chemicals, Inc.) are provided. The reaction mixture is caused to react with stirring at 70° C. and under vacuum (<500 mbar) for 10 h, and the resulting ethanol is continuously withdrawn by distillation. The enzyme is then filtered off and the excess 3-hydroxybutyric acid ethyl ester is removed by distillation under vacuum. The corresponding reaction intermediate mixture is then obtained as a residue. The residue obtained can be stream treated in a vacuum for 2 to 4 hours if required.

A mixture of monodiglycerol esters, didiglycerol esters and tridiglycerol esters of 3-hydroxybutyric acid (i.e. mono-, di- and trivalent diglycerol esters of 3-hydroxybutyric acid) is obtained as the reaction intermediate product.

Subsequently, the obtained mixture is caused to react with 17.4 g succinic acid diethyl ester with stirring at 120° C. for 24 h and the resulting ethanol is continuously withdrawn by distillation. A gel-like reaction product is obtained, which consists of diglycerol esters of 3-hydroxybutyric acid crosslinked with succinic acid.

Characterization is performed by mass spectrometry (MS), gel permeation chromatography (GPC) and proton resonance spectroscopy ($^1$H-NMR).

I. 4. Production of Further Diglycerol Esters of 3-Hydroxybutyric Acid Crosslinked with Succinic Acid The previously performed synthesis examples according to I. 1., I. 2. and I. 3. are carried out again, however, using the following polycarboxylic acids (first method alternative in each case as free acids) and their respective anhydrides (second method alternative) as well as their respective ethyl esters (third method alternative): tartaric acid, citric acid, malic acid, adipic acid, fumaric acid and maleic acid. Comparable results are obtained in each case.

II. Production Examples of a Particular Embodiment of the Method According to the Invention According to Synthesis Route (B)

II. 1. Production of Diglycerol Esters of 3-Hydroxybutyric Acid Crosslinked with Succinic Add Using Succinic Acid Anhydride 40 g diglycerol and 10 g succinic acid anhydride are provided in a 500-ml-multi-neck flask with dephlegmator (partial condenser) and distillation bridge. The reaction mixture is caused to react with stirring at 120° C. for 24 h and the water formed is continuously withdrawn by distillation. The corresponding reaction intermediate mixture is then obtained as a residue. The residue obtained can be stream treated in a vacuum for 2 to 4 h if required.

A mixture of polyglycerol esters of succinic acid and polyglycerol esters of succinic acid crosslinked with succinic acid is obtained as a reaction intermediate product Subsequently, the obtained mixture is caused to react with 264 g (R)/(S)-3-hydroxybutyric acid ethyl ester (3-BHB-EE=ethyl 3-hydroxybutanoate or 4-ethoxy-4-oxobutan-2-ol) (racemic) and 1.7 g of an immobilized enzyme (CALB lipase on polymer support, derived from *Candida antarctica*, e.g. Novozym® 435 from Sigma-Aldrich or Merck or Lipozym® 435 from Strem Chemicals, Inc.) with stirring at 70° C. and under vacuum (<500 mbar) for 10 h and the resulting ethanol is continuously withdrawn by distillation. The enzyme is then filtered off and the excess 3-hydroxybutyric acid ethyl ester is removed by distillation under vacuum. The desired reaction product mixture is then obtained as a residue. The residue obtained can be stream treated in a vacuum for 2 to 4 hours if required.

A gel-like reaction product is obtained, which—consists of diglycerol esters of 3-hydroxybutyric acid crosslinked with succinic acid.

Characterization is performed by mass spectrometry (MS), gel permeation chromatography (GPC) and proton resonance spectroscopy ($^1$H-NMR).

II. 2. Production of Diglycerol Esters of 3-Hydroxybutyric Acid Crosslinked with Succinic Acid Using Free Succinic Acid 40 g diglycerol and 11.8 g succinic acid are provided in a 500-ml-multi-neck flask with dephlegmator (partial condenser) and distillation bridge. The reaction mixture is caused to react with stirring at 120° C. for 24 h and the water formed is continuously withdrawn by distillation. The corresponding reaction intermediate mixture is then obtained as a residue. The residue obtained can be stream treated in a vacuum for 2 to 4 h if required.

The reaction intermediate product obtained is a mixture of polyglycerol esters of succinic acid and polyglycerol esters of succinic acid crosslinked with succinic acid.

Subsequently, the obtained mixture is caused to react with 264 g (R)/(S)-3-hydroxybutyric acid ethyl ester (3-BHB-EE=ethyl 3-hydroxybutanoate or 4-ethoxy-4-oxobutan-2-ol) (racemic) and 1.7 g of an immobilized enzyme (CALB lipase on polymer support, derived from *Candida antarctica*, e.g. Novozym® 435 from Sigma-Aldrich or Merck or Lipozym® 435 from Strem Chemicals, Inc.) with stirring at 70° C. and under vacuum (<500 mbar) for 10 h and the resulting ethanol is continuously withdrawn by distillation. The enzyme is then filtered off and the excess 3-hydroxybutyric acid ethyl ester is removed by distillation under vacuum. The desired reaction product mixture is then obtained as a residue. The residue obtained can be stream treated in a vacuum for 2 to 4 hours if necessary.

A gel-like reaction product is obtained, which consists of diglycerol esters of 3-hydroxybutyric acid crosslinked with succinic acid.

Characterization is performed by mass spectrometry (MS), gel permeation chromatography (GPC) and proton resonance spectroscopy ($^1$H-NMR).

II. 3. Production of Diglycerol Esters of 3-Hydroxybutyric Acid Crosslinked with Succinic Acid Using Succinic Acid Diethyl Esters 40 g diglycerol and 17.4 g succinic acid diethyl ester are provided in a 500-ml-multi-neck flask with dephlegmator (partial condenser) and distillation bridge. The reaction mixture is caused to react with stirring at 120° C. for 24 h and the water formed is continuously withdrawn by distillation. The corresponding reaction intermediate mixture is then obtained as a residue. The residue obtained can be stream treated in a vacuum for 2 to 4 h, if required.

The reaction intermediate product obtained is a mixture of polyglycerol esters of succinic acid and polyglycerol esters of succinic acid crosslinked with succinic acid.

Subsequently, the obtained mixture is caused to react with 264 g (R)/(S)-3-hydroxybutyric acid ethyl ester (3-BHB-EE=ethyl 3-hydroxybutanoate or 4-ethoxy-4-oxobutan-2-ol) (racemic) and 1.7 g of an immobilized enzyme (CALB lipase on polymer support, derived from *Candida antarctica*, e.g. Novozym® 435 from Sigma-Aldrich or Merck or Lipozym® 435 from Strem Chemicals, Inc.) with stirring at 70° C. and under vacuum (<500 mbar) for 10 h and the resulting ethanol is continuously withdrawn by distillation. The enzyme is then filtered off and the excess 3-hydroxybutyric acid ethyl ester is removed by distillation under vacuum. The desired reaction product mixture is then obtained as a residue. The residue obtained can be stream treated in a vacuum for 2 to 4 hours if required.

A gel-like reaction product is obtained, which consists of diglycerol esters of 3-hydroxybutyric acid crosslinked with succinic acid.

Characterization is performed by mass spectrometry (MS), gel permeation chromatography (GPC) and proton resonance spectroscopy ($^1$H-NMR).

II. 4. Production of Further Diglycerol Esters of 3-Hydroxybutyric Acid Crosslinked with Succinic Acid The previously performed synthesis examples according to II. 1., II. 2. and II. 3. are carried out again, however, using the following polycarboxylic acids and their respective anhydrides as well as ethyl esters: tartaric acid, citric acid, malic acid, adipic acid, fumaric acid and maleic acid. Comparable results are obtained.

III. Production Examples of an Alternative Particular Embodiment of the Method According to the Invention Using a Metal Catalyst All chemical synthesis examples previously described under section I. and section II. are carried out again, however, with the addition of titanium tetrabutylate as a catalyst (titanium(IV)-catalyst) in the respective method steps (a) and/or (b). The titanium(IV)-catalyst is provided in the flask together with the other reactants and the reactions are carried out at 120° C. Comparable results are obtained. The catalyst is separated and recycled after the end of the reaction.

IV. Production Examples of a Further Alternative Particular Embodiment of the Method According to the Invention Using an Enzyme Catalyst All chemical synthesis examples previously described in section 1. and section II. are carried out again, however, with the addition of an immobilized enzyme (CALB lipase on polymer support, derived from *Candida antarctica*, e.g. Novozym® 435 from Sigma-Aldrich or Merck or Lipozym® 435 from Strem Chemicals, Inc.) as a catalyst in method steps (a) and (b). The enzyme is provided in the flask together with the other reactants and the reactions are carried out at 70° C. under vacuum. Comparable results are obtained. The enzyme is separated and recycled after the end of the reaction.

V. Production Examples of a Further Alternative Particular Embodiment of the Method According to the Invention without the Use of a Catalyst All the chemical synthesis examples previously described in Section 1. and Section II. are carried out again, however, without the addition of a catalyst. The reaction is carried out at 120° C. and comparable results are obtained.

VI. Structural Analysis

For structural analysis, a monodiglycerol ester of 3-hydroxybutyric acid crosslinked with succinic acid is produced according to synthesis route (A) and characterized by gel permeation chromatography (GPC) and acid number determination.

In the first method step (a), 264 g (R)/(S)-3-hydroxybutyric acid ethyl ester (3-BHB-EE=ethyl 3-hydroxybutanoate or 4-ethoxy-4-oxobutan-2-ol) (racemic), 80 g diglycerol and 3.4 g of an immobilized enzyme (CALB lipase on polymer support; derived from *Candida antarctica*, e.g. Novozym® 435 from Sigma-Aldrich or Merck or Lipozym® 435 from Strem Chemicals, Inc.) are provided in a 1000-ml-multineck flask with dephlegmator (partial condenser) and distillation bridge. The reaction mixture is caused to react with stirring at 70° C. and under vacuum (<500 mbar) for 10 h, and the resulting ethanol is continuously removed by distillation. The enzyme is then filtered off and the excess 3-hydroxybutyric acid ethyl ester is removed by distillation under vacuum.

The corresponding reaction intermediate mixture is then obtained as a residue. The residue obtained is stream treated in a vacuum for 2 to 4 hours. Subsequently, the obtained mixture of monodiglycerol esters, didiglycerol esters and tridiglycerol esters of 3-hydroxybutyric acid (i.e. mono-, di- and trivalent diglycerol esters of 3-hydroxybutyric acid) is fractionated by distillation and the individual esters (i.e. monodiglycerol esters, didiglycerol esters and tridiglycerol esters of 3-hydroxybutyric acid) are separated.

Subsequently, in the second method step (b), 100 g of the monodiglycerol ester of 3-hydroxybutyric acid are caused to react with 10 g succinic acid anhydride according to a first batch with stirring at 80° C. for 20 h and the water formed is continuously withdrawn by distillation. A sample is taken for further analysis (Sample A) and then another 7 g succinic acid anhydride are added and caused to react at 120° C. for another 6 h. The water formed is withdrawn by continuous distillation. Then another sample is taken for analysis (sample C).

Furthermore, in the second method step (b), according to a second approach, 100 g of the monodiglycerol ester of 3-hydroxybutyric acid are caused to react with 10 g succinic acid anhydride with the addition of 100 µL of titanium tetrabutylate (catalyst) with stirring at 80° C. for 20 h and the water formed is continuously withdrawn by distillation. A sample is taken for further analysis (sample B) and then another 7 g succinic acid anhydride are added and caused to react at 80° C. for another 6 h. The water formed is withdrawn by continuous distillation. Then another sample is taken for analysis (sample D).

The samples taken are analyzed and the results are summarized in Table 1.

TABLE 1

GC area analysis [%] and viscosity of samples A, B, C and D and the reactant (monodiglycerol esters of 3-hydroxybutyric acid).

|  | Area % $Mn = 480$ g/mol | Area % $Mn = 640 + 790$ g/mol | Area % $Mn = 1200$ g/mol | Mw/Mn [g/mol/g/mol] | Viscosity at 25° C. [Pas] |
|---|---|---|---|---|---|
| Educt | 54.2 | 41.5 | — | 540/510 | 15,700 |
| A | 35.9 | 61.2 | — | 600/550 | 28,900 |
| B | 36.0 | 50.2 + 9.8 | 1.2 | 600/550 | 28,900 |
| C | 24.3 | 44.9 + 14.1 | 14.0 | 700/620 | 44,000 |
| D | 25.9 | 52.3 + 17.9 | 1.6 | 640/600 | 40,400 |

In addition, the degree of crosslinking of the samples is calculated using the acid number. The calculation is summarized in Table 2. The smaller the ratio $SZ_{ist}/SZ_{theo}$, the higher the crosslinking.

TABLE 2

Determination of the degree of crosslinking of samples A, B, C and D

|  | $SZ_{ist}$ [mg KOH/g] | $SZ_{theo}$ [mg KOH/g] | $SZ_{ist}/SZ_{theo}$ [%] |
|---|---|---|---|
| A | 50.4 | 52.4 | 96.7 |
| B | 49.5 | 52.9 | 99.0 |
| C | 74.9 | 86.9 | 83.5 |
| D | 85.3 | 88.0 | 96.7 |

VII. Physiological Application Tests: In Vitro Digestion Tests

VII. 1. Digestion Experiments (Splitting or Cleavage Experiments) of Inventive Polyglycerols of 3-Hydroxybutyric Acid Crosslinked with Polycarboxylic Acids By means of cleavage experiments, it is shown that diglycerol esters of 3-hydroxybutyric acid crosslinked with polycarboxylic acids prepared according to the invention or mixtures thereof (cf. previously described experiments according to I., II. III., IV. and V.), including the reaction by-products, can be cleaved in the human gastrointestinal tract In each case, purified reaction products obtained by the method according to the invention are used as starting mixtures:

- diglycerol esters of 3-hydroxybutyric acid crosslinked with tartaric acid,
- diglycerol esters of 3-hydroxybutyric acid crosslinked with citric acid,
- diglycerol esters of 3-hydroxybutyric acid crosslinked with malic acid,
- diglycerol esters of 3-hydroxybutyric acid crosslinked with adipic acid,
- diglycerol esters of 3-hydroxybutyric acid crosslinked with fumaric acid and
- diglycerol esters of 3-hydroxybutyric acid crosslinked with maleic acid.

For the cleavage experiments under near-body conditions two media are investigated:
FaSSGF, which simulates the stomach
FaSSIF, which simulates the intestinal tract.

Both media are from the company Biorelevant®, Ltd. in Great Britain. In addition, in some experiments porcine pancreas is added (Panzytrat® 40,000, Fa. Allergan).

The results of the cleavage experiments in a FaSSGF or FaSSIF medium with Panzytrat® and without Panzytrat® (both 35° C., 24 h) show that the samples hydrolyze under FaSSGF conditions with Panzytrat® and without Panzytrat®; this is mainly due to the low pH value (pH=1.6) of the medium. Under FaSSIF conditions, a lower conversion using Panzytrat® takes place.

In all cleavage experiments, it can be seen that the cleavage proceeds in the form of a cascade (i.e. the tetradiglycerol ester becomes the tridiglycerol ester, the tridiglycerol ester becomes the didiglycerol ester, etc.). Furthermore, the polycarboxylic acid is cleaved off. In total, the polycarboxylic acids and the free butyric acid that can be utilized by the body are thus released, and furthermore the non-toxic, physiologically compatible carrier diglycerol is released, which is excreted by the body.

Overall, therefore, there is a retardation effect (i.e. the release of 3-hydroxybutyric acid and polycarboxylic acid takes place with a delay or continuously, respectively, over a longer period of time).

VII. 2. Further Digestion Experiments (Cleavage Experiments) of Carboxylic Acids of 3-Hydroxybutanoate According to the Invention Cleavage Experiments with Pancreatin 2 g of a polycarboxylic acid-crosslinked diglycerol ester of 3-hydroxybutyric acid produced as described above or a mixture thereof (mixture of corresponding monodiglycerol, didiglycerol, tridiglycerol and/or tetradiglycerol esters of 3-hydroxybutyric acid crosslinked with polycarboxylic acids) are dissolved in 50 g water and 0.5 g (1% by weight) pancreatin is added. The pancreatin is used in the form of the commercially available product Panzytrat® 40,000 from Allergan. The whole mixture is stirred on a hot plate at 50° C.; the course of the reaction is determined and followed by continuous recording of the acid number over time. The acid number increases over the observation period (cleavage of the diglycerol esters of 3-hydroxybutyric acid crosslinked with polycarboxylic acids). The conversion-time-course of the aqueous cleavage of the diglycerol esters of 3-hydroxybutyric acid crosslinked with polycarboxylic acids according to the invention by means of pancreatin, including increase of the acid number over time, proves the desired decomposition of the reactant mixture to the free polycarboxylic acid and the free 3-hydroxybutyric acid. This is confirmed by corresponding analytics. The experiment proves that the starting mixture according to the invention is a suitable physiological precursor for 3-hydroxybutyric acid or its esters (3-hydroxybutanoates) for the corresponding keto-body therapies.

VII. 3. Conclusions

The cleavage experiments described above demonstrate that the diglycerol esters of 3-hydroxybutyric acid crosslinked with polycarboxylic acids are efficient precursors or metabolites of free hydroxybutyric acid or its esters (here: ethyl esters), particularly with regard to their intended effect, which are present in physiologically tolerable or physiologically compatible form. Likewise, metabolically usable or convertible polycarboxylic acids occurring in the natural metabolism (e.g. citrate cycle) or their derivatives, especially salts, are formed (e.g. citric acid or citrates, malic acid or malates, tartaric acid or tartrates, etc.). The diglycerol serves as a physiologically compatible, non-toxic carrier molecule for the binding of a large number of active ingredient molecules (=3-hydroxybutyric acid), which can itself be excreted without further ado; this results in a high active ingredient density on the one hand and a desired controlled, especially sustained, release on the other.

VIII. Further Testing (Organoleptic and Toxicity)

Further experiments and test series are carried out with regard to organoleptic and toxicity of the diglycerol esters of 3-hydroxybutyric acid crosslinked with polycarboxylic acids according to the invention. These show that the diglycerol esters of 3-hydroxybutyric acid crosslinked with polycarboxylic acids according to the invention are organoleptically acceptable and compatible, especially exhibit significantly improved organoleptic properties compared with pure 3-hydroxybutyric acid as well as its salts and esters, and moreover do not exhibit any toxicity contrary to the application.

The invention claimed is:
1. A method for producing polyglycerol esters of 3-hydroxybutyric acid crosslinked with polycarboxylic acids,
   wherein the following reactants (i), (i) and (iii) are reacted with one another:
   (i) at least one 3-hydroxybutyric acid compound of the general formula (I)

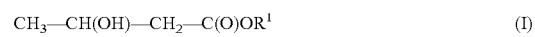
   $$CH_3\text{—}CH(OH)\text{—}CH_2\text{—}C(O)OR^1 \quad (I)$$

wherein, in the general formula (I), the radical $R^1$ is selected among hydrogen, a radical —(O)C—CH$_2$—CH(OH)—CH$_3$ and C$_1$-C$_4$-alkyl,
   (ii) at least one polyglycerol (II) of the general formula (IIa)

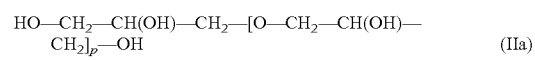
   $$HO\text{—}CH_2\text{—}CH(OH)\text{—}CH_2\text{—}[O\text{—}CH_2\text{—}CH(OH)\text{—}CH_2]_p\text{—}OH \quad (IIa)$$

wherein, in the general formula (IIa), the variable p represents an integer from 1 to 6,
   (iii) at least one polycarboxylic acid (III) comprising at least two carboxyl groups, wherein the polycarboxylic acid (III) is used in the form of one of the free polycarboxylic acid, a salt of the polycarboxylic acid, an ester of the polycarboxylic acid ester and an anhydride of the polycarboxylic acid;
   wherein the method is carried out in the absence of any solvent;
   so that, as a reaction product (IV), there is obtained at least one polyglycerol ester of 3-hydroxybutyric acid, which polyglycerol ester is crosslinked with polycarboxylic acids and which polyglycerol ester is represented by the general formula (IVa):

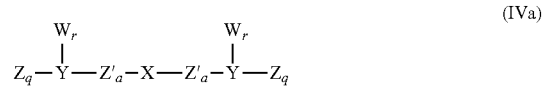
   $$Z_q\text{—}\underset{|}{Y}\text{—}Z'_a\text{-}X\text{-}Z'_a\text{—}\underset{|}{Y}\text{—}Z_q \quad (IVa)$$
   $$\overset{W_r}{\phantom{|}} \qquad \overset{W_r}{\phantom{|}}$$

wherein, in the general formula (IVa),
   X represents a radical —C(O)—X'—C(O)—, wherein X' represents a saturated or unsaturated organic radical derived from a polycarboxylic acid and comprising 1 to 10, which radical may be mono- or polysubstituted by at least one of a hydroxyl radical and a carboxyl radical;

Y represents a radical derived from a polyglycerol and represented by the general formula (IIc)

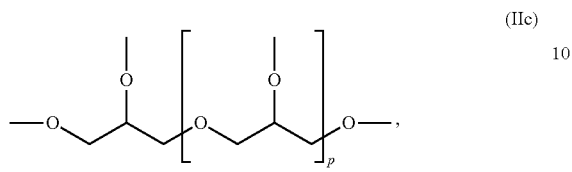

wherein the variable p represents an integer from 1 to 6;

Z represents a radical —C(O)—CH$_2$—CH(OH)—CH$_3$ and the variable q, independently of one another, is an integer from 1 to (p+2) with p being an integer from 1 to 6;

Z' represents a radical —C(O)—CH$_2$—CH(CH$_3$)—O— and the variable a, independently of one another, is 0 or 1;

W, independently of one another, is selected among hydrogen, —X—OH with X as defined hereinbefore and at least one of the following blocks

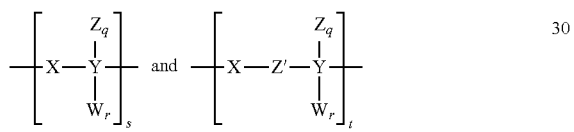

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

2. The method according to claim 1,
wherein the method is carried out in several stages;
wherein the method is performed according to one of the following synthesis route (A) and synthesis route (B),
wherein, according to synthesis route (A), first the at least one 3-hydroxybutyric acid compound of the general formula (I) is reacted with the at least one polyglycerol (II), so that at least one polyglycerol ester of 3-hydroxybutyric acid is obtained as a reaction intermediate product (IVA'), followed by further reaction of the resulting reaction intermediate product (IV'A) with the at least one polycarboxylic acid (III), and
wherein, according to synthesis route (B), the at least one polyglycerol (II) is first reacted with the at least one polycarboxylic acid (III), so that at least one polyglycerol ester of the polycarboxylic acid (III) is obtained as a reaction intermediate product (IVB') followed by further reaction of the resulting reaction intermediate product (IV'B) with the at least one 3-hydroxybutyric acid compound of the general formula (I).

3. The method according to claim 1,
wherein the method is carried out in several stages,
wherein the method is performed according to one of the following synthesis route (A) and synthesis route (B);

wherein, according to a synthesis route (A):
(a) in a first method step (a), the at least one 3-hydroxybutyric acid compound of the general formula (I) is reacted with the at least one polyglycerol (II) of the general formula (IIa), so that, as a reaction intermediate product (IVA') of the method step (a), at least one polyglycerol ester of 3-hydroxybutyric acid is obtained, and
(b) subsequently, in a second method step (b), the reaction intermediate product (IVA') obtained in method step (a) is reacted with the at least one polycarboxylic acid (III) in an esterification reaction;
and
wherein, according to a synthesis route (B):
(a) in a first method step (a), the at least one polyglycerol (II) of the general formula (IIa) is reacted with the at least one polycarboxylic acid (III) in an esterification reaction, so that, as a reaction intermediate product (IVB') of the method step (a), at least one polyglycerol ester of the polycarboxylic acid (III) is obtained, and
(b) subsequently, in a second method step (b), the reaction intermediate product (IVB') obtained in method step (a) is reacted with the at least one 3-hydroxybutyric acid compound of the general formula (I).

4. The method according to claim 1,
wherein the polyglycerol (II) is a diglycerol of formula (IIb)

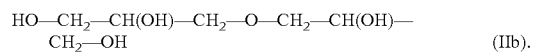

5. The method according to claim 1,
wherein the polycarboxylic acid (III) is selected from the group consisting of succinic acid, tartaric acid, citric acid, malic acid, adipic acid, fumaric acid and maleic acid as well as combinations and mixtures thereof.

6. The method according to claim 1,
wherein the method is carried out in several stages, wherein the method is performed according to one of the following synthesis route (A) and synthesis route (B);
wherein, according to a synthesis route (A):
(a) in a first method step (a), at least one 3-hydroxybutyric acid compound of the general formula (I)

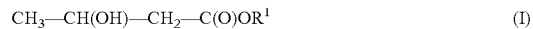

wherein, in the general formula (I), the radical R$^1$ is selected among hydrogen, a radical —(O)C—CH$_2$—CH(OH)—CH$_3$ and C$_1$-C$_4$-alkyl, is reacted, in an esterification reaction, with at least one polyglycerol (II) of the general formula (IIa)

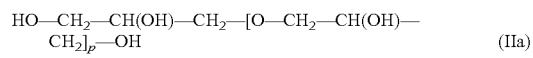

wherein, in the general formula (IIa), the variable p represents an integer from 1 to 6,
so that, as a reaction intermediate product (IVA') of the method step (a), at least one polyglycerol ester of 3-hydroxybutyric acid is obtained, and
(b) subsequently, in a second method step (b), the reaction intermediate product (IVA') obtained in method step (a) is reacted, in an esterification reaction, with at least one polycarboxylic acid (III) selected from the group consisting of succinic acid, tartaric acid, citric acid, malic acid, adipic acid, fumaric acid and maleic acid as well as combinations and mixtures thereof, wherein the polycarboxylic acid (III) is used in the form of one of the free polycarboxylic acid, a salt of the polycarboxylic acid, an ester of the polycarboxylic acid ester and an anhydride of the polycarboxylic acid, so that, as a reaction product (IV), there is obtained at least one polyglycerol ester of 3-hydroxybutyric acid which polyglycerol ester is crosslinked with polycarboxylic acids and which polyglycerol ester is represented by the general formula (IVa) as defined in claim 1;

and wherein, according to a synthesis route (B):

(a) in a first method step (a), at least one polyglycerol (II) of the general formula (IIa)

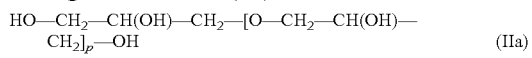    (IIa)

wherein, in the general formula (IIa), the variable p represents an integer from 1 to 6, is reacted, in an esterification reaction, with at least one polycarboxylic acid (III) selected from the group consisting of succinic acid, tartaric acid, citric acid, malic acid, adipic acid, fumaric acid and maleic acid as well as combinations and mixtures thereof, wherein the polycarboxylic acid (III) is used in the form of one of the free polycarboxylic acid, a salt of the polycarboxylic acid, an ester of the polycarboxylic acid ester and an anhydride of the polycarboxylic acid, so that, as a reaction intermediate product (IVB') of method step (a), at least one polyglycerol ester of the polycarboxylic acid (III) is obtained, and (b) subsequently, in a second method step (b), the reaction intermediate product (IVB') obtained in method step (a) is reacted, in an esterification reaction, with at least one 3-hydroxybutyric acid compound of the general formula (I)

$CH_3—CH(OH)—CH_2—C(O)OR^1$    (I)

wherein, in the general formula (I), the radical $R^1$ is selected among hydrogen, a radical $—(O)C—CH_2—CH(OH)—CH_3$ and $C_1$-$C_4$-alkyl, so that, as a reaction product (IV), there is obtained at least one polyglycerol ester of 3-hydroxybutyric acid which polyglycerol ester is crosslinked with polycarboxylic acids and which polyglycerol ester is represented by the general formula (IVa) as defined in defined claim 1.

7. The method according to claim 1,
wherein hydroxyl groups and carboxyl groups still present in the reaction product (IV) after the reaction has been performed are at least partially functionalized.

8. The method according to claim 1,
wherein the reaction is followed by an at least partial functionalization of hydroxyl groups and carboxyl groups still present after the reaction has been performed, which functionalization is performed via esterification.

9. A polyglycerol ester of 3-hydroxybutyric acid, cross-linked with polycarboxylic acids,
wherein the polyglycerol ester of 3-hydroxybutyric acid, crosslinked with polycarboxylic acids, corresponds to the general formula (IVa)

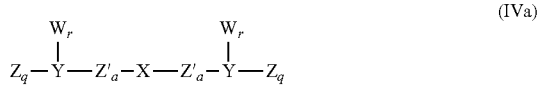    (IVa)

wherein, in the general formula (IVa),

X represents a radical $—C(O)—X'—C(O)—$, wherein X' represents a saturated or unsaturated organic radical derived from a polycarboxylic acid and comprising 1 to 10, which radical may be mono- or polysubstituted by at least one of a hydroxyl radical and a carboxyl radical;

Y represents a radical derived from a polyglycerol and represented by the general formula (IIc)

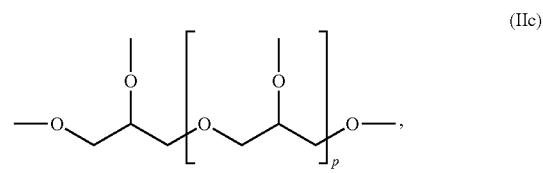    (IIc)

wherein the variable p represents an integer from 1 to 6;

Z represents a radical $—C(O)—CH_2—CH(OH)—CH_3$ and the variable q, independently of one another, is an integer from 1 to (p+2) with p being an integer from 1 to 6;

Z' represents a radical $—C(O)—CH_2—CH(CH_3)—O—$ and the variable a, independently of one another, is 0 or 1;

W, independently of one another, is selected among hydrogen, $—X—OH$ with X as defined hereinbefore and at least one of the following blocks

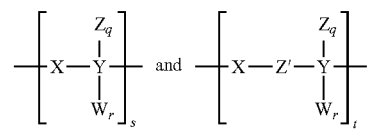

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, $—X—OH$ and Z.

10. The polyglycerol ester of 3-hydroxybutyric acid according to claim 9,
wherein the polyglycerol ester of 3-hydroxybutyric acid corresponds to the general formula (IVa)

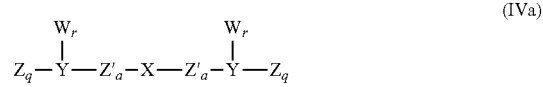    (IVa)

wherein, in the general formula (IVa),

X represents a radical $—C(O)—X'—C(O)—$, wherein X' represents a saturated or unsaturated organic radical derived from a polycarboxylic acid and comprising 1 to 10, which radical may be mono- or polysubstituted by at least one of a hydroxyl radical and a carboxyl radical;

Y represents a radical derived from a polyglycerol of the general formula (IId)

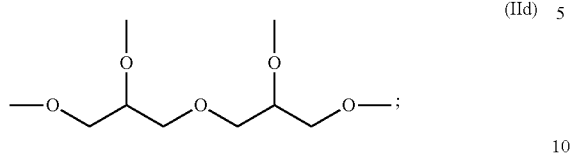 (IId)

Z represents a radical —C(O)—CH$_2$—CH(OH)—CH$_3$ and the variable q, independently of one another, is an integer from 1 to (p+2) with p being an integer from 1 to 6;

Z' represents a radical —C(O)—CH$_2$—CH(CH$_3$)—O— and the variable a, independently of one another, is 0 or 1;

W, independently of one another, is selected among hydrogen, —X—OH with X as defined hereinbefore and at least one of the following blocks

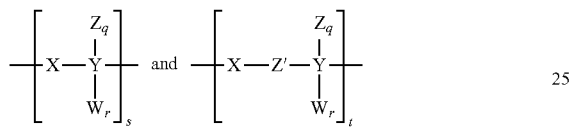

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

11. The polyglycerol ester of 3-hydroxybutyric acid according to claim 9,
wherein the polyglycerol ester of 3-hydroxybutyric acid corresponds to the general formula (IVa)

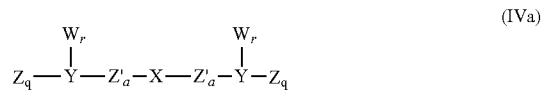 (IVa)

wherein, in the general formula (IVa),
X represents a radical —C(O)—X'—C(O)—, wherein X' represents a saturated or unsaturated organic radical derived from a polycarboxylic acid and comprising 2 to 6, which radical may be mono- or polysubstituted by at least one of a hydroxyl radical and a carboxyl radical;
Y represents a radical derived from a polyglycerol of the general formula (IId)

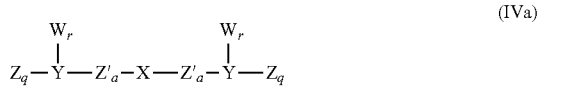 (IId)

Z represents a radical —C(O)—CH$_2$—CH(OH)—CH$_3$ and the variable q, independently of one another, is an integer from 1 to (p+2) with p being an integer from 1 to 6;

Z' represents a radical —C(O)—CH$_2$—CH(CH$_3$)—O— and the variable a, independently of one another, is 0 or 1;

W, independently of one another, is selected among hydrogen, —X—OH with X as defined hereinbefore and at least one of the following blocks

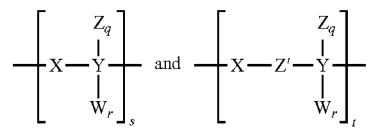

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

12. The polyglycerol ester of 3-hydroxybutyric acid according to claim 9,
wherein the polyglycerol ester of 3-hydroxybutyric acid corresponds to the general formula (IVa)

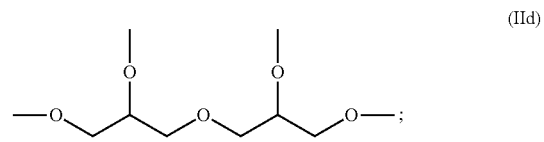 (IVa)

wherein, in the general formula (IVa),
X is derived from a polycarboxylic acid selected from the group consisting of succinic acid, tartaric acid, citric acid, malic acid, adipic acid, fumaric acid and maleic acid as well as combinations and mixtures thereof;
Y represents a radical derived from a polyglycerol of the general formula (IId)

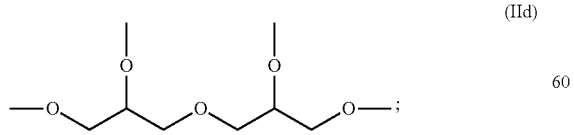 (IId)

Z represents a radical —C(O)—CH$_2$—CH(OH)—CH$_3$ and the variable q, independently of one another, is an integer from 1 to (p+2) with p being an integer from 1 to 6;

Z' represents a radical —C(O)—CH$_2$—CH(CH$_3$)—O— and the variable a, independently of one another, is 0 or 1;

W, independently of one another, is selected among hydrogen, —X—OH with X as defined hereinbefore and at least one of the following blocks

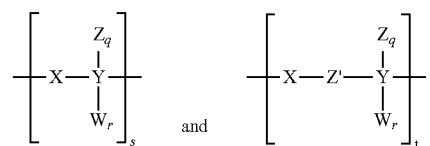

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

13. The polyglycerol ester of 3-hydroxybutyric acid according to claim 9, wherein the polyglycerol ester of 3-hydroxybutyric acid corresponds to the general formula (IVa)

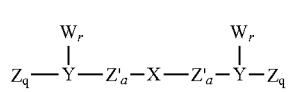

(IVa)

wherein, in the general formula (IVa),

X represents one of the following radicals:

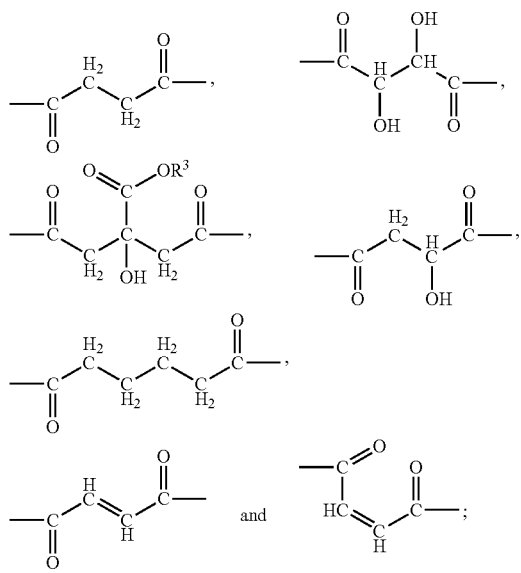

wherein, in the above radicals, the radical $R^3$ is selected among hydrogen, an optionally substituted polyglycerol radical and a radical —CH(CH$_3$)—CH$_2$—C(O)OR$^1$ with R$^1$ being selected among hydrogen, a radical —(O)C—CH$_2$—CH(OH)—CH$_3$ and C$_1$-C$_4$-alkyl;

Y represents a radical derived from a polyglycerol of the general formula (IIc)

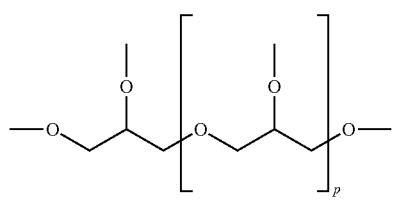

(IIc)

wherein the variable p represents an integer from 1 to 6;

Z represents a radical —C(O)—CH$_2$—CH(OH)—CH$_3$ and the variable q, independently of one another, is an integer from 1 to (p+2) with p being an integer from 1 to 6;

Z' represents a radical —C(O)—CH$_2$—CH(CH$_3$)—O— and the variable a, independently of one another, is 0 or 1;

W, independently of one another, is selected among hydrogen, —X—OH with X as defined hereinbefore and at least one of the following blocks

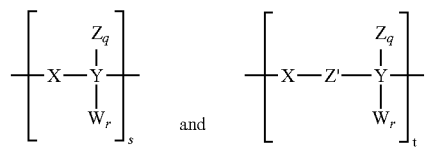

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

14. The polyglycerol ester of 3-hydroxybutyric acid according to claim 9, wherein the polyglycerol ester of 3-hydroxybutyric corresponds to the general formula (IVa)

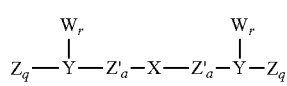

(IVa)

wherein, in the general formula (IVa),

X represents one of the following radicals:

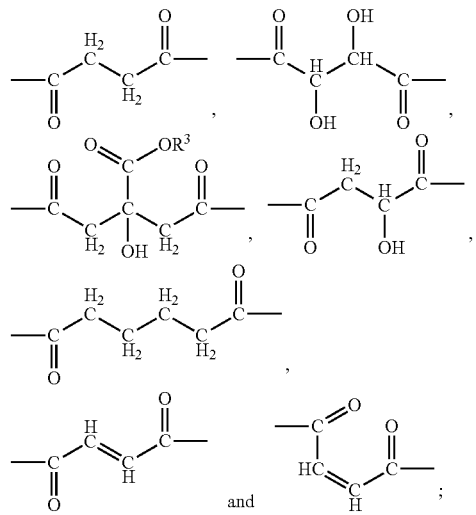

wherein, in the above radicals, the radical $R^3$ is selected among hydrogen, an optionally substituted polyglycerol radical and a radical —CH(CH$_3$)—CH$_2$—C(O)

OR$^1$ with R$^1$ being selected among hydrogen, a radical —(O)C—CH$_2$—CH(OH)—CH$_3$ and C$_1$-C$_4$-alkyl;

Y represents a radical derived from a polyglycerol of the general formula (IId)

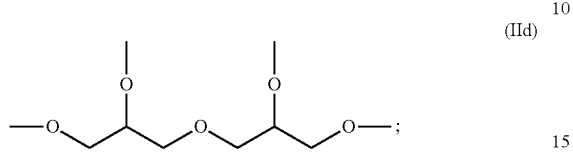

(IId)

Z represents a radical —C(O)—CH$_2$—CH(OH)—CH$_3$ and the variable q, independently of one another, is an integer from 1 to (p+2) with p being an integer from 1 to 6;

Z' represents a radical —C(O)—CH$_2$—CH(CH$_3$)—O— and the variable a, independently of one another, is 0 or 1;

W, independently of one another, is selected among hydrogen, —X—OH with X as defined hereinbefore and at least one of the following blocks

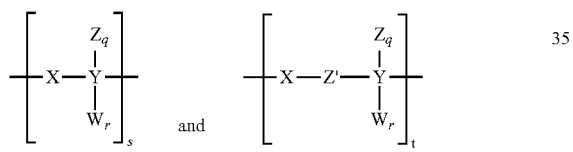

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

15. The polyglycerol ester of 3-hydroxybutyric acid according to claim 9, wherein the polyglycerol ester of 3-hydroxybutyric acid corresponds to the general formula (IVb)

(IVb)

wherein, in the general formula (IVb),

X represents a radical —C(O)—X'—C(O)—, wherein X' represents a saturated or unsaturated organic radical derived from a polycarboxylic acid and comprising 1 to 10, which radical may be mono- or polysubstituted by at least one of a hydroxyl radical and a carboxyl radical;

Y represents a radical derived from a polyglycerol of the general formula (IIc)

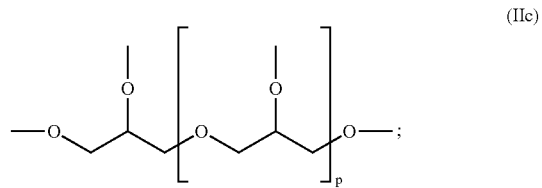

(IIc)

wherein the variable p represents an integer from 1 to 6;

Z represents a radical —C(O)—CH$_2$—CH(OH)—CH$_3$ and the variable q, independently of one another, is an integer from 1 to (p+2) with p being an integer from 1 to 6;

W, independently of one another, is selected among hydrogen, —X—OH with X as defined hereinbefore and a block

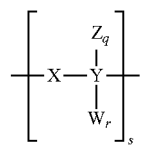

with X, Y, Z, Z' and q each as defined hereinbefore, wherein the variable s, independently of one another, is an integer from 0 to 30 and the variable r, independently of one another, is an integer from 0 to (p+1) with p being an integer from 1 to 6, wherein the chain end of the blocks is in each case formed by one of hydrogen, —X—OH and Z.

16. The polyglycerol ester of 3-hydroxybutyric acid according to claim 9, wherein the polyglycerol ester of 3-hydroxybutyric acid corresponds to the general formula (IVb)

(IVb)

wherein, in the general formula (IVb),

X represents one of the following radicals:

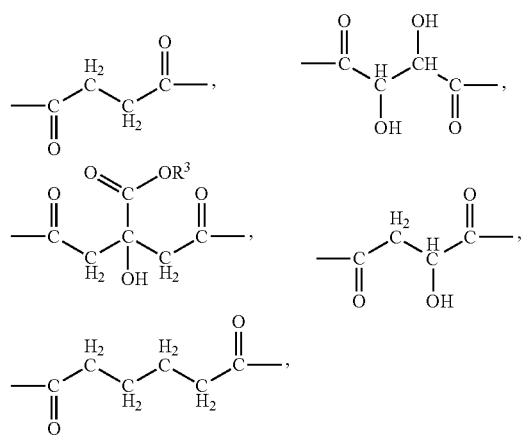

-continued

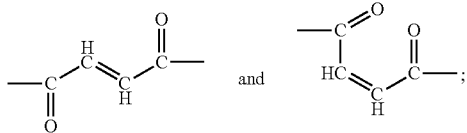

wherein, in the above radicals, the radical R³ is selected among hydrogen, an optionally substituted polyglycerol radical and a radical —CH(CH₃)—CH₂—C(O)OR¹ with R¹ being selected among hydrogen, a radical —(O)C—CH₂—CH(OH)—CH₃ and C₁-C₄-alkyl;

Y represents a radical derived from a polyglycerol of the general formula (IIc)

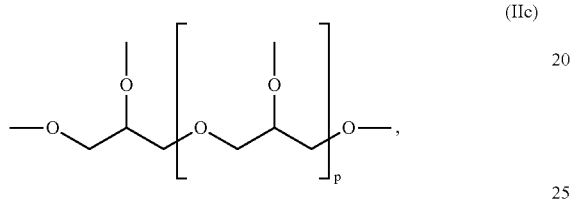

(IIc)

wherein the variable p represents an integer from 1 to 6;

Z represents a radical —C(O)—CH₂—CH(OH)—CH₃ and the variable q, independently of one another, is an integer from 1 to (p+2) with p being an integer from 1 to 6;

W, independently of one another, is selected among hydrogen, —X—OH with X as defined hereinbefore and a block

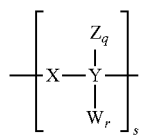

with X, Y, Z, Z' and q each as defined hereinbefore, wherein the variable s, independently of one another, is an integer from 0 to 30 and the variable r, independently of one another, is an integer from 0 to (p+1) with p being an integer from 1 to 6, wherein the chain end of the blocks is in each case formed by one of hydrogen, —X—OH and Z.

17. The polyglycerol ester of 3-hydroxybutyric acid according to claim 9,
wherein the polyglycerol ester of 3-hydroxybutyric acid comprises the following units:
at least one unit X" of the following formulae:

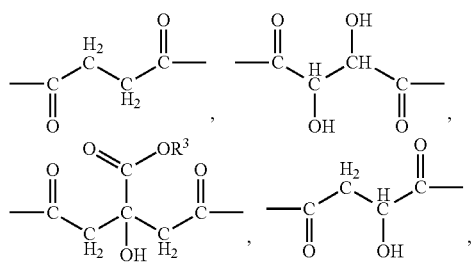

-continued

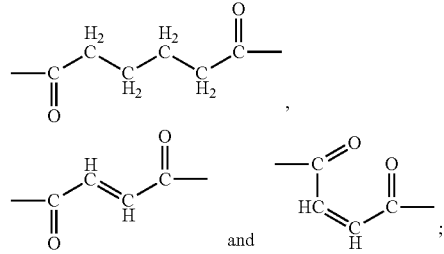

wherein, in the above radicals, the R³ radical is selected among hydrogen, an optionally substituted polyglycerol radical and a radical —CH(CH₃)—CH₂—C(O)OR¹ with R¹ being selected among hydrogen, a radical —(O)C—CH₂—CH(OH)—CH₃ and C₁-C₄-alkyl;

at least one unit derived from a polyglycerol of the general formula (IIc)

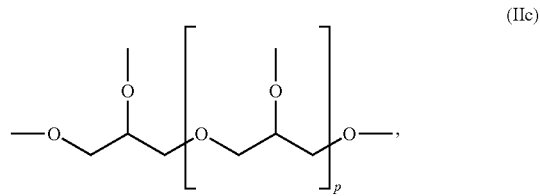

(IIc)

wherein the variable p represents an integer from 1 to 6;

at least two units —C(O)—CH₂—CH(OH)—CH₃.

18. The polyglycerol ester of 3-hydroxybutyric acid according to claim 9,
wherein the polyglycerol ester of 3-hydroxybutyric acid has a molecular weight in the range of from 500 to 50,000 g/mol, as determined by size exclusion chromatography according to DIN EN ISO 16014-5: 2019.

19. A mixture comprising at least two different polyglycerol esters of 3-hydroxybutyric acid according to claim 9.

20. A pharmaceutical composition comprising at least one polyglycerol ester of 3-hydroxybutyric acid, crosslinked with polycarboxylic acids,
wherein the polyglycerol ester of 3-hydroxybutyric acid, crosslinked with polycarboxylic acids, corresponds to the general formula (IVa)

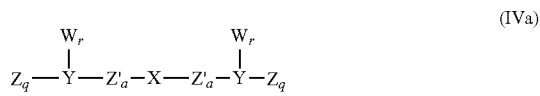

(IVa)

wherein, in the general formula (IVa),
X represents a radical —C(O)—X'—C(O)—, wherein X' represents a saturated or unsaturated organic radical derived from a polycarboxylic acid and comprising 1 to 10, which radical may be mono- or polysubstituted by at least one of a hydroxyl radical and a carboxyl radical;
Y represents a radical derived from a polyglycerol and represented by the general formula (IIc)

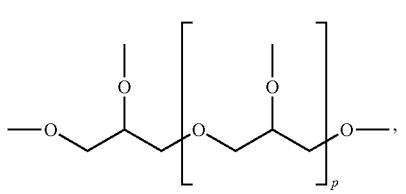

(IIc)

wherein the variable p represents an integer from 1 to 6;

Z represents a radical —C(O)—CH$_2$—CH(OH)—CH$_3$ and the variable q, independently of one another, is an integer from 1 to (p+2) with p being an integer from 1 to 6;

Z' represents a radical —C(O)—CH$_2$—CH(CH$_3$)—O— and the variable a, independently of one another, is 0 or 1;

W, independently of one another, is selected among hydrogen, —X—OH with X as defined hereinbefore and at least one of the following blocks

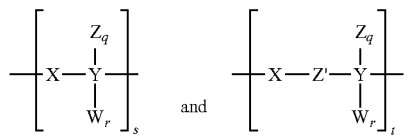

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

21. The pharmaceutical composition according to claim 20,
wherein the pharmaceutical composition is a drug or a medicament.

22. A method of treating a human or an animal suffering from a disease of the human or animal body,
wherein the method comprises the step of administering to said human or animal a therapeutically efficient amount of at least one polyglycerol ester of 3-hydroxybutyric acid, crosslinked with polycarboxylic acids,
wherein the polyglycerol ester of 3-hydroxybutyric acid, crosslinked with polycarboxylic acids, corresponds to the general formula (IVa)

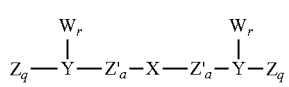

(IVa)

wherein, in the general formula (IVa),

X represents a radical —C(O)—X'—C(O)—, wherein X' represents a saturated or unsaturated organic radical derived from a polycarboxylic acid and comprising 1 to 10, which radical may be mono- or polysubstituted by at least one of a hydroxyl radical and a carboxyl radical;

Y represents a radical derived from a polyglycerol and represented by the general formula (IIc)

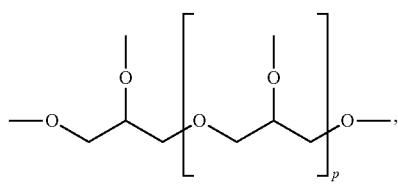

(IIc)

wherein the variable p represents an integer from 1 to 6;

Z represents a radical —C(O)—CH$_2$—CH(OH)—CH$_3$ and the variable q, independently of one another, is an integer from 1 to (p+2) with p being an integer from 1 to 6;

Z' represents a radical —C(O)—CH$_2$—CH(CH$_3$)—O— and the variable a, independently of one another, is 0 or 1;

W, independently of one another, is selected among hydrogen, —X—OH with X as defined hereinbefore and at least one of the following blocks

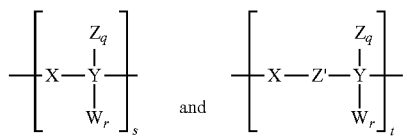

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

23. The method according to claim 22,
wherein the disease is selected among diseases associated with a disorder of human or animal energy metabolism.

24. The method according to claim 22,
wherein the disease is selected among diseases associated with a disorder of human or animal keto-body metabolism.

25. The method according to claim 22,
wherein the disease is selected among craniocerebral trauma, stroke, hypoxia, cardiovascular diseases, myocardial infarction, refeeding syndrome, anorexia, epilepsy, neurodegenerative diseases, dementia, Alzheimer's disease, Parkinson's disease, multiple sclerosis, amyotrophic lateral sclerosis, fat metabolic diseases, glucose transporter defect, GLUT1 defect, very long-chain acyl-CoA dehydrogenase deficiency, mitochondriopathies, mitochondrial thiolase defect, Huntington's disease, cancers, T-cell lymphomas, astrocytomas, glioblastomas, HIV, rheumatic diseases, rheumatoid arthritis, arthritis urica, diseases of the gastrointestinal tract, chronic inflammatory bowel diseases, ulcerative colitis, Crohn's disease, lyosomal storage diseases, sphingolipidosis, Niemann-Pick disease, diabetes mellitus and chemotherapy-caused side-effects.

26. A cosmetic composition comprising at least one polyglycerol ester of 3-hydroxybutyric acid, crosslinked with polycarboxylic acids, wherein the polyglycerol ester of 3-hydroxybutyric acid, crosslinked with polycarboxylic acids, corresponds to the general formula (IVa)

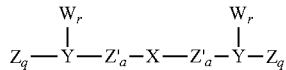
(IVa)

wherein, in the general formula (IVa),
X represents a radical —C(O)—X'—C(O)—, wherein X' represents a saturated or unsaturated organic radical derived from a polycarboxylic acid and comprising 1 to 10, which radical may be mono- or polysubstituted by at least one of a hydroxyl radical and a carboxyl radical;
Y represents a radical derived from a polyglycerol and represented by the general formula (IIc)

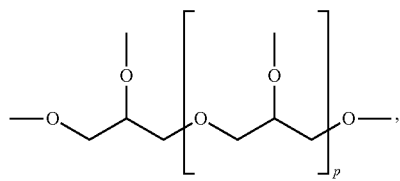
(IIc)

wherein the variable p represents an integer from 1 to 6;
Z represents a radical —C(O)—CH$_2$—CH(OH)—CH$_3$ and the variable q, independently of one another, is an integer from 1 to (p+2) with p being an integer from 1 to 6;
Z' represents a radical —C(O)—CH$_2$—CH(CH$_3$)—O— and the variable a, independently of one another, is 0 or 1;
W, independently of one another, is selected among hydrogen, —X—OH with X as defined hereinbefore and at least one of the following blocks

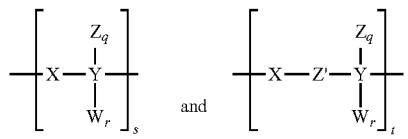

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

27. A food product comprising at least one polyglycerol ester of 3-hydroxybutyric acid, crosslinked with polycarboxylic acids,
wherein the polyglycerol ester of 3-hydroxybutyric acid, crosslinked with polycarboxylic acids, corresponds to the general formula (IVa)

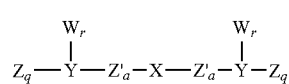
(IVa)

wherein, in the general formula (IVa),
X represents a radical —C(O)—X'—C(O)—, wherein X' represents a saturated or unsaturated organic radical derived from a polycarboxylic acid and comprising 1 to 10, which radical may be mono- or polysubstituted by at least one of a hydroxyl radical and a carboxyl radical;
Y represents a radical derived from a polyglycerol and represented by the general formula (IIc)

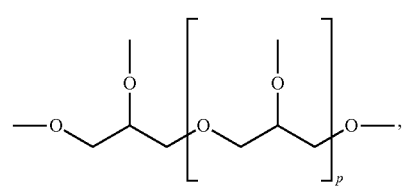
(IIc)

wherein the variable p represents an integer from 1 to 6;
Z represents a radical —C(O)—CH$_2$—CH(OH)—CH$_3$ and the variable q, independently of one another, is an integer from 1 to (p+2) with p being an integer from 1 to 6;
Z' represents a radical —C(O)—CH$_2$—CH(CH$_3$)—O— and the variable a, independently of one another, is 0 or 1;
W, independently of one another, is selected among hydrogen, —X—OH with X as defined hereinbefore and at least one of the following blocks

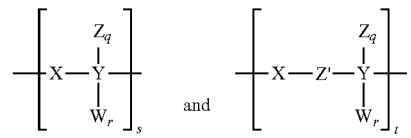

with X, Y, Z, Z' and q each as defined hereinbefore, wherein the variables s and t, each independently of one another, are an integer from 0 to 30 and the variable r, independently of one another, is an integer from 0 to (p+1) with p being an integer from 1 to 6, wherein the chain end of the blocks is in each case formed by one of hydrogen, —X—OH and Z.

28. The food product according to claim 27, wherein the food product is selected from the group consisting of a food, a dietary supplement, a functional food, a novel food, a food additive, a food supplement, a dietary food, a power snack, an appetite suppressant and a strength sports supplement and an endurance sports supplement.

* * * * *